US011097566B2

(12) United States Patent
Katsumoto et al.

(10) Patent No.: US 11,097,566 B2
(45) Date of Patent: Aug. 24, 2021

(54) THERMAL TRANSFER RECORDING SHEET

(71) Applicant: CANON KABUSHIKI KAISHA, Tokyo (JP)

(72) Inventors: Yuko Katsumoto, Yokohama (JP); Koromo Shirota, Kawasaki (JP); Tsuyoshi Santo, Yokohama (JP); Taichi Shintou, Saitama (JP); Hajime Muta, Zama (JP); Tomoyuki Noda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 16/362,942

(22) Filed: Mar. 25, 2019

(65) Prior Publication Data

US 2019/0217648 A1 Jul. 18, 2019

Related U.S. Application Data

(63) Continuation of application No. PCT/JP2017/035284, filed on Sep. 28, 2017.

(30) Foreign Application Priority Data

Oct. 19, 2016 (JP) .............. JP2016-205523

(51) Int. Cl.
B41M 5/385 (2006.01)
B41M 5/39 (2006.01)
B41M 5/388 (2006.01)
B41M 5/42 (2006.01)
C09B 67/22 (2006.01)
B41M 7/00 (2006.01)

(52) U.S. Cl.
CPC .......... B41M 5/3858 (2013.01); B41M 5/388 (2013.01); B41M 5/3852 (2013.01); B41M 5/3854 (2013.01); B41M 5/3856 (2013.01); B41M 5/39 (2013.01); B41M 5/42 (2013.01); C09B 67/0034 (2013.01); C09B 67/0041 (2013.01); B41M 7/0027 (2013.01); B41M 2205/02 (2013.01); B41M 2205/06 (2013.01); B41M 2205/30 (2013.01)

(58) Field of Classification Search
CPC ........ B41M 5/3858; B41M 5/42; B41M 5/39; B41M 5/3852; B41M 5/3856; B41M 5/388; B41M 5/3854; B41M 2205/30
See application file for complete search history.

(56) References Cited

U.S. PATENT DOCUMENTS 3,251,881 A 5/1966 Susi et al.
3,484,467 A 12/1969 Susi et al.
8,093,181 B2 1/2012 Shinohara et al.
8,440,589 B2 5/2013 Sanada et al.
8,926,740 B2 1/2015 Shintou et al.
8,940,087 B2 1/2015 Katsumoto et al.
8,951,340 B2 2/2015 Shintou et al.
8,974,708 B2 3/2015 Shintou et al.
9,481,192 B2 11/2016 Nakano et al.
9,580,576 B2 2/2017 Mori et al.
9,592,695 B2 3/2017 Katsumoto et al.
2005/0181943 A1* 8/2005 Kidnie ................ B41M 5/392
503/201
2009/0186172 A1 7/2009 Shinohara et al.
2013/0287974 A1 10/2013 Lee et al.
2015/0360495 A1 12/2015 Katsumoto et al.
2015/0367665 A1 12/2015 Nakano et al.

FOREIGN PATENT DOCUMENTS

| EP | 0 743 194 A1 | 11/1996 |
|---|---|---|
| JP | 61-69991 A | 4/1986 |
| JP | 7-156562 A | 6/1995 |
| JP | 8-118832 A | 5/1996 |
| JP | 2000-103174 A | 4/2000 |
| JP | 2001-158879 A | 6/2001 |
| JP | 2002-67517 A | 3/2002 |
| JP | 2008-80735 A | 4/2008 |
| JP | 2010-253944 A | 11/2010 |
| JP | 2012-250400 A | 12/2012 |
| JP | 2014-156106 A | 8/2014 |
| NO | 2018/074176 A1 | 4/2018 |
| WO | WO9012342 A1 * | 10/1990 |

OTHER PUBLICATIONS

International Search Report in International Patent Application No. PCT/JP2017/035284 (dated Nov. 2017).
Extended European Search Report in European Application No. 17862498.7 (dated Aug. 2020).
International Preliminary Report on Patentability in International Patent Application No. PCT/JP2017/035284 (dated Apr. 2019).

* cited by examiner

Primary Examiner — Gerard Higgins
(74) Attorney, Agent, or Firm — Venable LLP

(57) ABSTRACT

An object of the present invention is to provide a thermal transfer recording sheet that provides an image that is excellent in light fastness and has a satisfactory imbalance. The present invention relates to a thermal transfer recording sheet including a substrate and dye layers (a yellow dye layer, a magenta dye layer, and a cyan dye layer), in which one or more kinds of the dye layers each contain one or more kinds of specific compounds. The present invention also relates to a thermal transfer recording sheet including a substrate, dye layers, and a protective layer for protecting the surface of an image, in which the protective layer contains one or more kinds of specific compounds.

18 Claims, No Drawings

THERMAL TRANSFER RECORDING SHEET

CROSS-REFERENCE TO RELATED APPLICATIONS

This application is a Continuation of International Patent Application No. PCT/JP2017/035284, filed Sep. 28, 2017, which claims the benefit of Japanese Patent Application No. 2016-205523, filed Oct. 19, 2016, both of which are hereby incorporated by reference herein in their entirety.

BACKGROUND OF THE INVENTION

Field of the Invention

The present invention relates to a thermal transfer recording sheet.

Description of the Related Art

In recent years, along with the spread of a portable color display device, there has been a growing demand for easy color printing of a photograph or a document photographed or produced with the device. A color print system that corresponds to such demand is, for example, an electrophotographic system, an inkjet system, or a thermal transfer recording system. Of those, the thermal transfer recording system is excellent as a method by which the photograph or the document can be easily printed irrespective of its surrounding environment because the system enables the printing by a dry process, and is of a small size and hence excellent in portability of a printer. In addition, the system is excellent in sharpness of an image and reproducibility of a color thereof because a dye is used as a coloring material, and hence the light and shade of the image can be represented by the gradation of density of the coloring material.

In the thermal transfer recording system, a thermal transfer recording sheet having coloring material layers each containing a thermally migrating coloring material (dye) on a sheet-shaped substrate and an image receiving sheet having a coloring material receiving layer on its surface are superimposed on each other. Then, recording is performed by heating the thermal transfer recording sheet to transfer the coloring materials in the sheet onto the image receiving sheet. In the system, the recording is performed by superimposing yellow, magenta, and cyan colors, and hence it has been known that when the colors are mixed, catalytic fading between the dyes occurs. Accordingly, even when dyes each having high light fastness in a single color are used, a difference in light fastness occurs between the respective colors at the time of the color mixing. Thus, for example, only the cyan color fades in a black color after the recording, and hence an image becomes reddish or yellowish in some cases. Such difference in degree of fading between the respective colors in the image is referred to as "imbalance". When all colors fade to the same degree, the expression "satisfactory imbalance" is used, and when only a specific color fades, the expression "unsatisfactory imbalance" is used.

Here, in Japanese Patent Application Laid-Open No. 2001-158879, there is a disclosure of a thermal transfer sheet that contains a fading inhibitor and hence can improve the light fastness of a coloring material after thermal transfer. In addition, in Japanese Patent Application Laid-Open No. 2012-250400, as a protective layer transfer sheet that can impart high light fastness to a transfer target material having formed thereon an image, there is a disclosure of a protective layer transfer sheet containing, in its surface layer, a copolymer obtained by copolymerizing at least styrene and a UV-absorbing monomer.

However, the methods described in Japanese Patent Application Laid-Open No. 2001-158879 and Japanese Patent Application Laid-Open No. 2012-250400 each have a small improving effect on the imbalance in some cases, and hence the development of a thermal transfer recording sheet further improved in imbalance has been required.

SUMMARY OF THE INVENTION

According to one embodiment of the present invention, there is provided a thermal transfer recording sheet including: a substrate; a yellow dye layer containing a yellow dye; a magenta dye layer containing a magenta dye; and a cyan dye layer containing a cyan dye, wherein one or more of the yellow dye layer, the magenta dye layer, and the cyan dye layer each contain one or more kinds of compounds selected from the group of compounds represented by the following general formulae (1) and (2), wherein the yellow dye contains one or more kinds of compounds selected from the group of compounds represented by the following general formulae (3) to (6), and wherein the cyan dye contains one or more kinds of compounds selected from the group of compounds represented by the following general formulae (7) to (9):

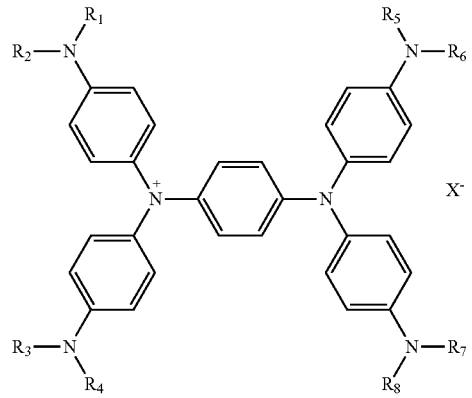

General formula (1)

in the general formula (1), $R_1$ to $R_8$ each independently represent a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R_1$ and $R_2$, $R_3$ and $R_4$, $R_5$ and $R_6$, and $R_7$ and $R_8$ may each form a cyclic structure together with a nitrogen atom to which the pair is bonded, and $X^-$ represents an anion;

General formula (2)

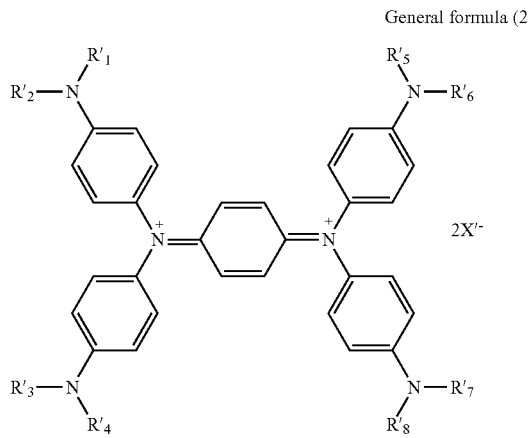

2X'⁻ in the general formula (2), $R'_1$ to $R'_8$ each independently represent a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R'_1$ and $R'_2$, $R'_3$ and $R'_4$, $R'_5$ and $R'_6$, and $R'_7$ and $R'_8$ may each form a cyclic structure together with a nitrogen atom to which the pair is bonded, and $X'^-$ represents an anion;

General formula (3)

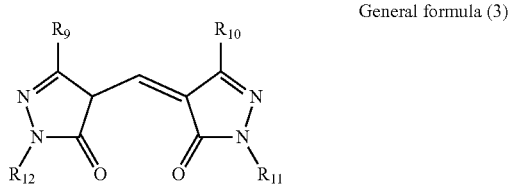

in the general formula (3), $R_9$ to $R_{12}$ each independently represent an alkyl group, or a substituted or unsubstituted aryl group;

General formula (4)

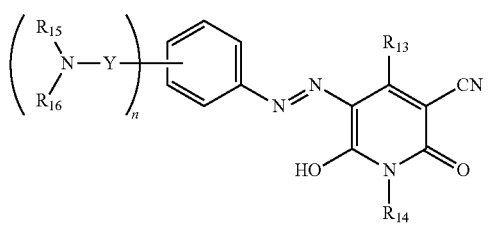

in the general formula (4), $R_{13}$ represents an alkyl group, a substituted or unsubstituted aryl group, or a substituted or unsubstituted amino group, $R_{14}$ represents a hydrogen atom, an alkyl group, a substituted or unsubstituted aryl group, or —N(—$R_a$)$R_b$, provided that $R_a$ and $R_b$ each independently represent a hydrogen atom, an alkyl group, or an acyl group, and may form a cyclic structure together with a nitrogen atom to which $R_a$ and $R_b$ are bonded, $R_{15}$ represents an alkyl group, $R_{16}$ represents a hydrogen atom or an alkyl group, Y represents a carbonyl group or a sulfonyl group, and "n" represents an integer of from 1 to 3;

General formula (5)

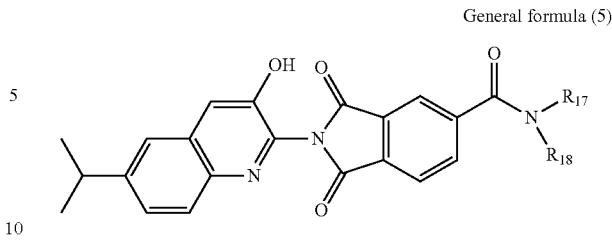

in the general formula (5), $R_{17}$ and $R_{18}$ each independently represent an alkyl group or an aryl group;

General formula (6)

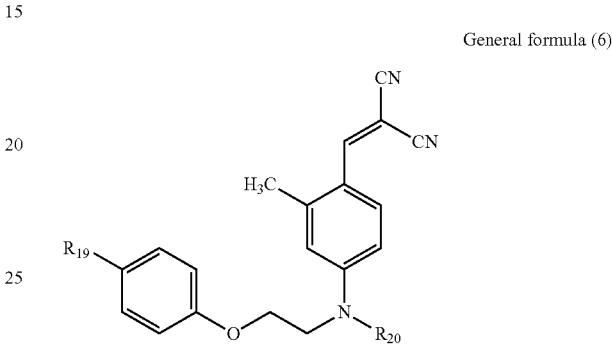

in the general formula (6), $R_{19}$ and $R_{20}$ each independently represent an alkyl group or an aryl group;

General formula (7)

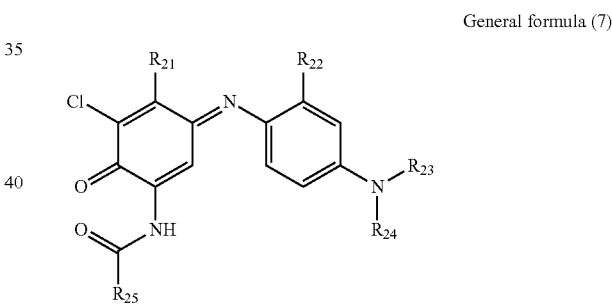

in the general formula (7), $R_{21}$ to $R_{25}$ each independently represent an alkyl group or an aryl group;

General formula (8)

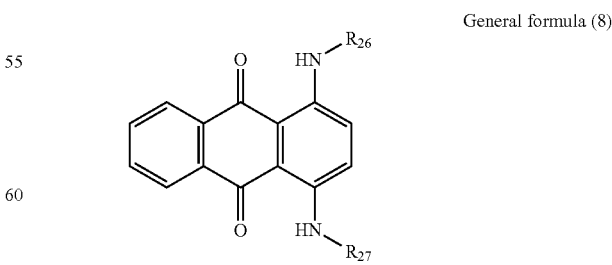

in the general formula (8), $R_{26}$ and $R_{27}$ each independently represent an alkyl group, or a substituted or unsubstituted aryl group;

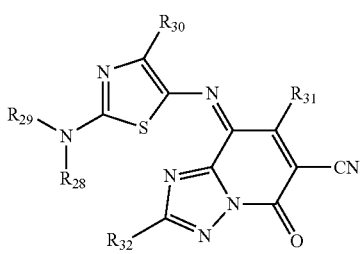

General formula (9)

in the general formula (9), $R_{28}$ to $R_{32}$ each independently represent an alkyl group or an aryl group.

According to another embodiment of the present invention, there is provided a thermal transfer recording sheet including: a substrate; a yellow dye layer containing a yellow dye; a magenta dye layer containing a magenta dye; a cyan dye layer containing a cyan dye; and a protective layer for protecting a surface of an image formed by transferring the respective layers onto a transfer target material, wherein the protective layer contains one or more kinds of compounds selected from the group of compounds represented by the following general formulae (1) and (2), wherein the yellow dye contains one or more kinds of compounds selected from the group of compounds represented by the following general formulae (3) to (6), and wherein the cyan dye contains one or more kinds of compounds selected from the group of compounds represented by the following general formulae (7) to (9).

Further features of the present invention will become apparent from the following description of exemplary embodiments.

DESCRIPTION OF THE EMBODIMENTS

The other features of the present invention are made apparent by the following description illustrating various embodiments.

The present invention is described in detail below.

The present inventors have made extensive investigations with a view to solving the above-mentioned problem, and as a result, have found that an image that has a satisfactory imbalance and is excellent in light fastness is obtained by each of the following first and second thermal transfer recording sheets.

The first thermal transfer recording sheet includes at least a substrate and three kinds of dye layers (a yellow dye layer, a magenta dye layer, and a cyan dye layer) on the substrate. Those dye layers are each formed by using a composition (a yellow dye composition, a magenta dye composition, or a cyan dye composition) containing a dye corresponding to each dye layer (a yellow dye, a magenta dye, or a cyan dye). In addition, one or more kinds of dye layers out of those three kinds of dye layers each contain one or more kinds of compounds selected from the group of compounds represented by the general formulae (1) and (2) (hereinafter sometimes referred to as "first compound"). For example, when the first compound is used in the formation of the yellow dye layer, the yellow dye layer is formed by preparing a composition (yellow dye composition) containing at least the first compound and the yellow dye.

In addition, in the first thermal transfer recording sheet, one or more kinds of compounds selected from the group of compounds represented by the general formulae (3) to (6) are used in the yellow dye to be used in the yellow dye layer.

Further, one or more kinds of compounds selected from the group of compounds represented by the general formulae (7) to (9) are used in the cyan dye to be used in the cyan dye layer.

As described above, a feature of the first thermal transfer recording sheet lies in that a specific yellow dye and a specific cyan dye, and the first compound are used.

The second thermal transfer recording sheet includes at least a substrate, and three kinds of dye layers (a yellow dye layer, a magenta dye layer, and a cyan dye layer) and a protective layer on the substrate. In addition, the protective layer contains the first compound.

In addition, as in the first thermal transfer recording sheet, one or more kinds of compounds selected from the group of compounds represented by the general formulae (3) to (6) are used in the yellow dye to be used in the yellow dye layer. Further, one or more kinds of compounds selected from the group of compounds represented by the general formulae (7) to (9) are used in the cyan dye to be used in the cyan dye layer.

As described above, a feature of the second thermal transfer recording sheet lies in that the first compound is used in the protective layer, and a specific yellow dye and a specific cyan dye are used in the dye layers.

The first thermal transfer recording sheet may include a protective layer containing the first compound (transferable protective layer to be described later). In addition, the second thermal transfer recording sheet may contain the first compound in a dye layer (e.g., the yellow dye layer). In this case, the first and second thermal transfer recording sheets are of the same form.

The first and second thermal transfer recording sheets are described in more detail below.

(I) First Thermal Transfer Recording Sheet

The first thermal transfer recording sheet includes at least the substrate, and the yellow dye layer containing the specific yellow dye, the magenta dye layer containing the magenta dye, and the cyan dye layer containing the specific cyan dye on the substrate. In addition, at least one kind of dye layer out of those layers contains the first compound.

The first thermal transfer recording sheet may include, for example, a dye layer except the three kinds (e.g., a black dye layer).

The construction of the first thermal transfer recording sheet is described in detail below.

(I-1) Substrate

The substrate of the first thermal transfer recording sheet is configured to support the dye layers. The substrate is not particularly limited, and a substrate that is conventionally known in the field of a thermal transfer recording sheet, and has moderate heat resistance and moderate strength may be used.

Examples of the substrate include a polyethylene terephthalate film, a polyethylene naphthalate film, a polycarbonate film, a polyimide film, a polyamide film, an aramid film, a polystyrene film, a 1,4-polycyclohexylenedimethylene terephthalate film, a polysulfone film, a polypropylene film, a polyphenylene sulfide film, a polyvinyl alcohol film, a cellophane film, a cellulose derivative film, a polyethylene film, a polyvinyl chloride film, a nylon film, capacitor paper, and paraffin paper. Of those, a polyethylene terephthalate film is preferred as the substrate from the viewpoints of mechanical strength, solvent resistance, and economical efficiency.

Thickness of Substrate

The thickness of the substrate may be set to 0.5 μm or more and 50 μm or less, and is preferably set to a thickness of 3 μm or more and 10 μm or less from the viewpoint of the transferability of the first thermal transfer recording sheet.

Adhesion Treatment (Adhesion Layer)

When a composition (dye composition) containing a dye is applied onto the substrate for forming each dye layer, the wettability, adhesive property, and the like of the dye composition may be insufficient. Accordingly, the application surface of the substrate is preferably subjected to an adhesion treatment as required.

The adhesion treatment is not particularly limited, and a method known in the field of a thermal transfer recording sheet may be used. Examples of the adhesion treatment may include an ozone treatment, a corona discharge treatment, a UV treatment, a plasma treatment, a low-temperature plasma treatment, a primer treatment, and a chemical treatment. In addition, two or more of those treatments may be performed in combination. In addition, a method involving applying an adhesion layer onto the substrate may be used as the adhesion treatment for the substrate.

The adhesion layer is not particularly limited, and an adhesion layer known in the field of a thermal transfer recording sheet may be used.

Examples of a material to be used for the adhesion layer include: organic materials, such as a polyester resin, a polystyrene resin, a polyacrylate resin, a polyamide resin, a polyether resin, a polyvinyl acetate resin, a polyethylene resin, a polypropylene resin, a polyvinyl chloride resin, a polyvinyl alcohol resin, and a polyvinyl butyral resin; and inorganic fine particles, such as silica, alumina, magnesium carbonate, magnesium oxide, and titanium oxide.

Heat-Resistant Slipping Layer

A heat-resistant slipping layer is preferably arranged on the surface of the substrate opposite to the surface on which the dye layers are present for the purpose of improving the heat resistance of the substrate and the traveling performance of a thermal head.

The heat-resistant slipping layer is formed of a layer containing a heat-resistant resin. The heat-resistant resin is not particularly limited, and for example, the following resins may be used: a polyvinyl butyral resin, a polyvinyl acetal resin, a polyester resin, a polyether resin, a polybutadiene resin, a vinyl chloride-vinyl acetate copolymer resin, a styrene-butadiene copolymer resin, polyurethane acrylate, polyester acrylate, a polyimide resin, and a polycarbonate resin.

In addition, the heat-resistant slipping layer may contain an additive, such as a crosslinking agent, a release agent, a lubricant, or a slipperiness-imparting agent. Examples of the lubricant include an amino-modified silicone compound and a carboxy-modified silicone compound. In addition, the slipperiness-imparting agent is, for example, fine particles of silica or the like serving as heat-resistant fine particles.

The heat-resistant slipping layer may be formed by: applying a heat-resistant slipping layer application liquid, which is prepared by adding the heat-resistant resin, the additive, and the like to a solvent, and dissolving or dispersing the materials in the solvent, to the substrate; and drying the liquid. A method of applying the heat-resistant slipping layer application liquid is not particularly limited, and a method involving using, for example, a bar coater, a gravure coater, a reverse roll coater, a rod coater, or an air doctor coater may be used. Of those, an application method involving using a gravure coater by which the thickness of the layer is easily adjusted is preferred.

With regard to the amount of the heat-resistant slipping layer application liquid to be applied to the substrate, from the viewpoint of the transferability of the first thermal transfer recording sheet, the liquid is preferably applied in such an amount that the thickness of the heat-resistant slipping layer after the drying falls within the range of from 0.1 μm or more to 5 μm or less.

(I-2-1) Dye Layers

The first thermal transfer recording sheet includes dye layers including the layer containing the yellow dye (yellow dye layer), the layer containing the magenta dye (magenta dye layer), and the layer containing the cyan dye (cyan dye layer). In addition, a dye composition containing the first compound is used in the formation of one or more layers out of those layers.

In other words, the first thermal transfer recording sheet may contain the first compound in one kind of dye layer out of the three kinds of dye layers, or may contain the first compound in each of two kinds, or all three kinds, of the dye layers. In addition, a construction in which one kind of dye layer contains one of a compound represented by the general formula (1) and a compound represented by the general formula (2) is permitted, and a construction in which the layer contains both of the compounds is also permitted.

That is, the first thermal transfer recording sheet only needs to include at least one dye layer containing the first compound, which may be of one kind, out of the three kinds of dye layers.

Each dye layer may be formed by using a composition containing a dye corresponding to the dye layer and the first compound (applied to one or more kinds of the yellow dye layer, the magenta dye layer, and the cyan dye layer), and, as required, an additive, such as a medium (e.g., water or an organic solvent), a binder resin, a surfactant, or a wax. For example, a composition (yellow dye composition) containing the yellow dye containing one or more kinds of compounds represented by the general formulae (3) to (6) to be described later, one or more kinds of the first compounds, a medium, a binder resin, a surfactant, and a wax may be used for the yellow dye layer.

As described above, the respective dye layers of the first thermal transfer recording sheet contain one or more kinds of compounds represented by the general formulae (3) to (6) as the yellow dye, one or more kinds of compounds represented by the general formulae (7) to (9) as the cyan dye, and, for example, one or more kinds of compounds represented by the general formulae (10) to (14) as the magenta dye.

A dye that may be used in combination with the compounds (dyes) represented by the general formulae (3) to (14) is not particularly limited as long as the dye is known and used as a dye for thermal transfer in the field of a thermal transfer recording sheet, and is caused to migrate by heat. Such dye may be used in consideration of, for example, its hue, printing sensitivity, light fastness, storage stability, and solubility or dispersibility in a binder resin.

(I-2-2) Component to be Incorporated into Dye Composition for Forming Dye Layer

The respective components to be incorporated into the compositions to be used in the formation of those dye layers are described below.

(i) Compound to be Incorporated into at Least One Kind of Dye Composition for Forming Dye Layer (i-1) First Compound First, the compounds represented by the general formulae (1) and (2) are described. The first compound is not limited to one kind because the compound is one or more kinds of compounds selected from the group of compounds represented by the general formulae (1) and (2). For example, two or more kinds of the first compounds, such as two or more kinds of the compounds each represented by the general formula (1), two or more kinds of the compounds each represented by the general formula (2), and one or more kinds of the compounds each represented by the general formula (1) and one or more kinds of the compounds each represented by the general formula (2), may be used in combination as the first compounds.

General formula (1)

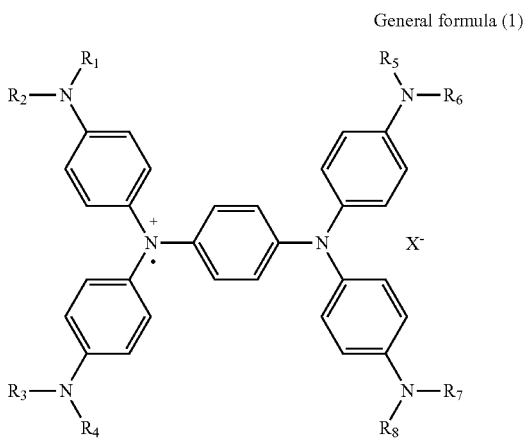

In the general formula (1), $R_1$ to $R_8$ each independently represent a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R_1$ and $R_2$, $R_3$ and $R_4$, $R_5$ and $R_6$, and $R_7$ and $R_8$ may each form a cyclic structure together with a nitrogen atom to which the pair is bonded, and $X^-$ represents an anion.

General formula (2)

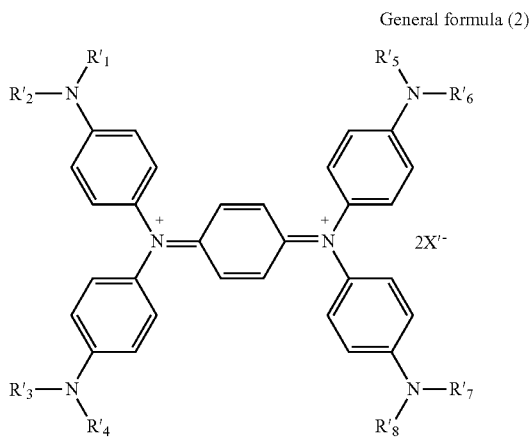

In the general formula (2), $R'_1$ to $R'_8$ each independently represent a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R'_1$ and $R'_2$, $R'_3$ and $R'_4$, $R'_5$ and $R'_6$, and $R'_7$ and $R'_8$ may each form a cyclic structure together with a nitrogen atom to which the pair is bonded, and $X'^-$ represents an anion.

In the general formulae (1) and (2), the substituted or unsubstituted alkyl group having 1 to 8 carbon atoms that may be represented by any one of $R_1$ to $R_8$ and $R'_1$ to $R'_8$ is not particularly limited as long as the group is an alkyl group in which the total number of carbon atoms including the number of carbon atoms of a substituent is 1 or more and 8 or less. Examples of the substituent may include an alkoxy group and a cyano group (—CN).

Examples of the substituted or unsubstituted alkyl group having 1 to 8 carbon atoms include: a linear, branched, or cyclic alkyl group having 1 or more and 8 or less carbon atoms in total, an alkoxyalkyl group having 1 or more and 8 or less carbon atoms in total, and a cyanoalkyl group having 1 or more and 8 or less carbon atoms in total. More specific examples thereof include a methyl group, an ethyl group, an n-propyl group, an iso-propyl group, an n-butyl group, a sec-butyl group, a tert-butyl group, an iso-butyl group, an octyl group, a cyclobutyl group, a cyclopentyl group, a cyclohexyl group, a methylcyclohexyl group, a cyclohexylmethyl group, a 2-ethylpropyl group, a 2-ethylhexyl group, a methoxyethyl group, a methoxypropyl group, a cyanopropyl group, and a cyanoethyl group.

In the general formulae (1) and (2), the substituted or unsubstituted alkenyl group that may be represented by any one of $R_1$ to $R_8$ and $R'_1$ to $R'_8$ is not particularly limited. Examples of a substituent thereof may include a hydroxy group and a carboxy group. In addition, the total number of carbon atoms of the alkenyl group including the substituent may be set to, for example, 2 or more and 8 or less.

Specific examples of the substituted or unsubstituted alkenyl group include a vinyl group, a propenyl group, a butenyl group, a pentenyl group, a hexenyl group, a heptenyl group, an octanyl group, a 2-hydroxyvinyl group, a 3-hydroxypropenyl group, and a 3-carboxypropenyl group.

In the general formulae (1) and (2), the substituted or unsubstituted aralkyl group that may be represented by any one of $R_1$ to $R_8$ and $R'_1$ to $R'_8$ is not particularly limited. Examples of a substituent thereof may include an alkyl group and a halogen atom (e.g., a chlorine atom or a fluorine atom). In addition, the total number of carbon atoms of the aralkyl group including the substituent may be set to, for example, 7 or more and 12 or less, preferably 7 or more and 8 or less.

Specific examples of the substituted or unsubstituted aralkyl group include a benzyl group, a p-chlorobenzyl group, a p-methylbenzyl group, a phenethyl group (e.g., a 2-phenylethyl group), a 3-phenylpropyl group, an α-naphthylmethyl group, and a 3-naphthylethyl group.

In the general formulae (1) and (2), the substituted or unsubstituted alkynyl group that may be represented by any one of $R_1$ to $R_8$ and $R'_1$ to $R'_8$ is not particularly limited. Examples of a substituent thereof may include a hydroxy group, a carboxy group, and a halogen atom (e.g., a chlorine atom or a fluorine atom). In addition, the total number of carbon atoms of the alkynyl group including the substituent may be set to, for example, 2 or more and 8 or less, preferably 3 or more and 6 or less.

Specific examples of the substituted or unsubstituted alkynyl group include a propynyl group, a butynyl group, a pentynyl group, a hexynyl group, a 2-hydroxybutynyl group, a 2-carboxypentynyl group, and a 2-chlorobutynyl group.

In the general formulae (1) and (2), the substituted or unsubstituted aryl group that may be represented by any one of $R_1$ to $R_8$ and $R'_1$ to $R'_8$ is not particularly limited. Examples of a substituent thereof may include an alkyl group and an alkoxy group. In addition, the total number of carbon atoms of the aryl group including the substituent may be set to, for example, 6 or more and 14 or less, preferably 6 or more and 12 or less.

Specific examples of the substituted or unsubstituted aryl group include a phenyl group, a tolyl group (e.g., a 2-methylphenyl group), a 3-propylphenyl group, a xylyl group (e.g., a 2,6-dimethylphenyl group), a naphthyl group, an t-methylnaphthyl group, and a β-ethylnaphthyl group.

Further, in the general formulae (1) and (2), $R_1$ and $R_2$, $R_3$ and $R_4$, $R_5$ and $R_6$, and $R_7$ and $R_8$, and $R'_1$ and $R'_2$, $R'_3$ and $R'_4$, $R'_5$ and $R'_6$, and $R'_7$ and $R'_8$ may each form a cyclic structure together with a nitrogen atom to which the pair is bonded. Examples of the cyclic structure may include a substituted or unsubstituted five-membered ring, a substituted or unsubstituted six-membered ring, and a substituted or unsubstituted seven-membered ring.

Specific examples of the cyclic structure may include the following: a pyrrolidine ring serving as a five-membered ring; a piperidine ring, a morpholine ring, and a piperazine ring each serving as a six-membered ring; and an azepane ring serving as a seven-membered ring. Further, examples of a substituent that any such cyclic structure may have may include alkyl groups, such as a methyl group and an ethyl group.

$R_1$ and $R_2$, $R_3$ and $R_4$, $R_5$ and $R_6$, and $R_7$ and $R_8$, and $R'_1$ and $R'_2$, $R'_3$ and $R'_4$, $R'_5$ and $R'_6$, and $R'_7$ and $R'_8$ in the general formulae (1) and (2) preferably each represent the same substituent. When any such pair represents the same substituent, an image that is excellent in light fastness and is improved in imbalance can be obtained.

In addition, in the general formulae (1) and (2), $R_1$ to $R_8$ and $R'_1$ to $R'_8$ preferably each independently represent a substituted or unsubstituted alkyl group having 1 to 8 carbon atoms because an image that is excellent in light fastness and is improved in imbalance can be obtained. In particular, $R_1$ to $R_8$ and $R'_1$ to $R'_8$ more preferably each represent an unsubstituted alkyl group or a cyanoalkyl group having 3 to 8 carbon atoms in total.

In the general formulae (1) and (2), the anion that may be represented by any one of $X^-$ and $X'^-$ is not particularly limited, and examples thereof include anions such as a fluoride ion, a chloride ion, a bromide ion, an iodide ion, a perchlorate ion ($ClO_4$), a nitrate ion, a methanesulfonate ion, a benzenesulfonate ion, a p-toluenesulfonate ion, a p-trifluoromethylbenzenesulfonate ion, a 2,3,4,5,6-pentafluorobenzenesulfonate ion, a methylsulfate ion, an ethylsulfate ion, a propylsulfate ion, a tetrafluoroborate ion ($BF_4^-$), a tetraphenylborate ion, a hexafluorophosphate ion ($PF_6^-$), a benzenesulfinate ion, an acetate ion, a trifluoroacetate ion, a propionate ion, a benzoate ion, an oxalate ion, a succinate ion, a malonate ion, an oleate ion, a stearate ion, a citrate ion, a picolinate ion, a monohydrogen diphosphate ion, a dihydrogen diphosphate ion, a pentafluoropropionate ion, a pentachlorostannate ion, a chlorosulfonate ion, a fluorosulfonate ion, a trifluoromethanesulfonate ion, a hexafluoroarsenate ion, a hexafluoroantimonate ion ($SbF_6^-$), a molybdate ion, a tungstate ion, a titanate ion, a zirconate ion, a naphthalenedisulfonate ion, a tris(trifluoromethanesulfonyl)methide ion ($C(SO_2CF_3)_3^-$), a bis(trifluoromethanesulfonyl)imide ion ($N(SO_2CF_3)_2^-$), a bis(perfluoroethanesulfonyl)imide ion ($N(SO_2CF_2CF_3)_2^-$), a pentafluorophenylbis(trifluoromethanesulfonyl)methide ion, a tetrakis(pentafluorophenyl)boron ion, and a 1,1,2,2,3,3-hexafluoropropane-1,3-disulfonylimide ion represented by the following formula.

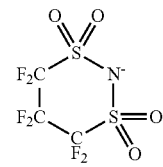

(i-2) Specific Examples of First Compound

Compounds (1) to (4), (7), (8), (12), (14) to (16), (18) to (20), (22), (24), (25), (28), (30), and (32) to (40) are shown below as specific examples of the compound represented by the general formula (1), but the specific examples are not limited to the compounds. In addition, Compounds (5), (6), (9) to (11), (13), (17), (21), (23), (26), (27), (29), and (31) are shown below as specific examples of the compound represented by the general formula (2), but the specific examples are not limited to the compounds.

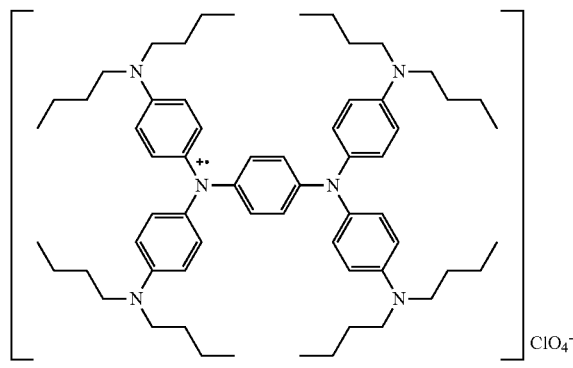

Compound (1)

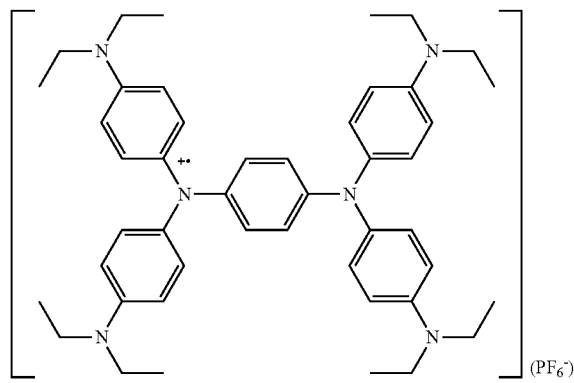

Compound (2)

-continued
Compound (3)
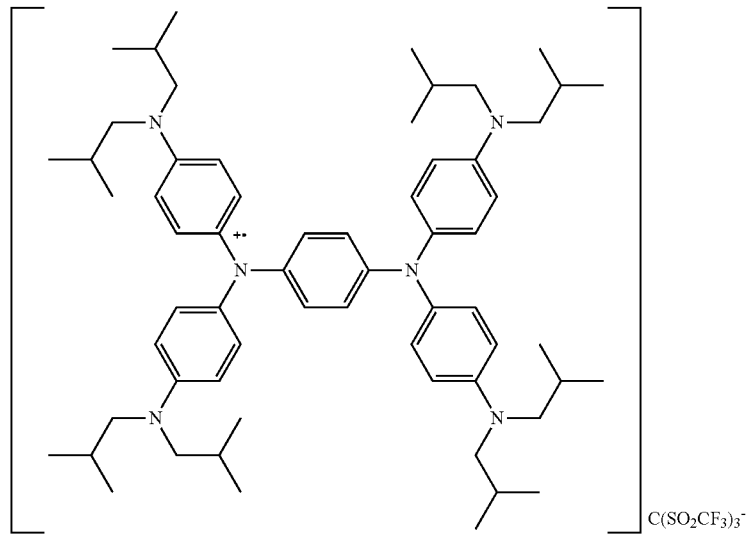
Compound (4)
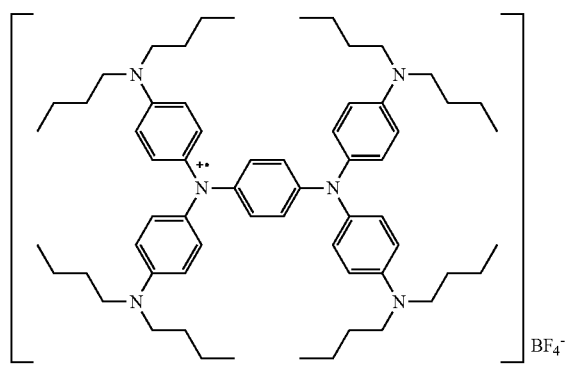
Compound (5)
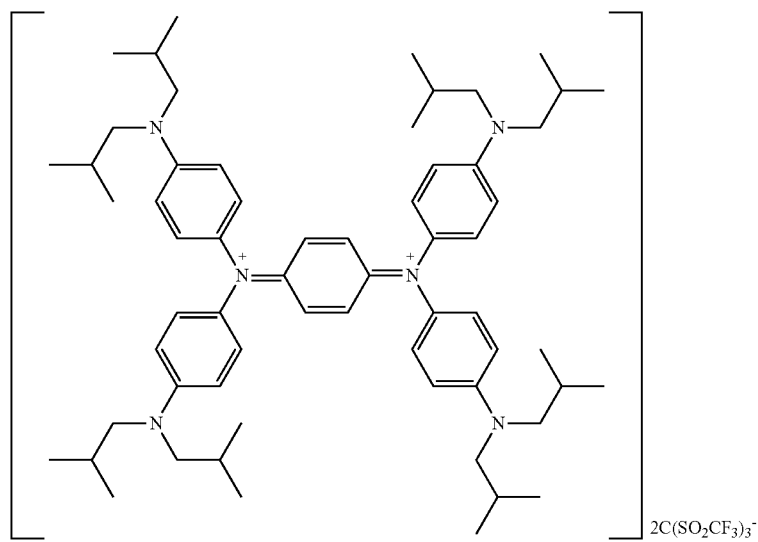

-continued
Compound (6)
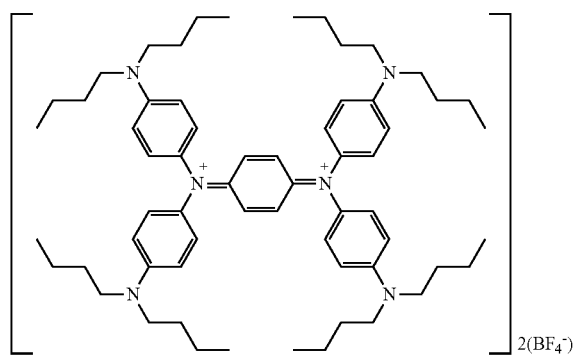
Compound (7)
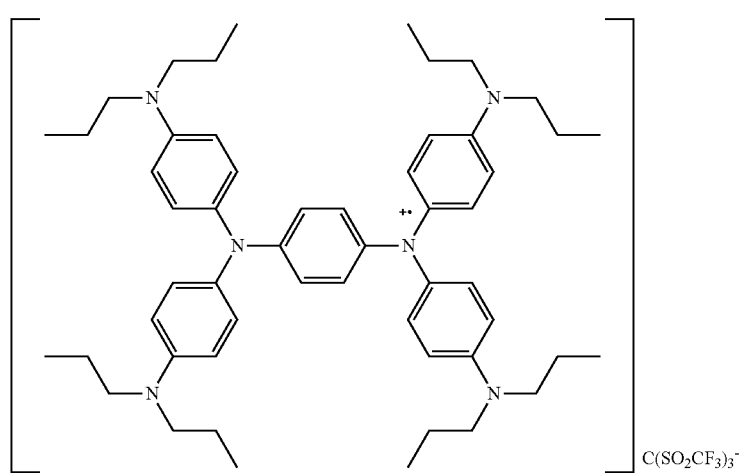
Compound (8)
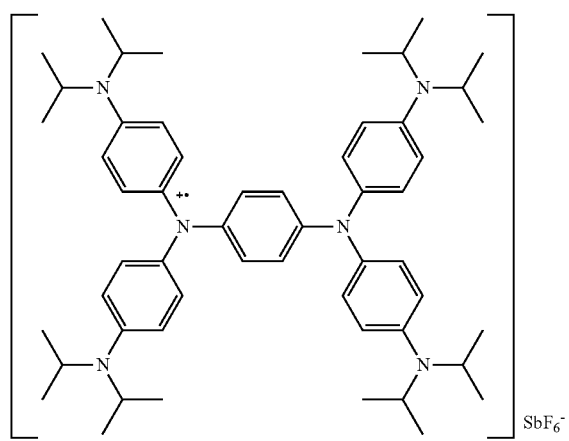
Compound (9)
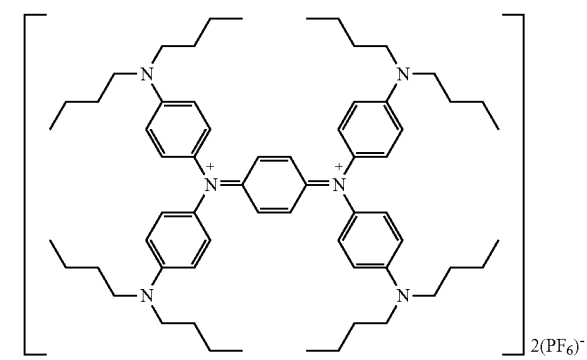

-continued
Compound (10)
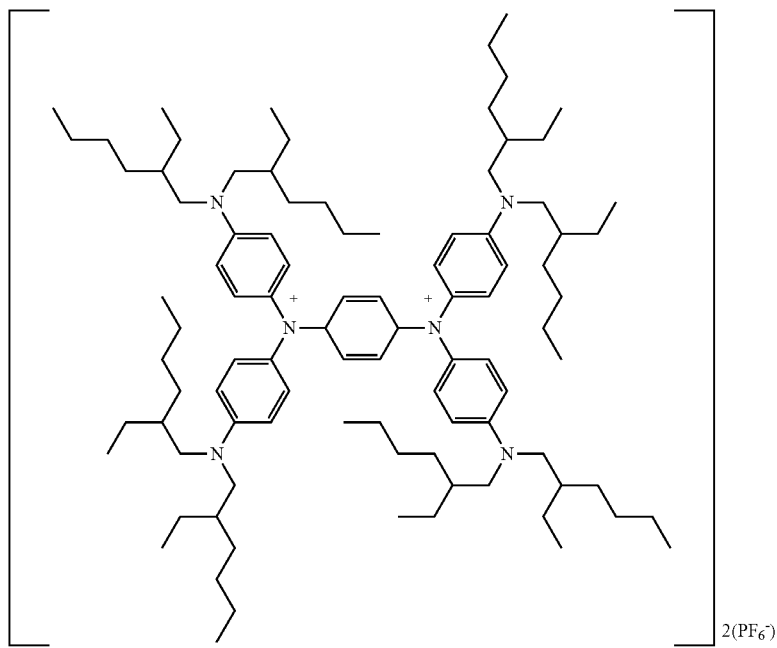
Compound (11)
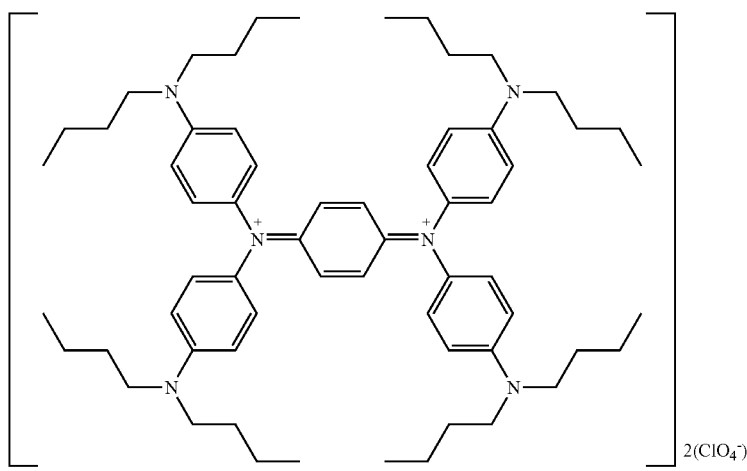
Compound (12)
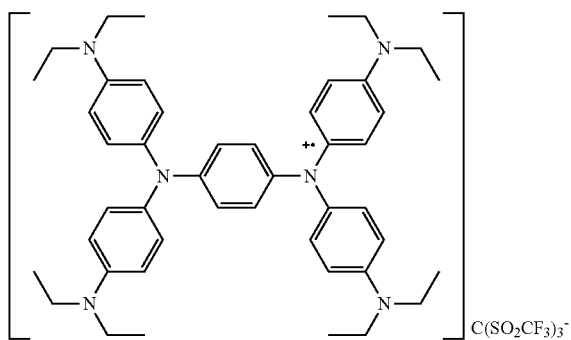

Compound (13)
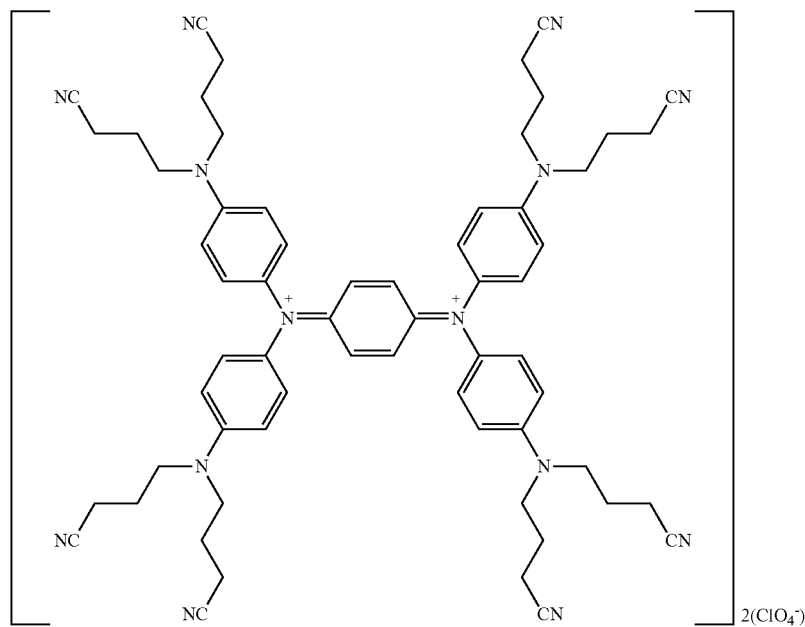
Compound (14)
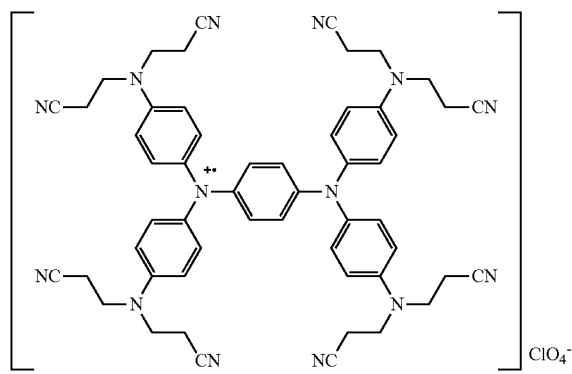
Compound (15)
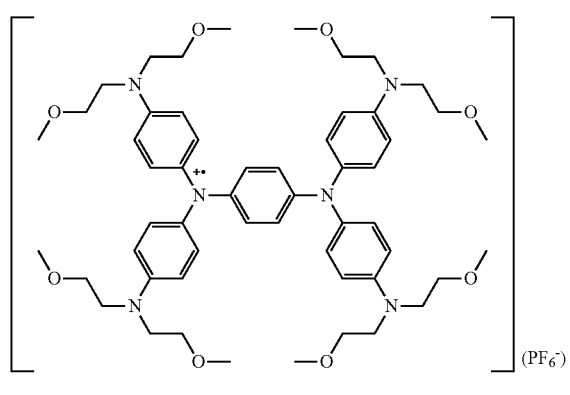
Compound (16)
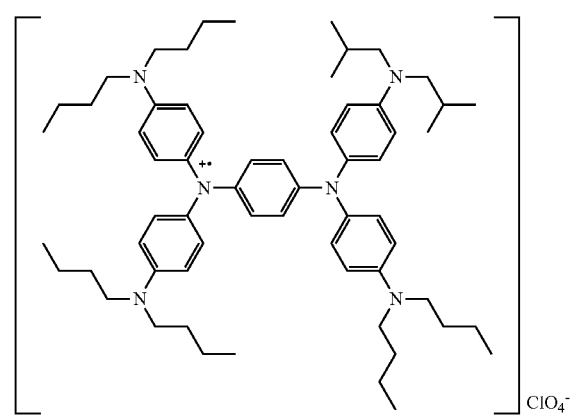

-continued
Compound (17)
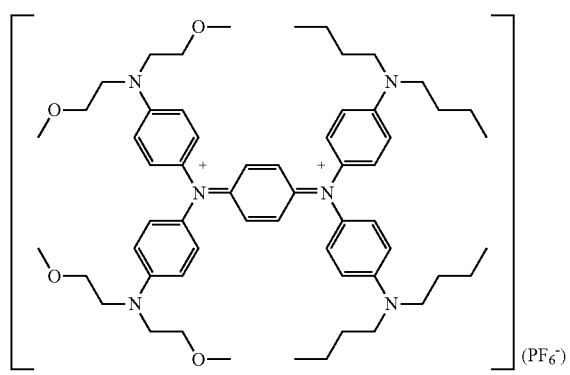
Compound (18)
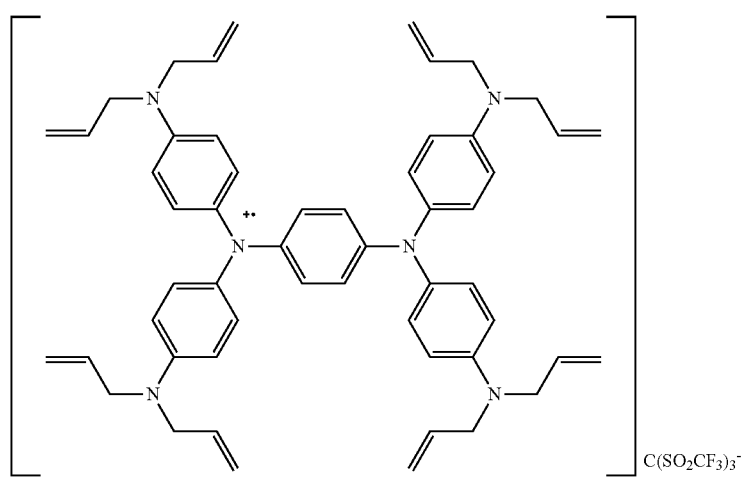
Compound (19)
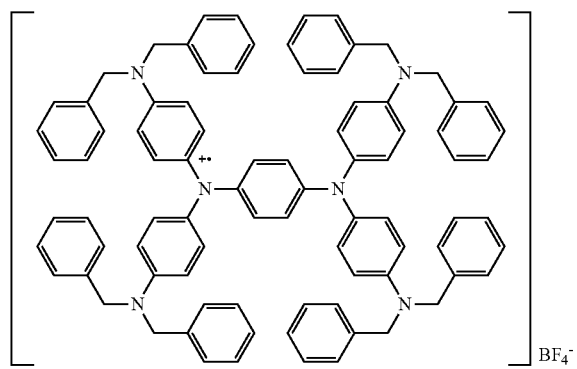
Compound (20)
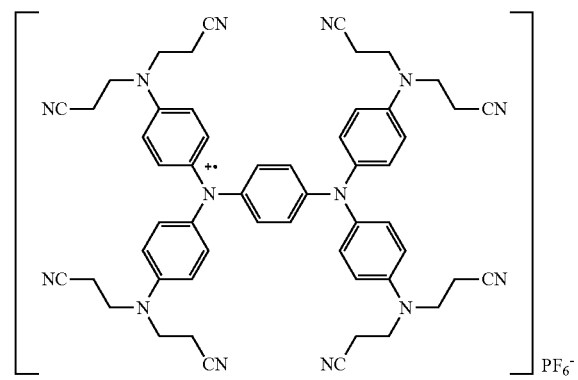
Compound (21)
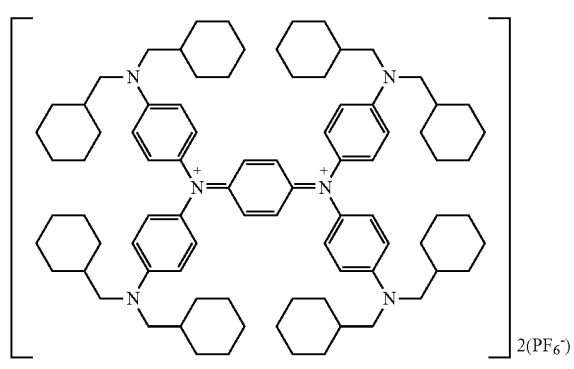
Compound (22)
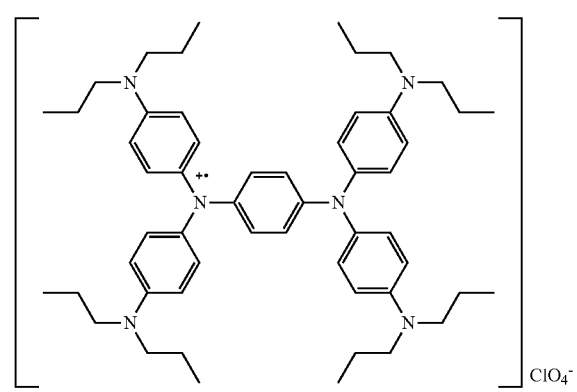

Compound (23)
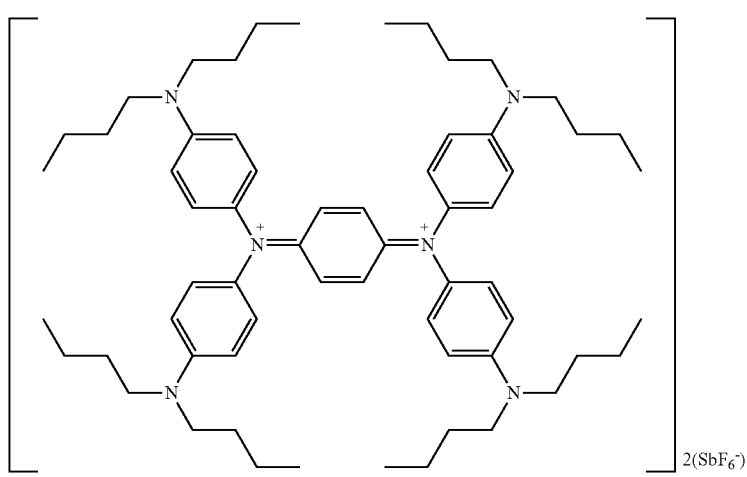
Compound (24)
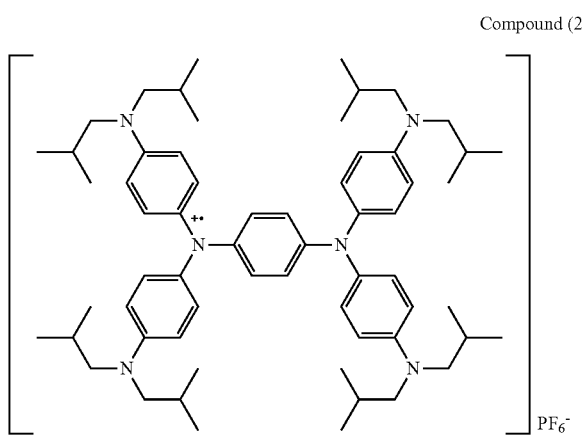
Compound (25)
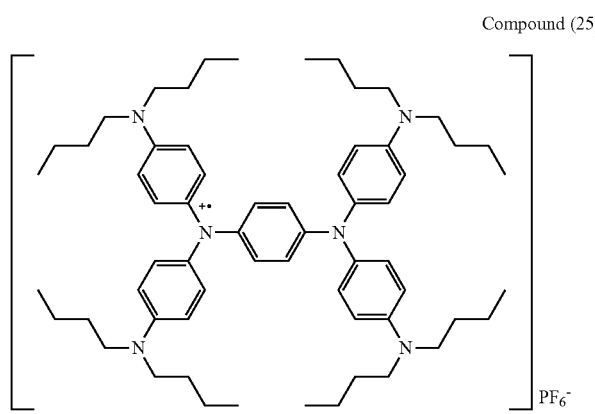
Compound (26)
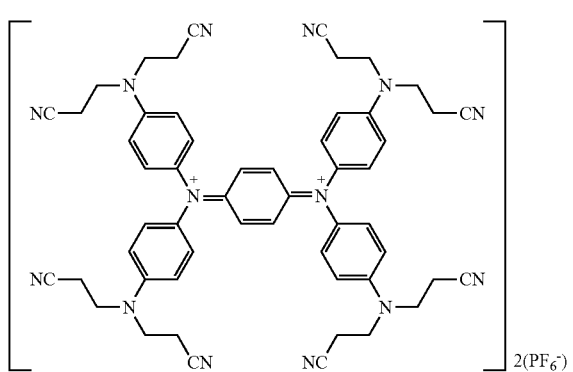

-continued
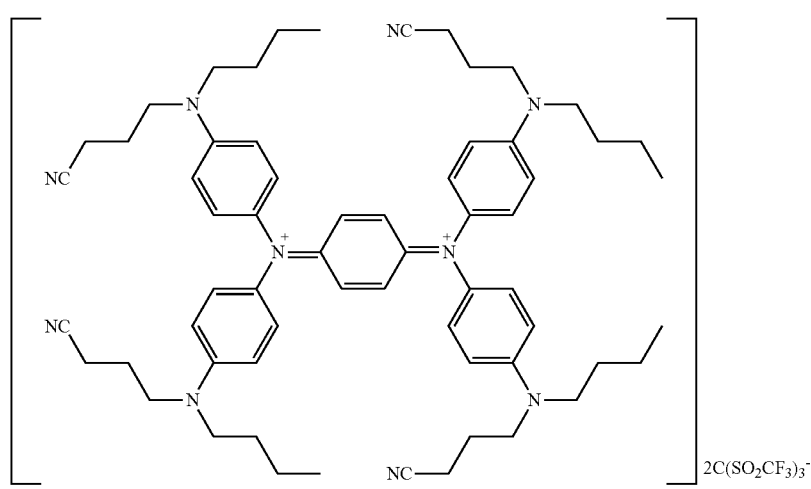
Compound (27)
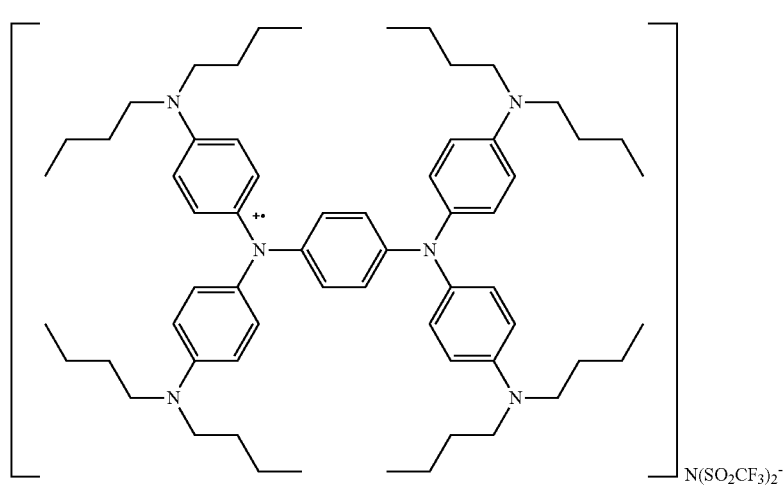
Compound (28)
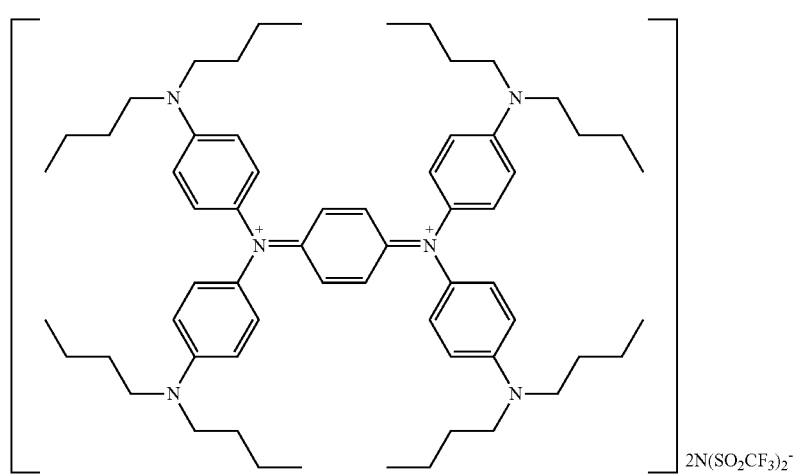
Compound (29)

-continued
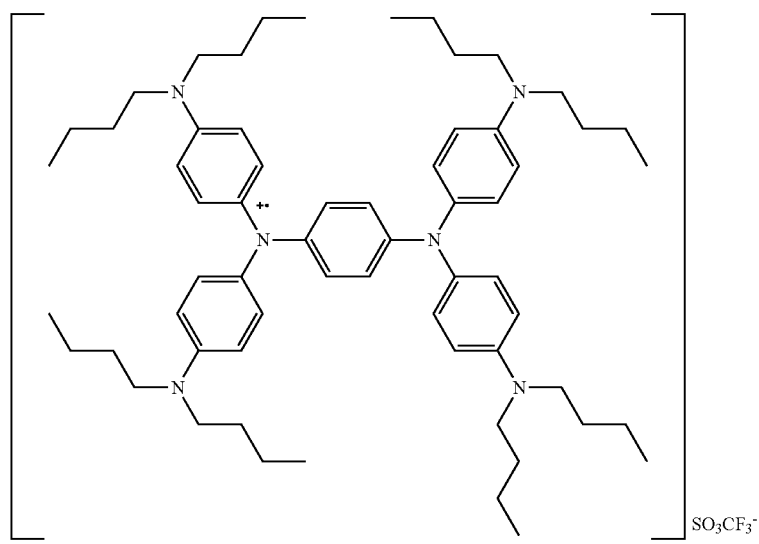
Compound (30)
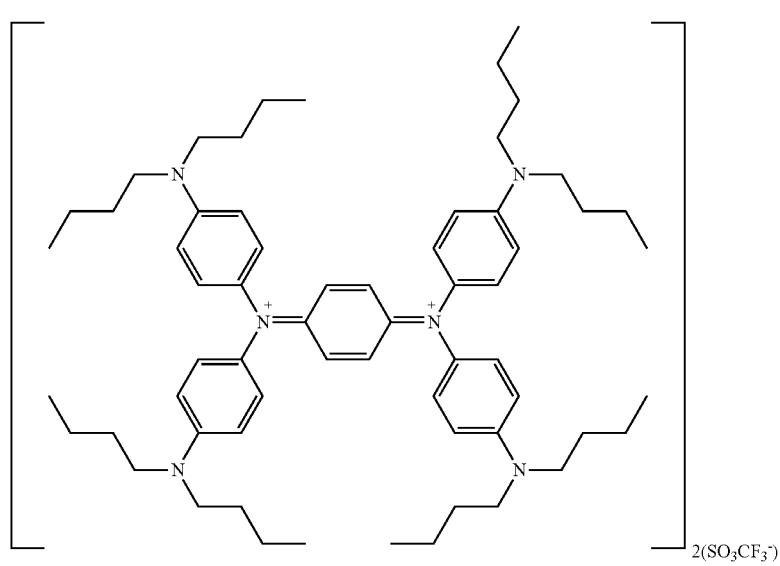
Compound (31)
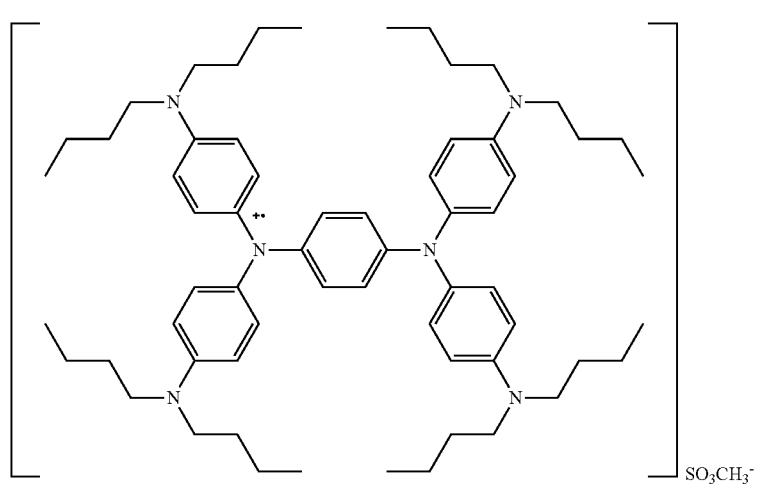
Compound (32)

Compound (33)
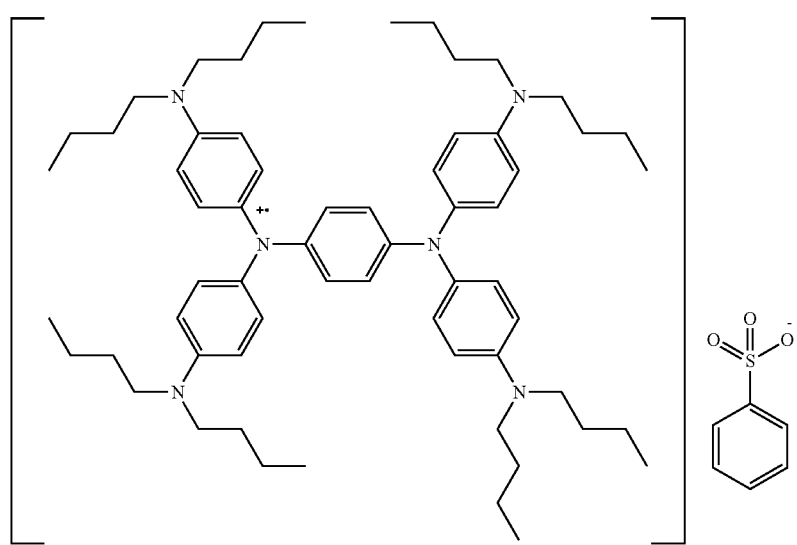
Compound (34)
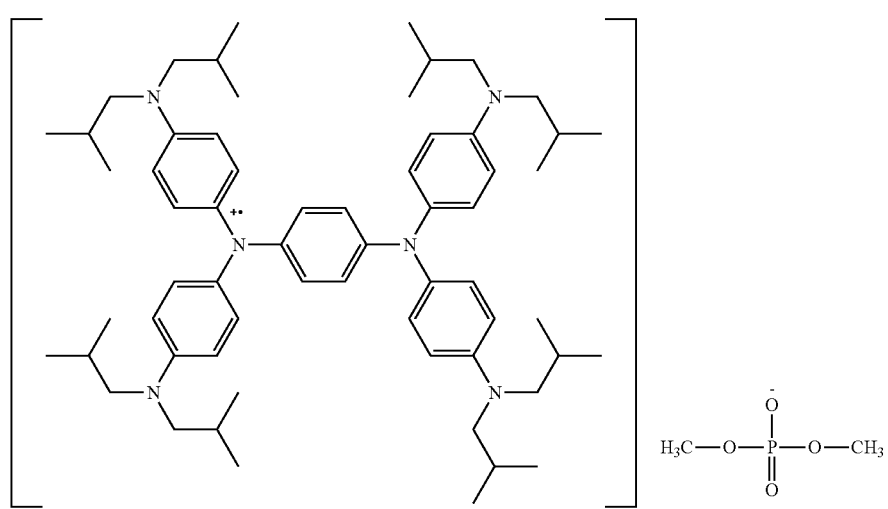
Compound (35)
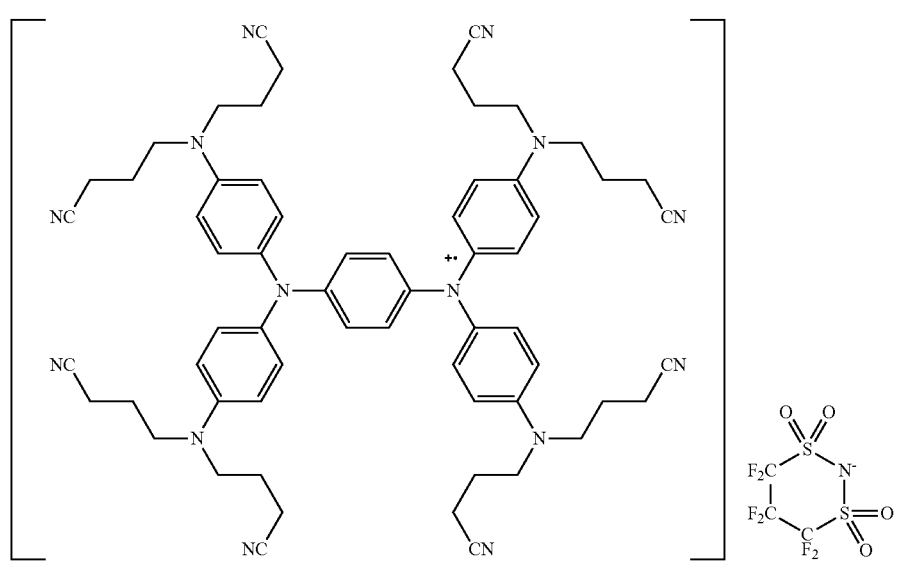

-continued
Compound (36)
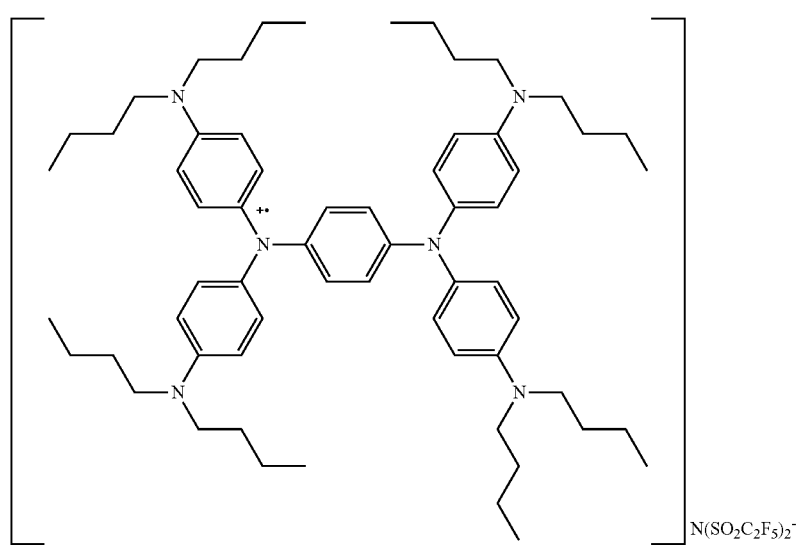
Compound (37)
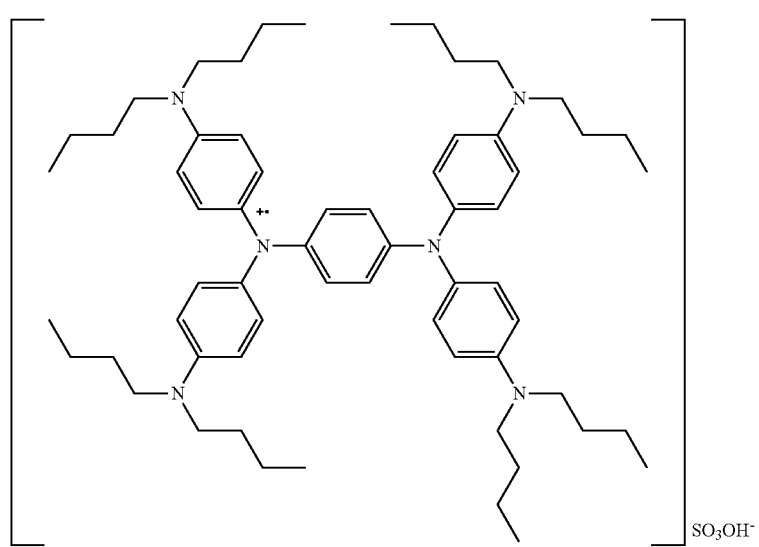
Compound (38)
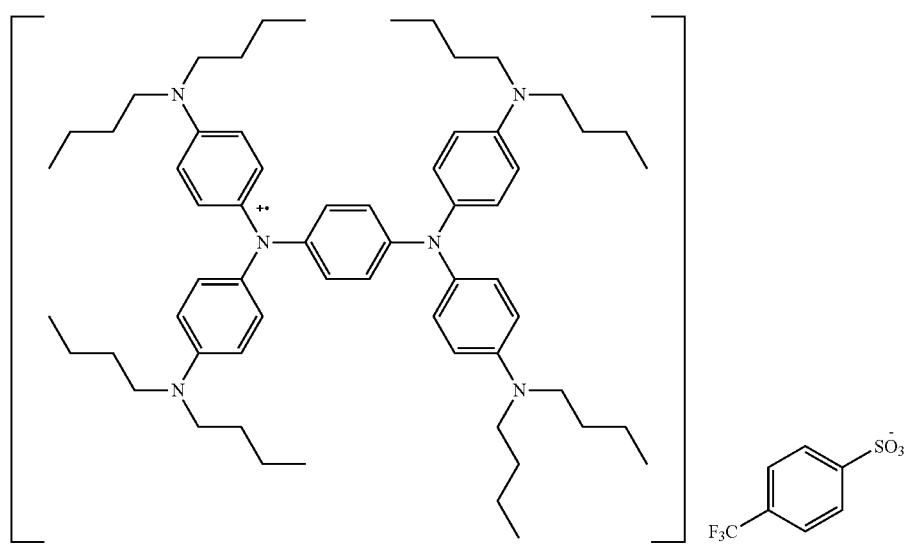

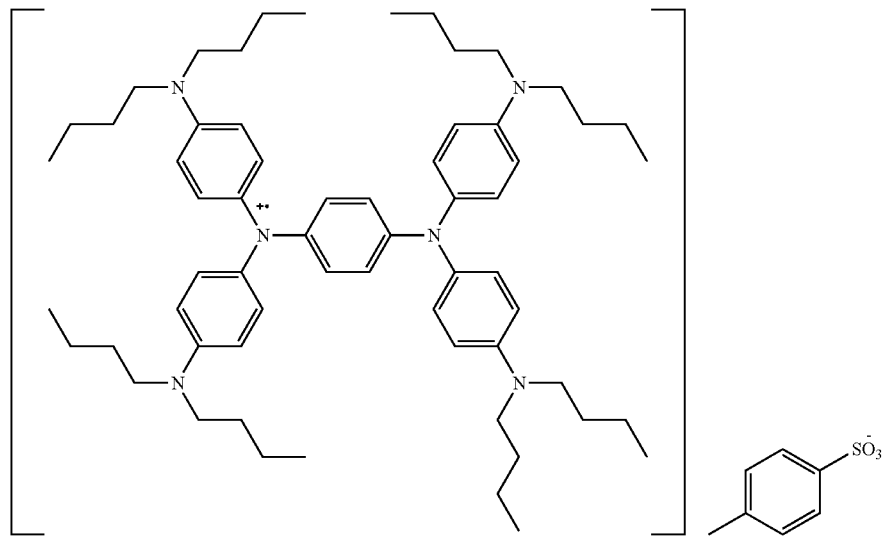

Compound (39)

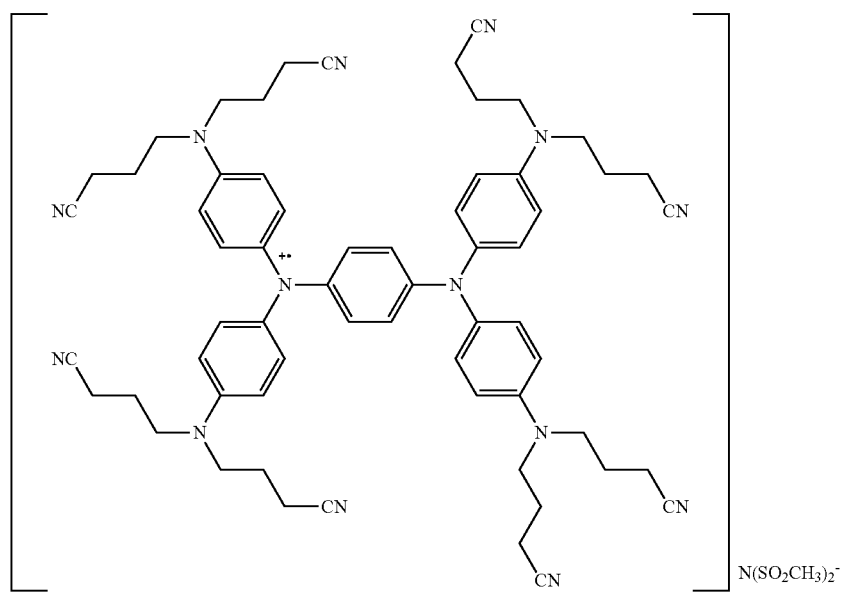

Compound (40)

Compound (1), (3), (5), (9), (11), (20), (22), (23), (25), (26), (30), (31), or (32) is preferably used as the first compound. The use of any such compound can provide an image that is excellent in light fastness and is improved in imbalance. Further, at least one kind of Compounds (1), (3), (20), (25), (30), and (32) is preferably used as the first compound from the viewpoint of an improvement in imbalance.

(i-3) Method of Synthesizing First Compound

The first compound may be synthesized with reference to a known method described in, for example, U.S. Pat. Nos. 3,251,881, 3,484,467, or Japanese Patent Application Laid-Open No. S61-69991.

More specifically, the first compound may be produced by, for example, the following method. That is, its main skeleton is formed by the Ullmann reaction, and nitrogen atoms to which $R_1$ to $R_8$ or $R'_1$ to $R'_8$ are to be bonded are reduced into amino groups by a reduction reaction to provide an amino form. Subsequently, the amino groups are selectively subjected to alkylation, alkenylation, aralkylation, arylation, alkynylation, and the like to be substituted with $R_1$ to $R_8$ or $R'_1$ to $R'_8$, followed by the performance of silver salt oxidation, an electrolytic oxidation reaction, or the like. Thus, the first compound may be obtained. In addition, when the first compound is asymmetric (e.g., when $R_1$ and $R_2$, and $R_5$ and $R_6$ in the general formula (1) are different from each other), the compound only needs to be synthesized by performing, for example, the alkylation in a plurality of stages.

(i-4) Features of First Compound

The first compound has the following features. That is, its local maximum absorption wavelength falls within the near infrared range of from 900 nm or more to 1,400 nm or less, and its molar extinction coefficient has a peak as large as from about several tens of thousands to about several hundreds of thousands. Further, the compound shows small absorption in a visible region, and hence even when the compound is added to a dye composition (ink), the compound has substantially no risk of causing a change in color tone of a dye (colorant) or the fading thereof. In addition, even when the compound is added to a protective layer, the color tone of an image is not impaired.

(ii) Yellow Dye (Compounds Represented by General Formulae (3) to (6))

The first thermal transfer recording sheet contains at least one kind selected from the group of compounds represented by the general formulae (3) to (6) as the yellow dye in the yellow dye layer. That is, those compounds may be used alone or in combination thereof as the yellow dye.

(ii-1) Compound Represented by General Formula (3)

First, the compound (yellow dye) represented by the general formula (3) is described.

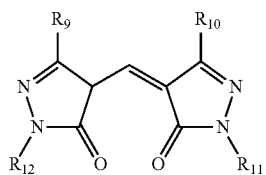

General formula (3)

In the general formula (3), $R_9$ to $R_{12}$ each independently represent an alkyl group, or a substituted or unsubstituted aryl group.

In the general formula (3), the alkyl group that may be represented by any one of $R_9$ to $R_{12}$ is not particularly limited, and is, for example, a linear, branched, or cyclic alkyl group having 1 or more and 20 or less carbon atoms.

Examples of the alkyl group include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. Of those alkyl groups, an alkyl group having 1 or more and 4 or less carbon atoms is preferred because an image that is excellent in light fastness and is improved in imbalance can be easily obtained.

In the general formula (3), the substituted or unsubstituted aryl group that may be represented by any one of $R_9$ to $R_{12}$ is not particularly limited. A substituent thereof may be, for example, an alkyl group. In addition, the total number of carbon atoms of the aryl group including the substituent may be set to, for example, 6 or more and 10 or less.

Examples of the substituted or unsubstituted aryl group include a phenyl group, a 2-methylphenyl group, a 3-methylphenyl group, a 4-methylphenyl group, and a naphthyl group. Of those aryl groups, a phenyl group is preferred because an image that is excellent in light fastness and is improved in imbalance can be easily obtained.

Compounds (41) to (48) are shown below as specific examples of the compound represented by the general formula (3), but the specific examples are not limited to the compounds.

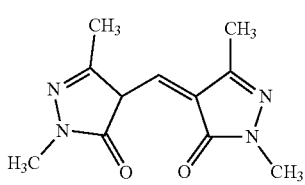

Compound (41)

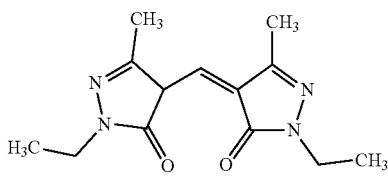

Compound (42)

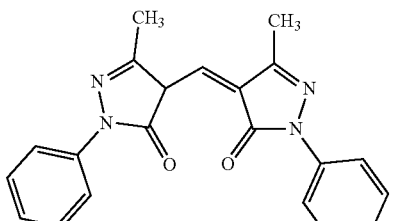

Compound (43)

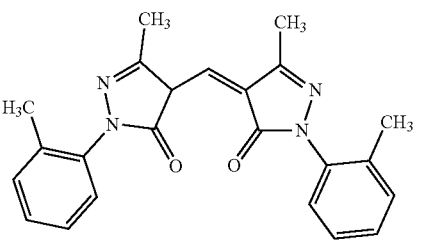

Compound (44)

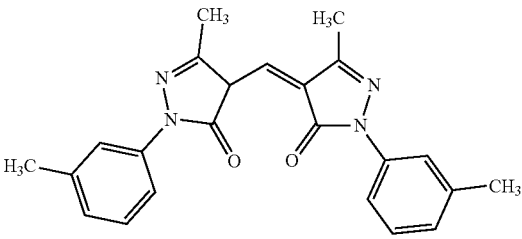

Compound (45)

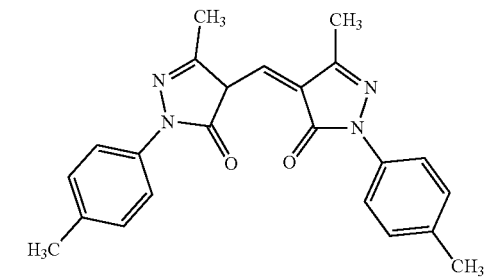

Compound (46)

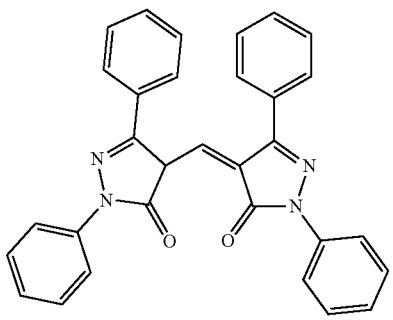

Compound (47)

Compound (48)

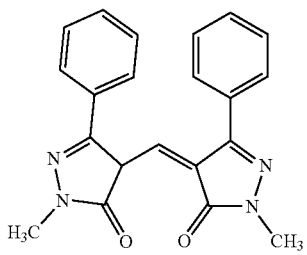

Of the compounds each represented by the general formula (3), at least one kind of Compounds (43) to (46) is preferably used as the yellow dye. In addition, Compound (43) is more preferably used as the compound represented by the general formula (3) because an image that is excellent in light fastness and is improved in imbalance can be easily obtained.

(ii-2) Compound Represented by General Formula (4)

Next, the compound (yellow dye) represented by the general formula (4) is described.

General formula (4)

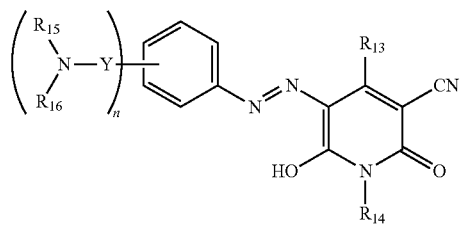

In the general formula (4), $R_{13}$ represents an alkyl group, a substituted or unsubstituted aryl group, or a substituted or unsubstituted amino group. $R_{14}$ represents a hydrogen atom, an alkyl group, a substituted or unsubstituted aryl group, or $-N(-R_a)R_b$, provided that $R_a$ and $R_b$ each independently represent a hydrogen atom, an alkyl group, or an acyl group. In addition, $R_a$ and $R_b$ may form a cyclic structure together with a nitrogen atom to which $R_a$ and $R_b$ are bonded. $R_{15}$ represents an alkyl group. $R_{16}$ represents a hydrogen atom or an alkyl group. Y represents a carbonyl group or a sulfonyl group. "n" represents an integer of from 1 to 3.

In the general formula (4), the alkyl group that may be represented by $R_{13}$ is not particularly limited, and is, for example, a linear or branched alkyl group having 1 or more and 4 or less carbon atoms, such as a methyl group, an ethyl group, a propyl group, or a butyl group.

In the general formula (4), the substituted or unsubstituted aryl group that may be represented by $R_{13}$ is not particularly limited. A substituent thereof may be, for example, an alkyl group, such as a methyl group. In addition, the total number of carbon atoms of the aryl group including the substituent may be set to, for example, 6 or more and 12 or less.

Examples of the substituted or unsubstituted aryl group include a phenyl group, a 2-methylphenyl group, a 3-methylphenyl group, and a 4-methylphenyl group.

In the general formula (4), the substituted or unsubstituted amino group that may be represented by $R_{13}$ ($-NH_2$, $-NHRc$, or $-NRcRd$ (Rc and Rd each represent a substituent)) is not particularly limited. A substituent thereof may be, for example, an alkyl group, such as a methyl group or an ethyl group.

Examples of the substituted or unsubstituted amino group include a monomethylamino group, a dimethylamino group, and a diethylamino group.

$R_{13}$ preferably represents an alkyl group out of those groups because an image that is excellent in light fastness and is improved in imbalance can be easily obtained, and $R_{13}$ more preferably represents a methyl group.

In the general formula (4), the alkyl group that may be represented by $R_{14}$ is not particularly limited, and is, for example, a linear, branched, or cyclic alkyl group having 1 or more and 20 or less carbon atoms.

More specific examples thereof include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of those alkyl groups, a methyl group, an ethyl group, an n-propyl group, an iso-propyl group, an n-butyl group, and a 2-ethylhexyl group are preferred because an image that is excellent in light fastness and is improved in imbalance can be easily obtained. In particular, an ethyl group and an n-propyl group are more preferred.

In the general formula (4), the substituted or unsubstituted aryl group that may be represented by $R_{14}$ is not particularly limited, and examples thereof may include the same aryl groups as those each represented by $R_{13}$ in the general formula (4).

In the general formula (4), when $R_{14}$ represents $-N(-R_a)R_b$, the alkyl group that may be represented by any one of $R_a$ and $R_b$ is not particularly limited, and examples thereof may include the same alkyl groups as those each represented by $R_{14}$ in the general formula (4). In addition, the acyl group that may be represented by any one of $R_a$ and $R_b$ is not particularly limited, and examples thereof include: alkylcarbonyl groups, such as an acetyl group and an ethylhexanoyl group; and arylcarbonyl groups, such as a benzoyl group.

In the general formula (4), when $R_{14}$ represents $-N(-R_a)R_b$, the cyclic structure formed together with the nitrogen atom to which $R_a$ and $R_b$ are bonded may be appropriately selected from the viewpoints of the light fastness and imbalance of an image. Examples of the cyclic structure include a pyrrolidine ring, a piperidine ring, an azepane ring, and an azocane ring.

A case in which at least one of $R_a$ and $R_b$ represents an alkyl group out of those groups is preferred because an image that is excellent in light fastness and is improved in imbalance can be easily obtained. Further, a case in which at least one of $R_a$ and $R_b$ represents a methyl group is more preferred.

In the general formula (4), the alkyl group that may be represented by any one of $R_{15}$ and $R_{16}$ is not particularly limited. Examples of the alkyl group may include the same alkyl groups as those each represented by $R_{14}$ in the general formula (4).

In addition, $R_{15}$ and $R_{16}$ preferably each independently represent any one of the following groups out of those groups because an image that is excellent in light fastness and is improved in imbalance can be easily obtained. That is, an ethyl group, an n-butyl group, a sec-butyl group, a dodecyl group, a cyclohexyl group, a methylcyclohexyl group, a 2-ethylpropyl group, and a 2-ethylhexyl group are preferred, and an n-butyl group and a 2-ethylhexyl group are more preferred. In addition, a case in which $R_{15}$ and $R_{16}$ represent the same alkyl group is preferred because an image that is excellent in light fastness and is improved in imbalance can be easily obtained.

In the general formula (4), Y may represent a carbonyl group or a sulfonyl group, but a case in which Y represents a carbonyl group is preferred because an image that is excellent in light fastness and is improved in imbalance can be easily obtained.

In the general formula (4), "n" represents an integer of from 1 to 3 (an integer of 1 or more and 3 or less), but a case in which "n" represents 1 is preferred because an image that is excellent in light fastness and is improved in imbalance can be easily obtained.

An azo form is shown in the general formula (4), but a hydrazo form serving as a tautomer is also included in the formula.

In addition, in the general formula (4), the connection site of the $R_{15}(R_{16}-)N-Y-$ group with respect to the phenyl group is not particularly limited, and may be appropriately set.

Compounds (49) to (53) are shown below as specific examples of the compound represented by the general formula (4), but the specific examples are not limited to the compounds.

Compound (49)

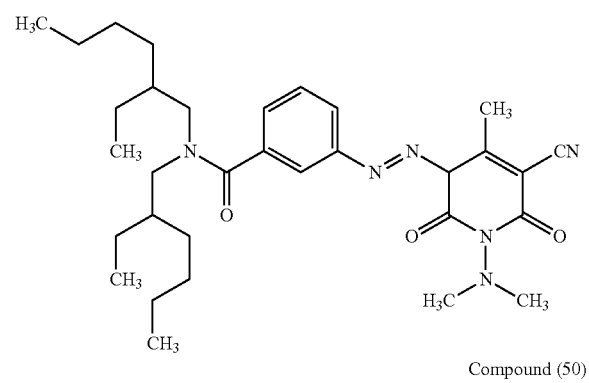

Compound (50)

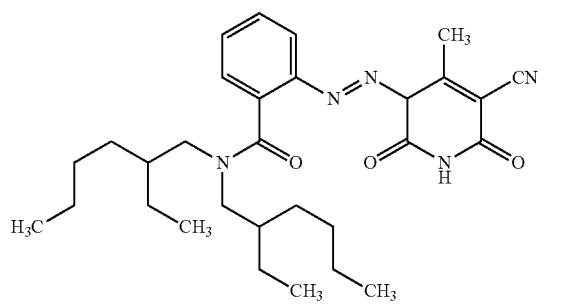

Compound (51)

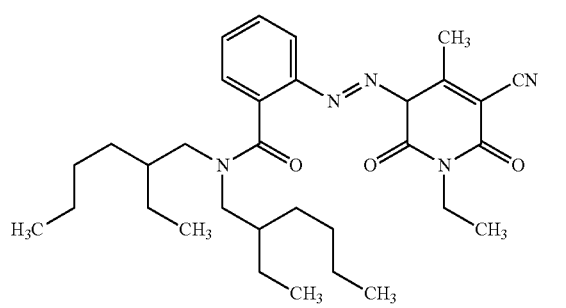

Compound (52)

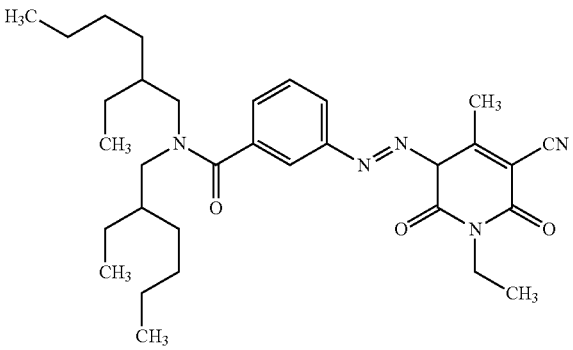

Compound (53)

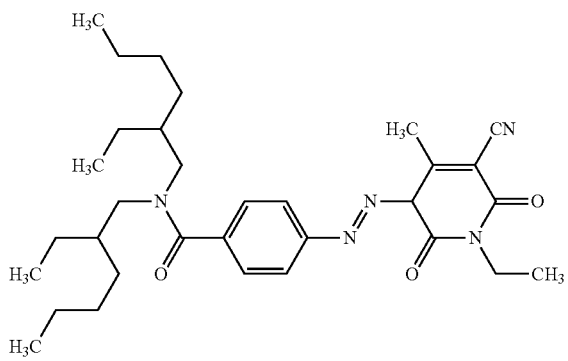

Of the compounds each represented by the general formula (4), at least one kind of Compounds (51), (52), and (53) is preferably used as the yellow dye because an image that is excellent in light fastness and is improved in imbalance can be easily obtained.

(ii-3) Compound Represented by General Formula (5)

Next, the compound (yellow dye) represented by the general formula (5) is described.

General formula (5)

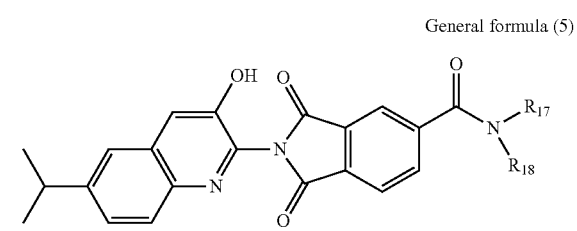

In the general formula (5), $R_{17}$ and $R_{18}$ each independently represent an alkyl group or an aryl group.

In the general formula (5), the alkyl group that may be represented by any one of $R_{17}$ and $R_{18}$ is not particularly limited, and examples thereof may include the same alkyl groups as those each represented by $R_{14}$ in the general formula (4). In addition, of those alkyl groups, a linear or branched alkyl group having 1 or more and 8 or less carbon atoms (e.g., a propyl group, a butyl group, or a 2-ethylhexyl group) is preferred because an image that is excellent in light fastness and is improved in imbalance can be easily obtained. Further, $R_{17}$ and $R_{18}$ more preferably each represent a butyl group from the viewpoints of the light fastness and the imbalance.

In the general formula (5), the aryl group that may be represented by any one of $R_{17}$ and $R_{18}$ is not particularly limited, and examples thereof include a phenyl group and a naphthyl group. Of those aryl groups, a phenyl group is preferred because an image that is excellent in light fastness and is improved in imbalance can be easily obtained.

Compounds (54) to (59) are shown below as specific examples of the compound represented by the general formula (5), but the specific examples are not limited to the compounds.

Compound (54)

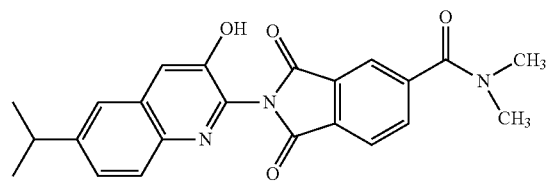

Compound (55)

Compound (56)

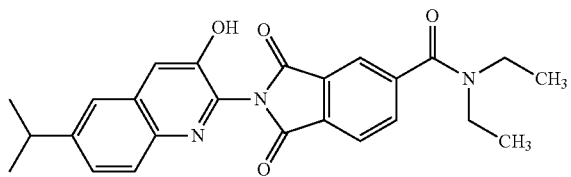

Compound (57)

Compound (58)

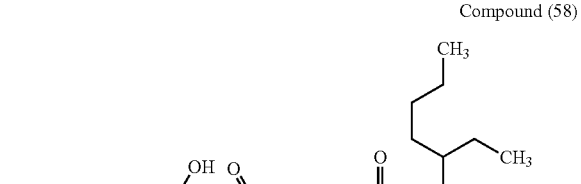

Compound (59)

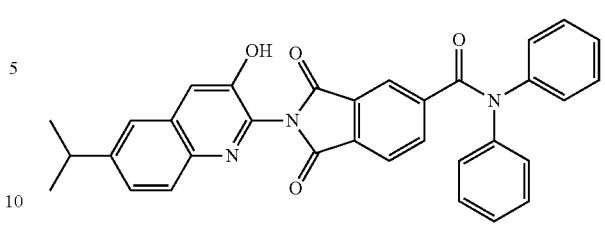

Of the compounds each represented by the general formula (5), at least one kind of Compounds (56) to (58) is preferably used as the yellow dye. In addition, Compound (57) is more preferably used as the compound represented by the general formula (5) because an image that is excellent in light fastness and is improved in imbalance can be easily obtained.

(ii-4) Compound Represented by General Formula (6)

Next, the compound (yellow dye) represented by the general formula (6) is described.

General formula (6)

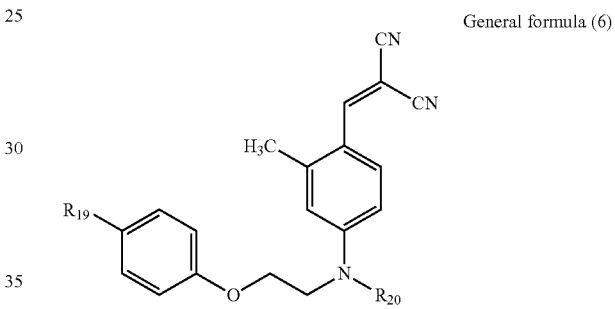

In the general formula (6), $R_{19}$ and $R_{20}$ each independently represent an alkyl group or an aryl group.

In the general formula (6), the alkyl group that may be represented by any one of $R_{19}$ and $R_{20}$ is not particularly limited, and is, for example, a linear, branched, or cyclic alkyl group having 1 or more and 20 or less carbon atoms. More specific examples thereof include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group.

Of those alkyl groups, $R_{19}$ preferably represents a linear, branched, or cyclic alkyl group having 1 or more and 6 or less carbon atoms, more preferably represents a methyl group, a butyl group, or a cyclohexyl group, and still more preferably represents a cyclohexyl group.

Of those alkyl groups, $R_{20}$ preferably represents a linear alkyl group having 1 or more and 8 or less carbon atoms, more preferably represents a methyl group, an ethyl group, or an octyl group, and still more preferably represents an ethyl group from the viewpoints of the light fastness and the imbalance.

In the general formula (6), the aryl group that may be represented by any one of $R_{19}$ and $R_{20}$ is not particularly limited, and examples thereof include a phenyl group and a naphthyl group. Of those aryl groups, a phenyl group is preferred because an image that is excellent in light fastness and is improved in imbalance can be easily obtained.

Compounds (60) to (64) are shown below as specific examples of the compound represented by the general formula (6), but the specific examples are not limited to the compounds.

Of the compounds each represented by the general formula (6), one, or each of both, of Compounds (63) and (64) is preferably used as the yellow dye. In addition, Compound (63) is more preferably used as the compound represented by the general formula (6) because an image that is excellent in light fastness and is improved in imbalance can be easily obtained.

(ii-5) Other Compounds

At the time of the formation of the yellow dye layer, an existing yellow dye may be added to its dye composition for a toning purpose in addition to the compounds represented by the general formulae (3) to (6). Examples of the existing yellow dye may include, but not limited to, Compounds (65) and (66).

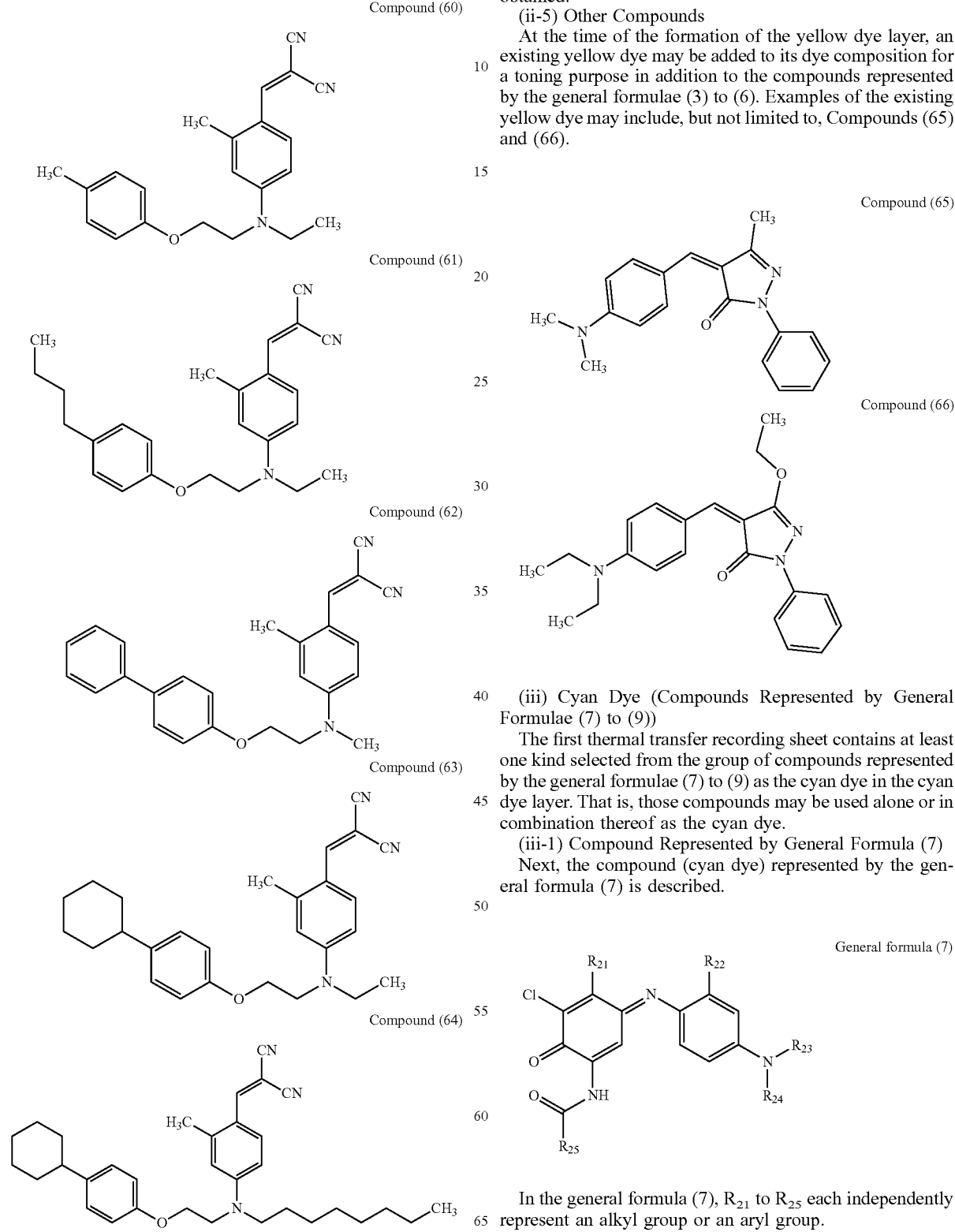

(iii) Cyan Dye (Compounds Represented by General Formulae (7) to (9))

The first thermal transfer recording sheet contains at least one kind selected from the group of compounds represented by the general formulae (7) to (9) as the cyan dye in the cyan dye layer. That is, those compounds may be used alone or in combination thereof as the cyan dye.

(iii-1) Compound Represented by General Formula (7)

Next, the compound (cyan dye) represented by the general formula (7) is described.

In the general formula (7), $R_{21}$ to $R_{25}$ each independently represent an alkyl group or an aryl group.

In the general formula (7), the alkyl group and the aryl group each of which may be represented by any one of $R_{21}$ to $R_{25}$ are not particularly limited, and examples thereof may include the same alkyl groups and aryl groups as those represented by $R_{19}$ and $R_{20}$ in the general formula (6). In addition, the alkyl group is preferably a linear or branched alkyl group having 1 or more and 4 or less carbon atoms because an image that is excellent in light fastness and is improved in imbalance can be easily obtained, and the group is more preferably a methyl group, an ethyl group, an n-butyl group, or a tert-butyl group, still more preferably a methyl group or an ethyl group. In addition, the aryl group is preferably a phenyl group because an image that is excellent in light fastness and is improved in imbalance can be easily obtained.

Compounds (67) to (73) are shown below as specific examples of the compound represented by the general formula (7), but the specific examples are not limited to the compounds.

Compound (67)

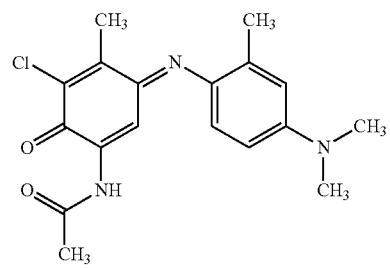

Compound (68)

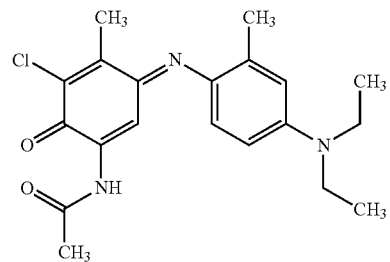

Compound (69)

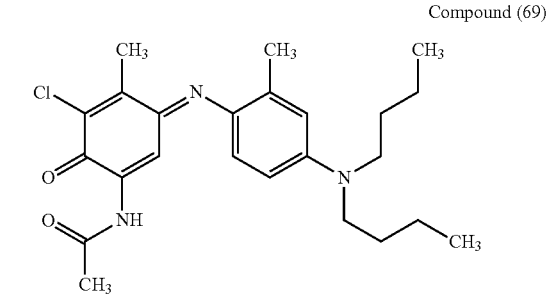

Compound (70)

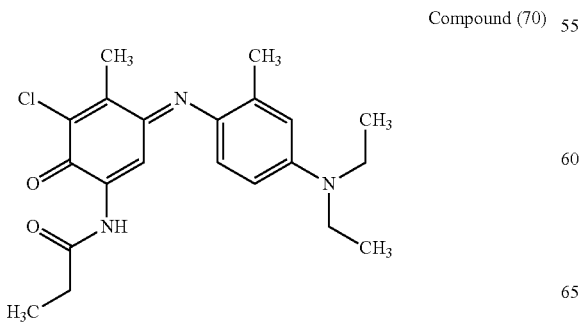

Compound (71)

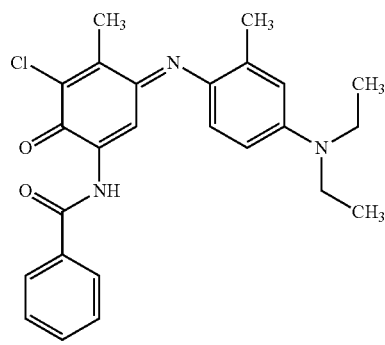

Compound (72)

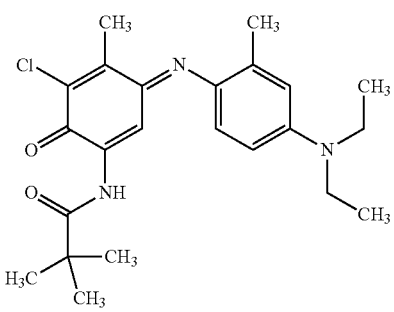

Compound (73)

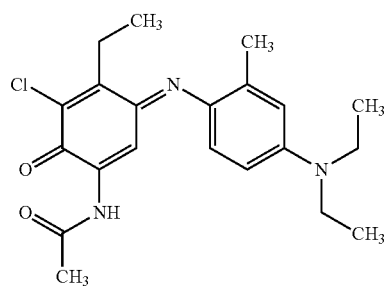

Of the compounds each represented by the general formula (7), at least one kind of Compounds (67) to (69) is preferably used as the cyan dye. In addition, Compound (68) is more preferably used as the compound represented by the general formula (7) because an image that is excellent in light fastness and is improved in imbalance can be easily obtained.

(iii-2) Compound Represented by General Formula (8)

Next, the compound (cyan dye) represented by the general formula (8) is described.

General formula (8)

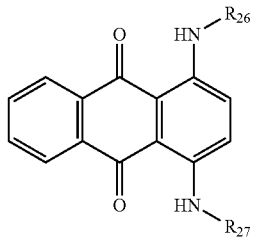

In the general formula (8), $R_{26}$ and $R_{27}$ each independently represent an alkyl group, or a substituted or unsubstituted aryl group.

In the general formula (8), the alkyl group that may be represented by any one of $R_{26}$ and $R_{27}$ is not particularly limited, and examples thereof may include the same alkyl groups as those represented by $R_{19}$ and $R_{20}$ in the general formula (6). The alkyl group is preferably a linear alkyl group having 1 or more and 4 or less carbon atoms because an image that is excellent in light fastness and is improved in imbalance can be easily obtained, and the group is more preferably a methyl group or a butyl group.

In the general formula (8), the substituted or unsubstituted aryl group that may be represented by any one of $R_{26}$ and $R_{27}$ is not particularly limited. A substituent thereof may be, for example, an alkyl group. In addition, the total number of carbon atoms of the aryl group including the substituent may be set to, for example, 6 or more and 10 or less.

Examples of the substituted or unsubstituted aryl group include a phenyl group, a tolyl group (e.g., a 3-methylphenyl group), a p-(n-butyl)phenyl group, and a naphthyl group. Of those aryl groups, a tolyl group is preferred because an image that is excellent in light fastness and is improved in imbalance can be easily obtained.

Compounds (74) to (79) are shown below as specific examples of the compound represented by the general formula (8), but the specific examples are not limited to the compounds.

Compound (74)

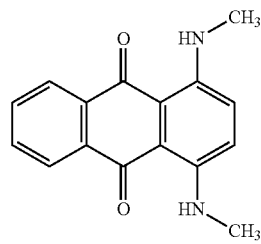

Compound (75)

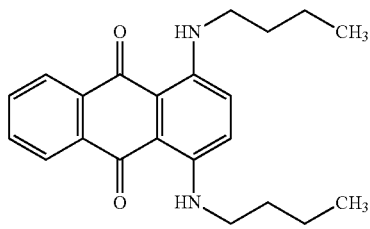

Compound (76)

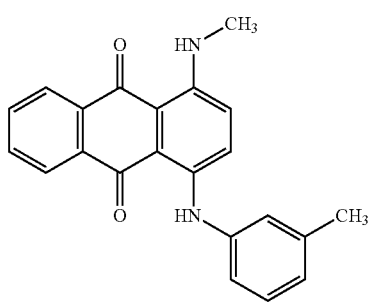

Compound (77)

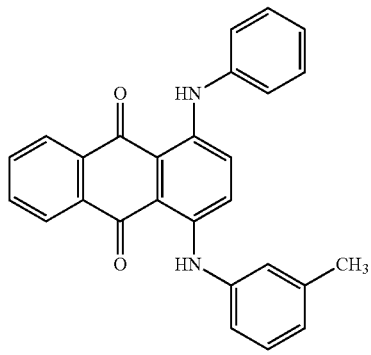

Compound (78)

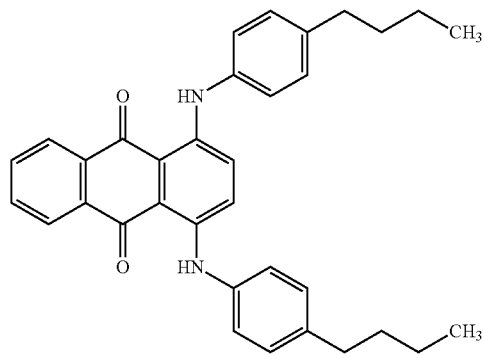

Compound (79)

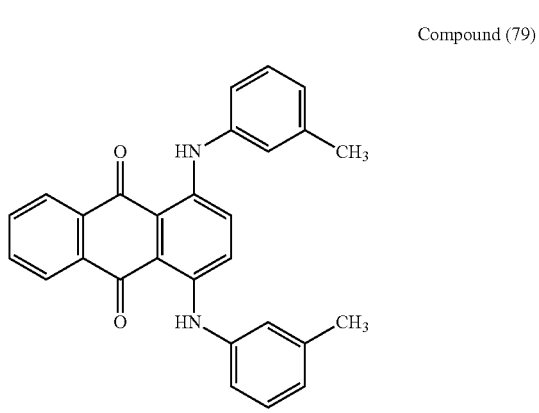 [SMILES: Cc1cccc(Nc2ccc(Nc3cccc(C)c3)c3c2C(=O)c2ccccc2C3=O)c1]

Of the compounds each represented by the general formula (8), at least one kind of Compounds (75) to (77) is preferably used as the cyan dye. In addition, Compound (76) is more preferably used as the compound represented by the general formula (8) because an image that is excellent in light fastness and is improved in imbalance can be easily obtained.

(iii-3) Compound Represented by General Formula (9)

Next, the compound (cyan dye) represented by the general formula (9) is described.

General formula (9)

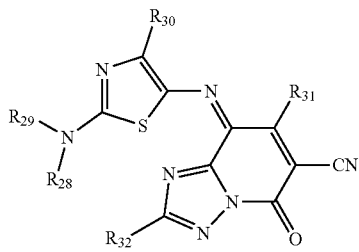

In the general formula (9), $R_{28}$ to $R_{32}$ each independently represent an alkyl group or an aryl group.

In the general formula (9), the alkyl group that may be represented by any one of $R_{28}$ to $R_{32}$ is not particularly limited, and is, for example, a linear, branched, or cyclic alkyl group having 1 or more and 20 or less carbon atoms.

More specific examples thereof include a methyl group, an ethyl group, an n-propyl group, an iso-propyl group, an n-butyl group, a sec-butyl group, a tert-butyl group, an iso-pentyl group, an octyl group, a dodecyl group, a nonadecyl group, a cyclobutyl group, a cyclopentyl group, a cyclohexyl group, a methylcyclohexyl group, a 2-ethylpropyl group, a 1-ethylpentyl group, and a 2-ethylhexyl group. Of those, a linear or branched alkyl group having 1 or more and 8 or less carbon atoms is preferred because an image that is excellent in light fastness and is improved in imbalance can be easily obtained, and a methyl group, a 1-ethylpentyl group, or a 2-ethylhexyl group is more preferred.

In the general formula (9), the aryl group that may be represented by any one of $R_{28}$ to $R_{32}$ is not particularly limited, and examples thereof include a phenyl group and a naphthyl group. Of those aryl groups, a phenyl group is preferred because an image that is excellent in light fastness and is improved in imbalance can be easily obtained.

Compounds (80) to (85) are shown below as specific examples of the compound represented by the general formula (9), but the specific examples are not limited to the compounds.

Compound (80)

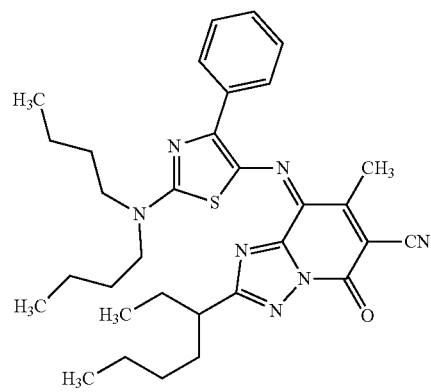

Compound (81)

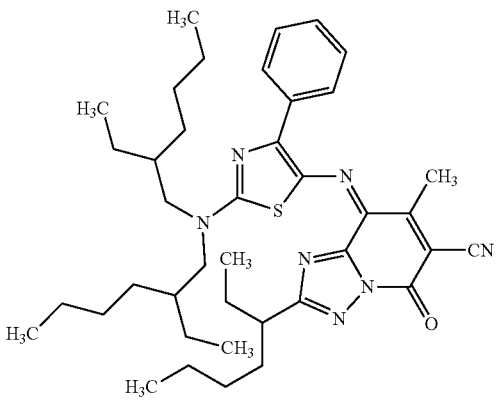

Compound (82)

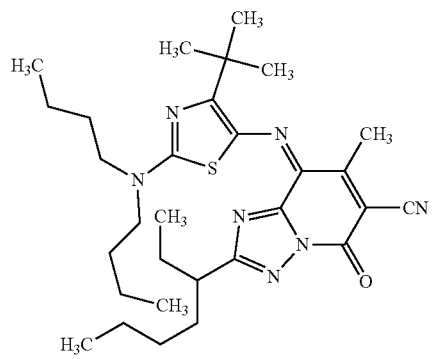

Compound (83)

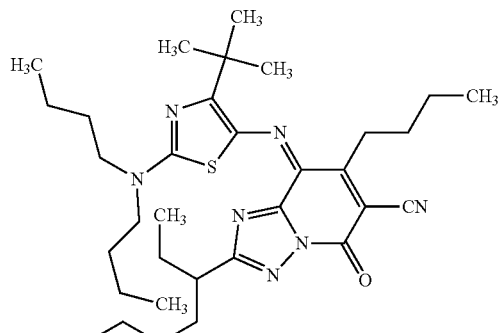

Compound (84)

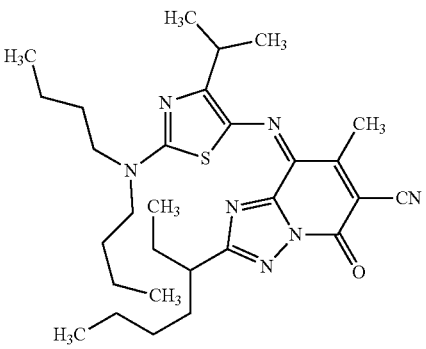

Compound (85)

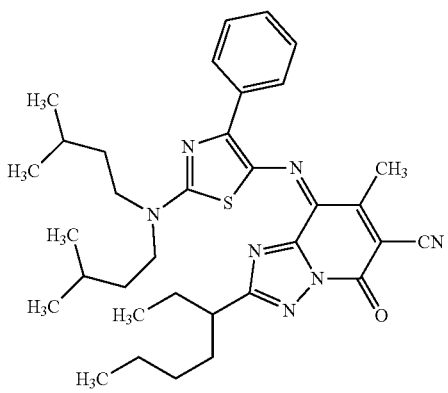

Of the compounds each represented by the general formula (9), at least one kind of Compounds (80), (81), and (85) is preferably used as the cyan dye. In addition, Compound (80) is more preferably used as the compound represented by the general formula (9) because an image that is excellent in light fastness and is improved in imbalance can be easily obtained.

An existing cyan dye may be used as a cyan dye in combination with those compounds represented by the general formulae (7) to (9).

(iv) Magenta Dye (Compounds Represented by General Formulae (10) to (14))

The first thermal transfer recording sheet preferably contains at least one kind selected from the group of compounds represented by the general formulae (10) to (14) as the magenta dye in the magenta dye layer. That is, those compounds may be used alone or in combination thereof as the magenta dye.

(iv-1) Compound Represented by General Formula (10)

Next, the compound (magenta dye) represented by the general formula (10) is described.

General formula (10)

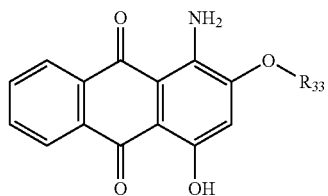

In the general formula (10), $R_{33}$ represents an alkyl group that may contain an oxygen atom in an ether functional group, or a substituted or unsubstituted aryl group.

In the general formula (10), the alkyl group that may contain an oxygen atom in an ether functional group, which may be represented by $R_{33}$, is not particularly limited, and is, for example, a linear, branched, or cyclic alkyl group having 1 or more and 20 or less carbon atoms that may contain an oxygen atom in an ether functional group.

More specific examples of the alkyl group that may contain an oxygen atom in an ether functional group include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, a 2-ethylhexyl group, and an ethoxyethoxyethyl group. Of those, a linear or branched alkyl group having 1 or more and 8 or less carbon atoms that may contain an oxygen atom in an ether functional group is preferred because an image that is excellent in light fastness and is improved in imbalance can be easily obtained. Examples of the alkyl group having 1 or more and 8 or less carbon atoms may include a methyl group, a 2-ethylhexyl group, and an ethoxyethoxyethyl group.

In the general formula (10), the substituted or unsubstituted aryl group that may be represented by $R_{33}$ is not particularly limited. Examples of a substituent thereof may include an alkyl group and an alkoxy group. In addition, the total number of carbon atoms of the aryl group including the substituent may be set to, for example, 6 or more and 10 or less.

Examples of the substituted or unsubstituted aryl group include a phenyl group, a 2-methylphenyl group, a 3-methylphenyl group, a 4-methylphenyl group, a naphthyl group, and a p-methoxyphenyl group. Of those, a phenyl group, a 2-methylphenyl group, a 3-methylphenyl group, a 4-methylphenyl group, a methoxyphenyl group, and a naphthyl group are preferred because an image that is excellent in light fastness and is improved in imbalance can be easily obtained, and a phenyl group and a 3-methylphenyl group are more preferred.

Compounds (86) to (94) are shown below as specific examples of the compound represented by the general formula (10), but the specific examples are not limited to the compounds.

Compound (86)

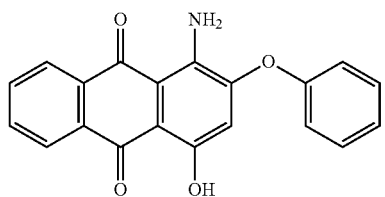

Compound (87)

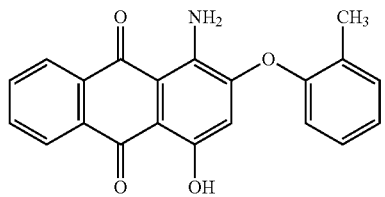

Compound (88)

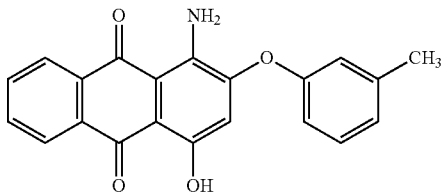

Compound (89)

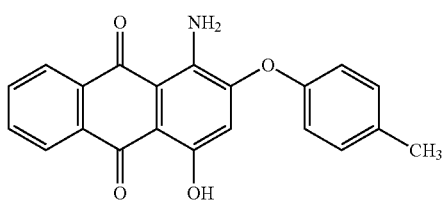

Compound (90)

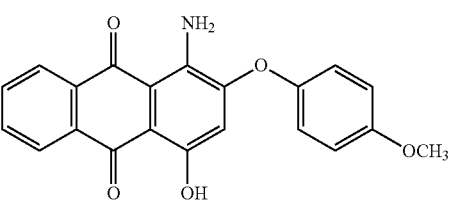

Compound (91)

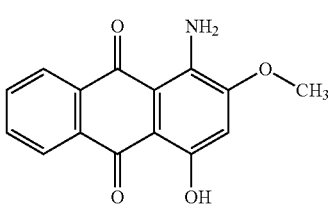

Compound (92)

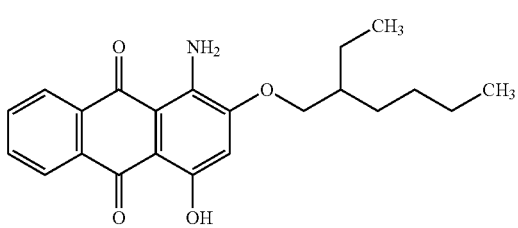

Compound (93)

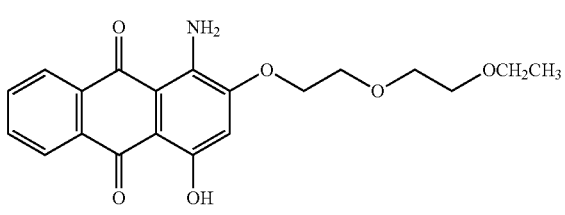

Compound (94)

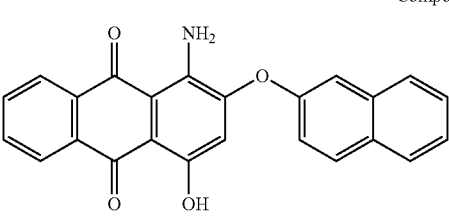

Of the compounds each represented by the general formula (10), at least one kind of Compounds (86) to (90) is preferably used as the magenta dye. In addition, one, or each of both, of Compounds (86) and (88) is more preferably used as the compound represented by the general formula (10) because an image that is excellent in light fastness and is improved in imbalance can be easily obtained.

(iv-2) Compound Represented by General Formula (11)

Next, the compound (magenta dye) represented by the general formula (11) is described.

General formula (11)

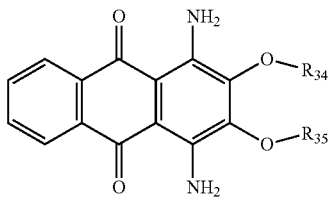

In the general formula (11), $R_{34}$ and $R_{35}$ each independently represent an alkyl group, or a substituted or unsubstituted aryl group.

In the general formula (11), the alkyl group that may be represented by any one of $R_{34}$ and $R_{35}$ is not particularly limited, and examples thereof may include the same alkyl groups as those represented by $R_{19}$ and $R_{20}$ in the general formula (6). The alkyl group is preferably a linear alkyl group having 1 or more and 4 or less carbon atoms because an image that is excellent in light fastness and is improved in imbalance can be easily obtained, and the group is more preferably a methyl group or a butyl group.

In the general formula (11), the substituted or unsubstituted aryl group that may be represented by any one of $R_{34}$ and $R_{35}$ is not particularly limited as long as the group is a substituted or unsubstituted aryl group. A substituent thereof may be, for example, an alkyl group. In addition, the total number of carbon atoms of the aryl group including the substituent may be set to, for example, 6 or more and 10 or less.

Examples of the substituted or unsubstituted aryl group include a phenyl group, a 2-methylphenyl group, a 3-methylphenyl group, a 4-methylphenyl group, a xylyl group (e.g., a 3,5-dimethylphenyl group), a naphthyl group, and a p-(n-butyl)phenyl group. Of those aryl groups, a phenyl group, a 4-methylphenyl group, and a xylyl group (e.g., a 3,5-dimethylphenyl group) are preferred because an image that is excellent in light fastness and is improved in imbalance can be easily obtained.

Compounds (95) to (103) are shown below as specific examples of the compound represented by the general formula (11), but the specific examples are not limited to the compounds.

Compound (95)

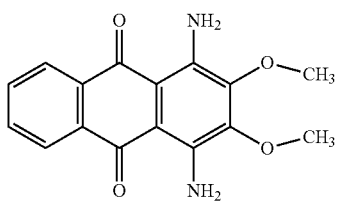

Compound (96)

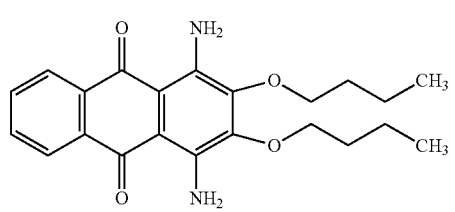

Compound (97)

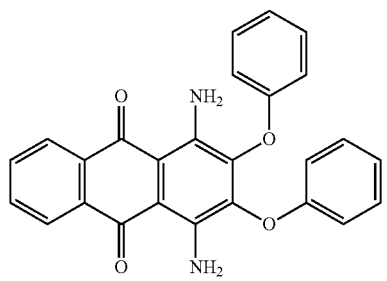

Compound (98)

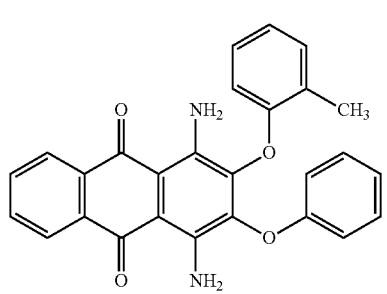

Compound (99)

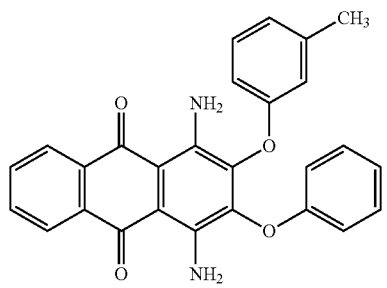

Compound (100)

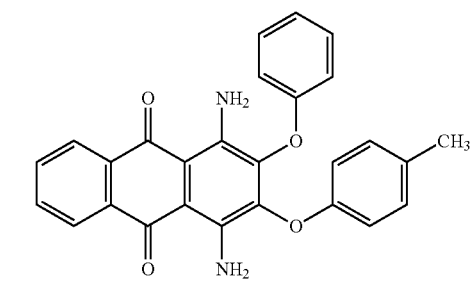

Compound (101)

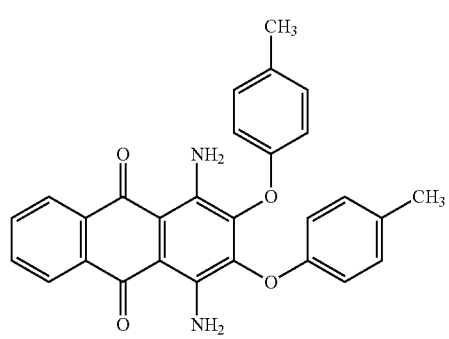

Compound (102)

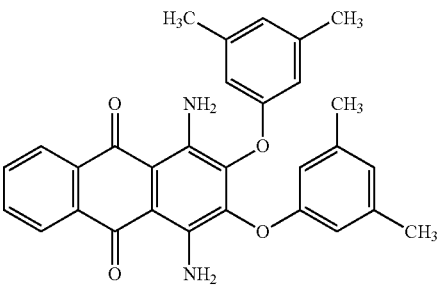

Compound (103)

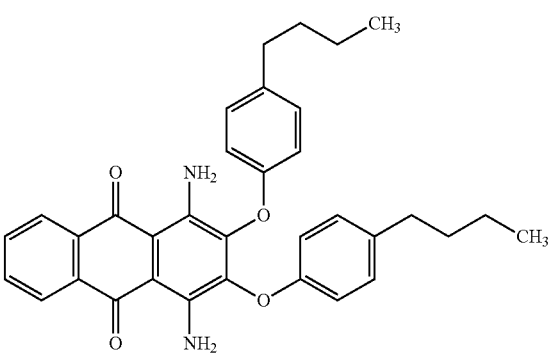

Of the compounds each represented by the general formula (11), at least one kind of Compounds (97) to (102) is preferably used as the magenta dye. In addition, at least one kind of Compounds (97), (101), and (102) is more preferably used as the compound represented by the general formula (11) because an image that is excellent in light fastness and is improved in imbalance can be easily obtained.

(iv-3) Compound Represented by General Formula (12)

Next, the compound (magenta dye) represented by the general formula (12) is described.

General formula (12)

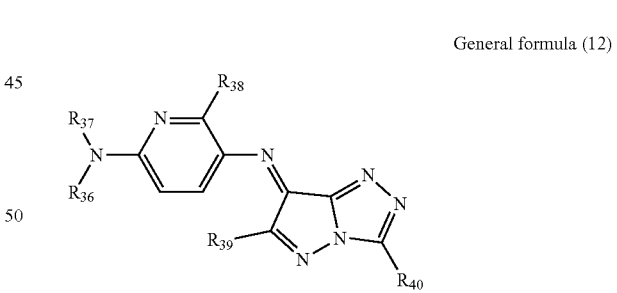

In the general formula (12), $R_{36}$ to $R_{40}$ each independently represent an alkyl group, or a substituted or unsubstituted aryl group.

In the general formula (12), the alkyl group that may be represented by any one of $R_{36}$ to $R_{40}$ is not particularly limited, and examples thereof may include the same alkyl groups as those represented by $R_{19}$ and $R_{20}$ in the general formula (6). In addition, of those alkyl groups, a linear or branched alkyl group having 1 or more and 4 or less carbon atoms (e.g., a methyl group, an ethyl group, an n-butyl group, or a tert-butyl group) is preferred because an image that is excellent in light fastness and is improved in imbalance can be easily obtained.

In the general formula (12), the substituted or unsubstituted aryl group that may be represented by any one of $R_{36}$ to $R_{40}$ is not particularly limited. Examples of a substituent thereof may include an alkyl group and an alkoxy group. In addition, the total number of carbon atoms of the aryl group including the substituent may be set to, for example, 6 or more and 10 or less.

Examples of the substituted or unsubstituted aryl group include a phenyl group, a 2-methylphenyl group, a 3-methylphenyl group, a 4-methylphenyl group, a naphthyl group, and a p-methoxyphenyl group. The aryl group is preferably a phenyl group, a 2-methylphenyl group, a 3-methylphenyl group, a 4-methylphenyl group, or a methoxyphenyl group because an image that is excellent in light fastness and is improved in imbalance can be easily obtained, and the group is more preferably a 2-methylphenyl group, a 3-methylphenyl group, or a 4-methylphenyl group.

Compounds (104) to (112) are shown below as specific examples of the compound represented by the general formula (12), but the specific examples are not limited to the compounds.

Compound (104)

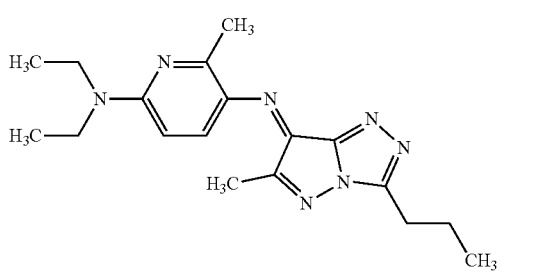

Compound (105)

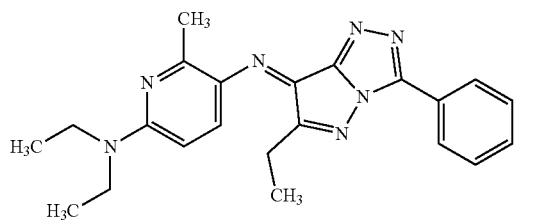

Compound (106)

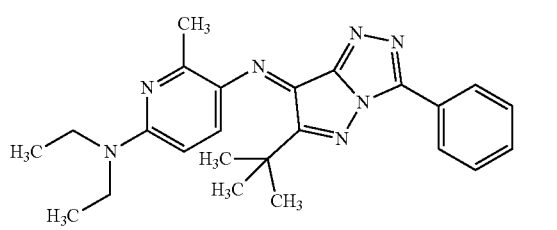

Compound (107)

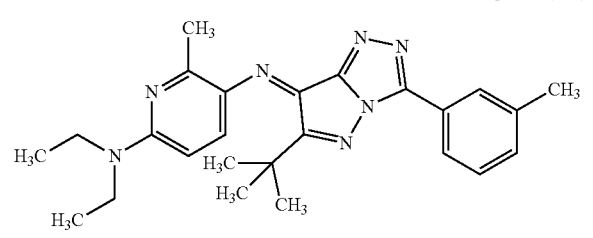

Compound (108)

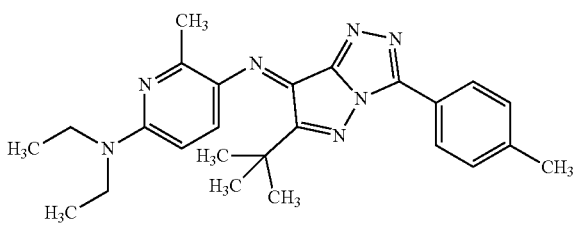

Compound (109)

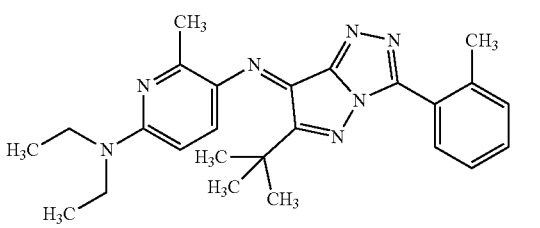

Compound (110)

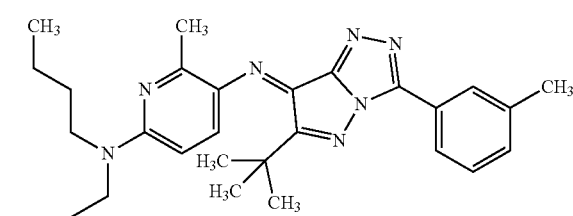

Compound (111)

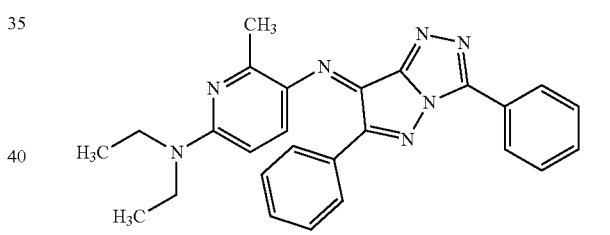

Compound (112)

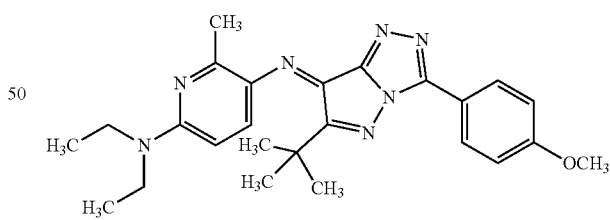

Of the compounds each represented by the general formula (12), at least one kind of Compounds (106) to (110) is preferably used as the magenta dye. In addition, at least one kind of Compounds (107) to (109) is more preferably used as the compound represented by the general formula (12) because an image that is excellent in light fastness and is improved in imbalance can be easily obtained.

(iv-4) Compound Represented by General Formula (13)

Next, the compound (magenta dye) represented by the general formula (13) is described.

General formula (13)

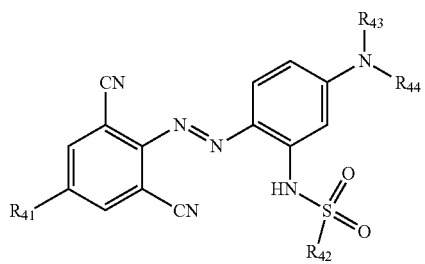

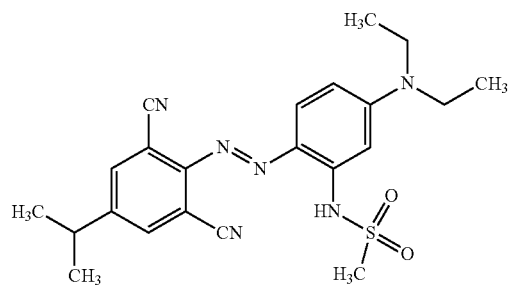

Compound (114)

In the general formula (13), $R_{41}$ to $R_{44}$ each independently represent an alkyl group, or a substituted or unsubstituted aryl group.

In the general formula (13), the alkyl group that may be represented by any one of $R_{41}$ to $R_{44}$ is not particularly limited, and examples thereof may include the same alkyl groups as those represented by $R_{19}$ and $R_{20}$ in the general formula (6). In addition, of those alkyl groups, a linear or branched alkyl group having 1 or more and 4 or less carbon atoms (e.g., a methyl group, an ethyl group, an n-propyl group, or a tert-butyl group) is preferred because an image that is excellent in light fastness and is improved in imbalance can be easily obtained.

In the general formula (13), the substituted or unsubstituted aryl group that may be represented by any one of $R_{41}$ to $R_{44}$ is not particularly limited. A substituent thereof may be, for example, an alkyl group. In addition, the total number of carbon atoms of the aryl group including the substituent may be set to, for example, 6 or more and 10 or less.

Examples of the substituted or unsubstituted aryl group include a phenyl group, a tolyl group (e.g., a 4-methylphenyl group), and a naphthyl group. Of those aryl groups, a phenyl group and a tolyl group are preferred because an image that is excellent in light fastness and is improved in imbalance can be easily obtained.

Compounds (113) to (121) are shown below as specific examples of the compound represented by the general formula (13), but the specific examples are not limited to the compounds.

Compound (115)

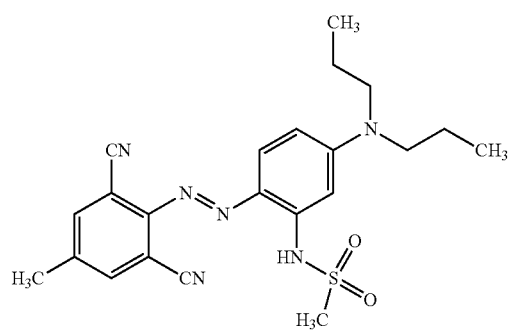

Compound (116)

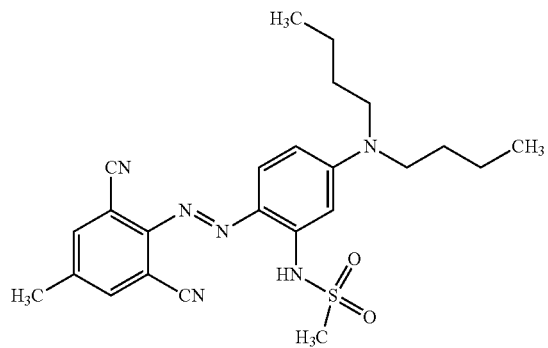

Compound (113)

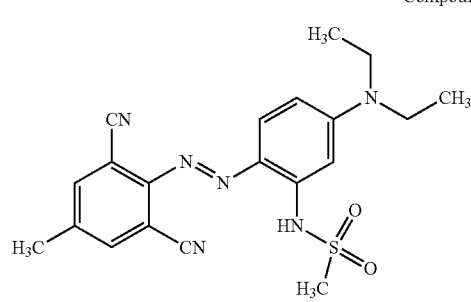

Compound (117)

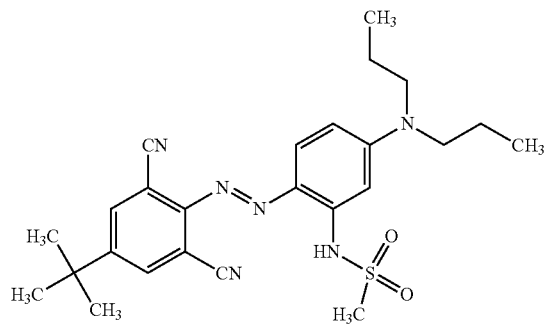

-continued

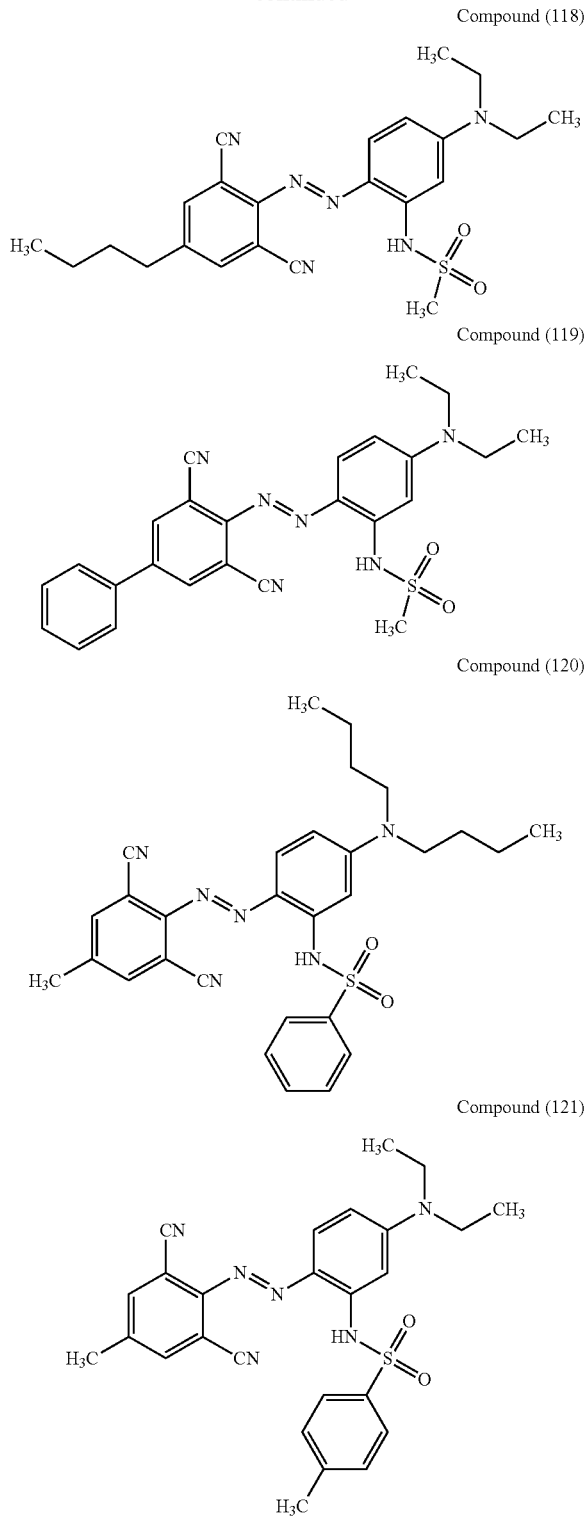

Compound (118)
Compound (119)
Compound (120)
Compound (121)

Of the compounds each represented by the general formula (13), at least one kind of Compounds (113) and (115) to (117) is preferably used as the magenta dye. In addition, Compound (115) is more preferably used as the compound represented by the general formula (13) because an image that is excellent in light fastness and is improved in imbalance can be easily obtained.

(iv-5) Compound Represented by General Formula (14)

Next, the compound (magenta dye) represented by the general formula (14) is described.

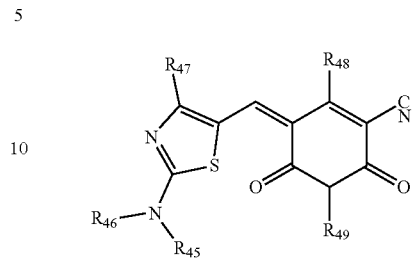

General formula (14)

In the general formula (14), $R_{45}$ and $R_{46}$ each independently represent an alkyl group, $R_{47}$ represents a hydrogen atom, an alkyl group, or a substituted or unsubstituted aryl group, $R_{48}$ represents an alkyl group, or a substituted or unsubstituted aryl group, and $R_{49}$ represents a hydrogen atom, an alkyl group, a substituted or unsubstituted aryl group, or —N(—$R_{50}$)$R_{51}$, provided that $R_{50}$ and $R_{51}$ each independently represent a hydrogen atom, an alkyl group, an aryl group, or an acyl group, or may form a cyclic structure together with a nitrogen atom to which $R_{50}$ and $R_{51}$ are bonded.

In the general formula (14), the alkyl group that may be represented by any one of $R_{45}$ and $R_{46}$ is not particularly limited, and is, for example, a linear, branched, or cyclic alkyl group having 1 or more and 20 or less carbon atoms. More specific examples thereof include a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-butylbutyl group, a 2-ethylpropyl group, and a 2-ethylhexyl group. Of those alkyl groups, branched alkyl groups, such as a 2-butylbutyl group and a 2-ethylhexyl group, are preferred because an image that is excellent in light fastness and is improved in imbalance can be easily obtained.

In the general formula (14), the alkyl group that may be represented by $R_{47}$ is not particularly limited, and examples thereof may include the same alkyl groups as those represented by $R_{19}$ and $R_{20}$ in the general formula (6). In addition, of those alkyl groups, a tert-butyl group is preferred because an image that is excellent in light fastness and is improved in imbalance can be easily obtained.

In the general formula (14), the substituted or unsubstituted aryl group that may be represented by $R_{47}$ is not particularly limited. Examples of a substituent thereof include: alkyl groups, such as a methyl group and an ethyl group; and alkoxy groups, such as a methoxy group. In addition, the total number of carbon atoms of the aryl group including the substituent may be set to, for example, 6 or more and 12 or less.

Examples of the substituted or unsubstituted aryl group include a phenyl group, a 2-methylphenyl group, a 3-methylphenyl group, a 4-methylphenyl group, a xylyl group (e.g., a 2,6-dimethylphenyl group), a 2,6-diethylphenyl group, a 3-methoxyphenyl group, a 2,6-dimethoxyphenyl group, a 2,4,6-trimethylphenyl group, and a 2,4,6-triethylphenyl group. In addition, of those aryl groups, a phenyl group is preferred because an image that is excellent in light fastness and is improved in imbalance can be easily obtained.

$R_{47}$ preferably represents a phenyl group or a tert-butyl group; a case in which $R_{47}$ represents a tert-butyl group is particularly preferred from the viewpoints of the light fastness and imbalance of an image.

In the general formula (14), the alkyl group that may be represented by $R_{48}$ is not particularly limited, and is, for example, a linear or branched alkyl group having 1 or more and 8 or less carbon atoms (e.g., its main chain has 1 or more and 4 or less carbon atoms).

More specific examples thereof include a methyl group, an ethyl group, an n-propyl group, an iso-propyl group, an n-butyl group, an iso-butyl group, a 2-methylbutyl group, and a 2,3,3-trimethylbutyl group. Of those alkyl groups, a methyl group is preferred because an image that is excellent in light fastness and is improved in imbalance can be easily obtained.

In the general formula (14), the substituted or unsubstituted aryl group that may be represented by $R_{48}$ is not particularly limited. Examples of a substituent thereof include: alkyl groups, such as a methyl group; and alkoxy groups, such as a methoxy group. In addition, the total number of carbon atoms of the aryl group including the substituent may be set to, for example, 6 or more and 8 or less.

Examples of the substituted or unsubstituted aryl group include a phenyl group, a 2-methylphenyl group, a 3-methylphenyl group, a 4-methylphenyl group, a 4-methoxyphenyl group, and a xylyl group (e.g., a 3,5-dimethylphenyl group). In addition, of those aryl groups, a phenyl group is preferred because an image that is excellent in light fastness and is improved in imbalance can be easily obtained.

In the general formula (14), the alkyl group that may be represented by $R_{49}$ is not particularly limited, and is, for example, a linear or branched alkyl group having 1 or more and 8 or less carbon atoms.

More specific examples thereof include a methyl group, an ethyl group, an n-propyl group, an iso-propyl group, an n-butyl group, and an iso-butyl group. Of those alkyl groups, a methyl group is preferred because an image that is excellent in light fastness and is improved in imbalance can be easily obtained.

In the general formula (14), the substituted or unsubstituted aryl group that may be represented by $R_{49}$ is not particularly limited. Examples of a substituent thereof may include: alkyl groups, such as a methyl group; and alkoxy groups, such as a methoxy group. In addition, the total number of carbon atoms of the aryl group including the substituent may be set to, for example, 6 or more and 12 or less. Examples of the substituted or unsubstituted aryl group include a phenyl group and a naphthyl group. In addition, of those aryl groups, a phenyl group is preferred because an image that is excellent in light fastness and is improved in imbalance can be easily obtained.

In the general formula (14), when $R_{49}$ represents —N(—$R_{50}$)$R_{51}$, the alkyl group that may be represented by any one of $R_{50}$ and $R_{51}$ is not particularly limited, and examples thereof may include the same alkyl groups as those represented by $R_{19}$ and $R_{20}$ in the general formula (6). In addition, of those alkyl groups, a methyl group is preferred because an image that is excellent in light fastness and is improved in imbalance can be easily obtained.

In the general formula (14), when $R_{49}$ represents —N(—$R_{50}$)$R_{51}$, the aryl group that may be represented by any one of $R_{50}$ and $R_{51}$ is not particularly limited, and examples thereof may include a phenyl group and a naphthyl group. In addition, of those aryl groups, a phenyl group is preferred because an image that is excellent in light fastness and is improved in imbalance can be easily obtained.

In the general formula (14), when $R_{49}$ represents —N(—$R_{50}$)$R_{51}$, the acyl group that may be represented by any one of $R_{50}$ and $R_{51}$ is not particularly limited, and examples thereof include: an unsubstituted alkylcarbonyl group having 2 or more and 30 or less carbon atoms; a substituted or unsubstituted arylcarbonyl group having 7 or more and 30 or less carbon atoms; and —C(=O)-A (where A represents a heterocycle). More specific examples thereof include an acetyl group, a propionyl group, a pivaloyl group, a benzoyl group, and a naphthoyl group. In addition, examples of —C(=O)-A include a 2-pyridylcarbonyl group and a 2-furylcarbonyl group. Examples of a substituent of the arylcarbonyl group include an alkyl group having 1 or more and 4 or less carbon atoms, and an alkoxy group having 1 or more and 4 or less carbon atoms.

In the general formula (14), when $R_{49}$ represents —N(—$R_{50}$)$R_{51}$, the cyclic structure formed together with the nitrogen atom to which $R_{50}$ and $R_{51}$ are bonded is not particularly limited, and examples thereof include a piperidine ring, a piperazine ring, and a morpholine ring.

A case in which at least one of $R_{50}$ and $R_{51}$ represents an alkyl group out of those groups is preferred because the light fastness of an image is excellent. Further, a case in which at least one of $R_{50}$ and $R_{51}$ represents a methyl group is more preferred because an image that is excellent in light fastness and is improved in imbalance can be easily obtained.

Compounds (122) to (132) are shown below as specific examples of the compound represented by the general formula (14), but the specific examples are not limited to the compounds.

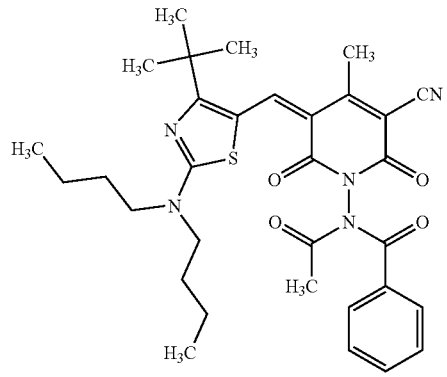

Compound (122)

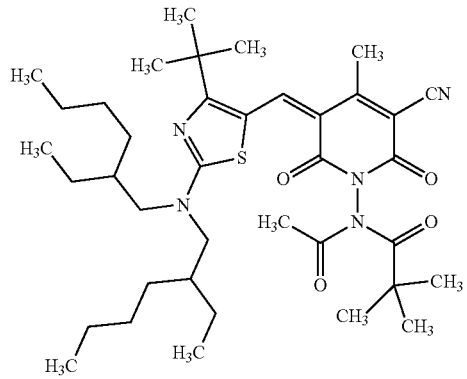

Compound (123)

Compound (124)
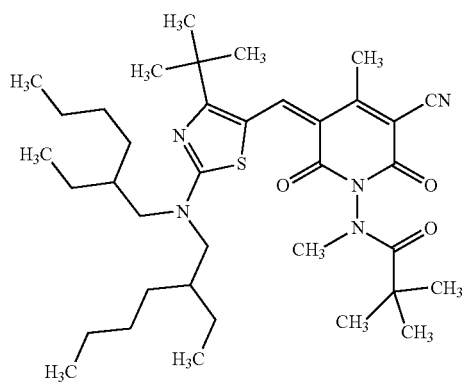
Compound (125)
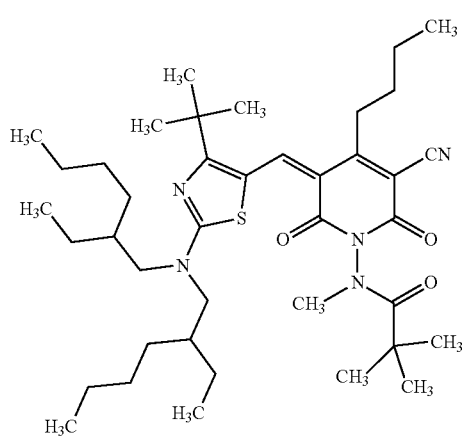
Compound (126)
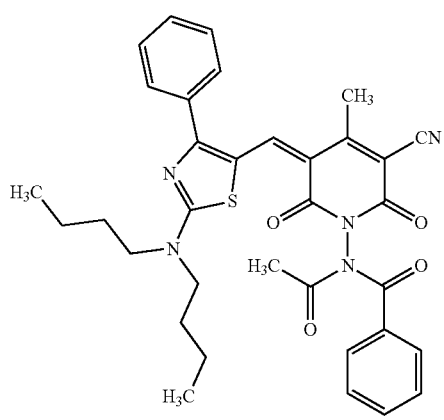
Compound (127)
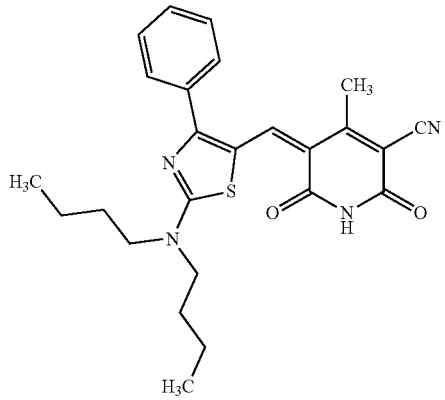
Compound (128)
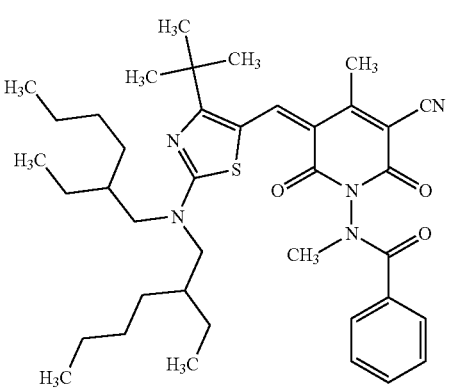
Compound (129)
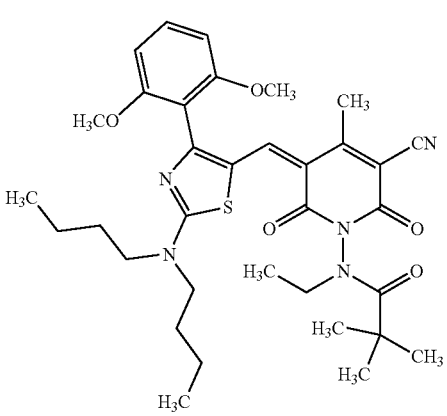

-continued

Compound (130)

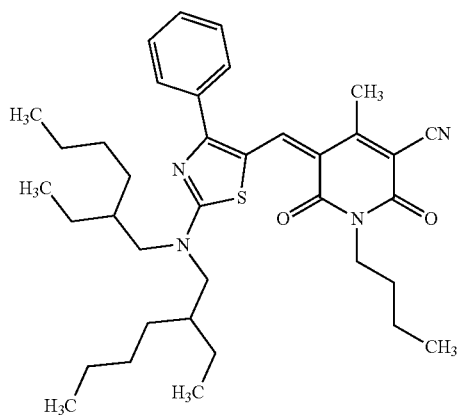

Compound (131)

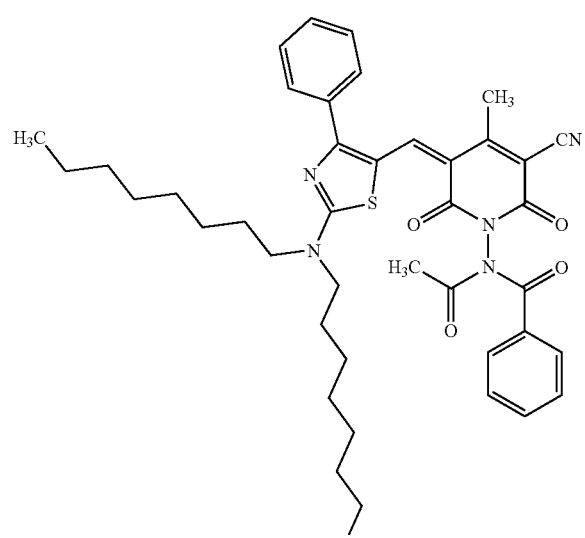

Compound (132)

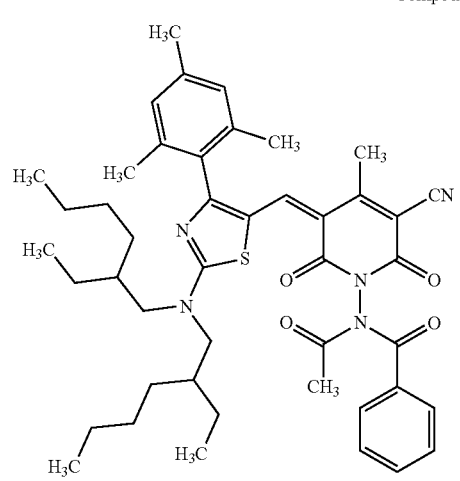

At least one kind of Compounds (122) to (124) and (128) is preferably used as the compound represented by the general formula (14) because an image that is excellent in light fastness and is improved in imbalance can be easily obtained.

An existing magenta dye may be used as a magenta dye in addition to those compounds represented by the general formulae (10) to (14). In addition, the existing magenta dye may be used in combination with the compounds represented by the general formulae (10) to (14).

(v) Binder Resin

A binder resin that may be used in each of the dye layers of the first thermal transfer recording sheet is not particularly limited, and various resins may each be used. Of those, the following water-soluble resins and organic solvent-soluble resins are each preferably used. For example, a cellulose resin, a polyacrylic acid resin, a starch resin, and an epoxy resin may be used as the water-soluble resins. In addition, for example, a polyacrylate resin, a polymethacrylate resin, a polystyrene resin, a polycarbonate resin, a polyethersulfone resin, a polyvinyl butyral resin, an ethyl cellulose resin, an acetyl cellulose resin, a polyester resin, an AS resin, and a phenoxy resin may be used as the organic solvent-soluble resins. Those binder resins may be used alone or in combination thereof as required.

(vi) Surfactant

A surfactant may be added to any one of the dye layers of the first thermal transfer recording sheet for imparting sufficient lubricity at the time of the heating of a thermal head (at the time of printing). Examples of the surfactant that may be added to the dye layer include a cationic surfactant, an anionic surfactant, and a nonionic surfactant.

Examples of the cationic surfactant include dodecylammonium chloride, dodecylammonium bromide, dodecyltrimethylammonium bromide, dodecylpyridinium chloride, dodecylpyridinium bromide, and hexadecyltrimethylammonium bromide.

Examples of the anionic surfactant include fatty acid soaps, such as sodium stearate and sodium dodecanoate, sodium dodecyl sulfate, sodium dodecylbenzene sulfate, and sodium lauryl sulfate.

Examples of the nonionic surfactant include dodecyl polyoxyethylene ether, hexadecyl polyoxyethylene ether, nonylphenyl polyoxyethylene ether, lauryl polyoxyethylene ether, sorbitan monooleate polyoxyethylene ether, and monodecanoyl sucrose.

(vii) Wax

A wax may be added to any one of the dye layers of the first thermal transfer recording sheet for imparting sufficient lubricity at the time of the non-heating of the thermal head. Examples of the wax that may be added to the dye layer include, but not limited to, a polyethylene wax, a paraffin wax, and a fatty acid ester wax.

(viii) Other Additives

In addition to the above-mentioned additives, a UV absorber, an antiseptic, an antioxidant, an antistatic agent, a viscosity modifier, and the like may each be added to any one of the dye layers of the first thermal transfer recording sheet as required.

(ix) Medium

A medium that may be used in the preparation of each dye composition for the first thermal transfer recording sheet is not particularly limited, and examples thereof include water and an organic solvent. For example, the following organic solvents may each be preferably used as the organic solvent: alcohols, such as methanol, ethanol, isopropanol, and isobutanol; cellosolves, such as methyl cellosolve and ethyl cellosolve; aromatic hydrocarbons, such as toluene, xylene, and chlorobenzene; esters, such as ethyl acetate and butyl acetate; ketones, such as acetone, methyl ethyl ketone, methyl isobutyl ketone, and cyclohexanone; halogenated hydrocarbons, such as methylene chloride, chloroform, and trichloroethylene; ethers, such as tetrahydrofuran and dioxane; and N,N-dimethylformamide and N-methylpyrrolidone. Those organic solvents may be used alone or in combination thereof as required. In addition, water and the organic solvent may be used in combination thereof.

(I-2-3) Composition of Dye Composition for Forming Dye Layer

Content of Dye

The content of each dye (the yellow dye, the magenta dye, or the cyan dye) in each dye composition is preferably 1 part by mass or more and 200 parts by mass or less in total with respect to 100 parts by mass of the binder resin from the viewpoint of the storage stability of the sheet. The content is more preferably 50 parts by mass or more and 180 parts by mass or less with respect to 100 parts by mass of the binder resin from the viewpoint of the dispersion of the dye.

When two or more kinds of dyes are used as a mixture, the content of the dyes in the dye composition means the total number of parts by mass of the respective dyes. For example, also when the compounds represented by the general formulae (3) to (6) and an existing dye are used in combination as yellow dyes, the content of the dyes means the total number of parts by mass of the dyes.

Content of First Compound

When the first compound is incorporated into a dye composition (e.g., the yellow dye composition), the following content is preferably adopted because an image that is excellent in light fastness and is improved in imbalance can be easily obtained. That is, the total content of the first compound in the dye composition is preferably 0.5 part by mass or more and 50 parts by mass or less, more preferably 1.0 part by mass or more and 30 parts by mass or less with respect to 100 parts by mass of the dye (the total number of parts by mass of the used dye).

Content of Other Components

The content of any other component in each of the dye compositions may be appropriately set and is not particularly limited.

(I-3) Other Layers (i) Black Dye Layer

The first thermal transfer recording sheet, which includes at least the dye layers including the yellow dye layer, the magenta dye layer, and the cyan dye layer, may further include a conventionally known black dye layer as a dye layer. The black dye layer may be formed by using a composition containing a black dye, or an existing yellow dye, an existing magenta dye, and an existing cyan dye, and the black dye layer may contain the first compound.

(ii) Transferable Protective Layer

The first thermal transfer recording sheet may include, on the substrate, a transferable protective layer for protecting the surface of an image after the formation of the image field sequentially with the above-mentioned dye layers. In addition, the transferable protective layer may be formed on a sheet (substrate) different from the dye layers.

(I-4) Method of Producing First Thermal Transfer Recording Sheet

Although the first thermal transfer recording sheet is not particularly limited, the respective dye layers may be formed on the substrate field sequentially. For example, the yellow dye layer, the magenta dye layer, and the cyan dye layer may be repeatedly produced on the substrate (substrate sheet) along the moving direction of the substrate. When a thermal transfer sheet including the dye layers in the stated order is used, a series of image formation is performed in the following order: a yellow image is formed first, and then a magenta image is formed, followed by the formation of a cyan image. Thus, one full-color image is formed. Then, the series of image formation is repeated. A dye layer except those dye layers may also be appropriately added and, for example, a black dye layer (hot-melt black layer) may be added on the substrate.

The dye layers may each be formed by applying a composition for a dye layer (dye composition) onto the substrate, and drying the composition. A method of applying each dye composition onto the substrate is not particularly limited, and is, for example, a method involving using a bar coater, a gravure coater, a reverse roll coater, a rod coater, an air doctor coater, or the like. Of those, an application method involving using a gravure coater by which the thickness of the layer is easily adjusted is preferred.

In addition, conditions for the drying after the application of each dye composition are not particularly limited as long as the composition can be sufficiently dried. For example, the drying may be performed at a temperature of 50° C. or more and 120° C. or less for 1 second or more and 5 minutes or less. When each dye composition is sufficiently dried, the occurrence of scumming and the offset of the dye composition at the time of the winding of the first thermal transfer recording sheet can be easily prevented. Further, the retransfer of the offset dye composition to a dye layer having a different hue at the time of the rewinding of the sheet can also be easily prevented.

With regard to the application amount of the dye composition, from the viewpoint of the transferability of the first thermal transfer recording sheet, the composition is preferably applied in such an amount that the thickness of the dye layer after the drying falls within the range of from 0.1 µm or more to 5 µm or less.

Although a method of producing the first thermal transfer recording sheet is not particularly limited, the sheet may be produced, for example, as described below.

First, the first compound and a dye (coloring material) represented by any one of the general formulae (3) to (14), which has a color corresponding to a target dye layer, and, as required, a binder resin, a surfactant, and a wax are gradually added to a medium (e.g., an organic solvent) while the medium is stirred, and the components are sufficiently caused to conform to the medium. At this time, those components are stably dissolved, or dispersed in a fine particulate manner, in the medium by applying a mechanical shear force through the use of a disperser. Thus, a dye composition is prepared. The target dye layer may be produced by applying the dye composition to a base film serving as the substrate, and drying the composition. When the respective yellow, magenta, and cyan dye layers are formed on the substrate field sequentially, three kinds of dye compositions each produced by the method may be used.

Although the disperser to be used at the time of the preparation of the dye composition is not particularly limited, for example, medium-type dispersers, such as a rotary shearing-type homogenizer, a ball mill, a sand mill, and an attritor, and high-pressure counter collision-type dispersers may each be used.

Further, any other layer, such as the black dye layer or the transferable protective layer described above, is formed as required. Thus, the first thermal transfer recording sheet may be produced.

The first thermal transfer recording sheet is not limited to a thermal transfer recording sheet produced by the production method.

(I-5) Method of Using First Thermal Transfer Recording Sheet

The first thermal transfer recording sheet is configured to perform image formation as follows: the thermal transfer recording sheet is superimposed on a transfer target material, for example, an image receiving sheet having a coloring material receiving layer on its surface, and is heated through the use of a heating method, such as a thermal head, to transfer the coloring materials in the sheet onto the image receiving sheet. When the first thermal transfer recording sheet includes the above-mentioned transferable protective layer, the protective layer may be transferred (formed) onto an image formed on the image receiving sheet by: superimposing the sheet in the protective layer portion on the image; and heating the sheet through the use of a heating method, such as a thermal head.

Although heating means for heating the first thermal transfer recording sheet for printing is not particularly limited, not only an ordinary method involving using a thermal head but also an infrared ray or laser light may be utilized. In addition, the sheet may be used as an electrical conduction-type dye transfer sheet by using an electrical conduction exothermic film configured to generate heat by electrifying the base film itself serving as the substrate.

(II) Second Thermal Transfer Recording Sheet

The second thermal transfer recording sheet includes at least the substrate, and dye layers including the yellow dye layer containing the specific yellow dye, the magenta dye layer containing the magenta dye, and the cyan dye layer containing the specific cyan dye, and the protective layer for protecting the surface of an image, which is formed by transferring the dye layers onto a transfer target material, on the substrate. In addition, the first compound is used in the protective layer.

The second thermal transfer recording sheet may include a dye layer except the three kinds (e.g., a black dye layer).

The construction of the second thermal transfer recording sheet is described in detail below.

(II-1) Substrate

The substrate of the second thermal transfer recording sheet is configured to support the dye layers and the protective layer. The substrate is not particularly limited, and the same substrate as that of the first thermal transfer recording sheet may be used. The thickness of the substrate, and the presence or absence of an adhesion layer or a heat-resistant slipping layer may be determined as in the first thermal transfer recording sheet.

(II-2-1) Dye Layers

The second thermal transfer recording sheet includes at least the yellow dye layer, the magenta dye layer, and the cyan dye layer. Each dye layer may be formed by using a composition containing a dye corresponding to the dye layer and, as required, an additive, such as a medium (e.g., water or an organic solvent), a binder resin, a surfactant, or a wax. For example, a composition (yellow dye composition) containing the yellow dye represented by any one of the general formulae (3) to (6), a medium, a binder resin, a surfactant, and a wax may be used for the yellow dye layer.

In the second thermal transfer recording sheet, a compound represented by any one of the general formulae (3) to (6) is used as the yellow dye, a compound represented by any one of the general formulae (7) to (9) is used as the cyan dye, and, for example, a compound represented by any one of the general formulae (10) to (14) is used as the magenta dye. A dye that is known and used as a dye for thermal transfer in the field of a thermal transfer recording sheet, and that is caused to migrate by heat may be used in combination with those compounds (dyes) represented by the general formulae (3) to (14) without any particular limitation in consideration of, for example, its hue, printing sensitivity, light fastness, storage stability, and solubility or dispersibility in a binder resin. Further, any such dye layer may contain the first compound.

(II-2-2) Component to be Incorporated into Dye Composition for Forming Dye Layer The respective components to be incorporated into the compositions to be used in the formation of the dye layers are described below.

(i) Yellow Dye, Cyan Dye, and Magenta Dye

As in the first thermal transfer recording sheet, the yellow dye (compound represented by any one of the general formulae (3) to (6)), the cyan dye (compound represented by any one of the general formulae (7) to (9)), and the magenta dye (compound represented by any one of the general formulae (10) to (14)), and an existing dye may be used as those dyes to be used in the second thermal transfer recording sheet.

(ii) Additives, Such as Medium, Binder Resin, Surfactant, and Wax

The same additives as those of the first thermal transfer recording sheet may be used as the various additives.

(II-2-3) Composition of Dye Composition for Forming Dye Layer

Content of Dye

The content of each dye (the yellow dye, the magenta dye, or the cyan dye) in each dye composition is preferably 1 part by mass or more and 200 parts by mass or less in total with respect to 100 parts by mass of the binder resin from the viewpoint of the storage stability of the sheet. The content is more preferably 50 parts by mass or more and 180 parts by mass or less with respect to 100 parts by mass of the binder resin from the viewpoint of the dispersion of the dye (colorant).

When two or more kinds of dyes are used as a mixture, the content of the dyes means the total number of parts by mass of the respective dye coloring materials. For example, also when the compounds represented by the general formulae (3) to (6) and an existing dye are used in combination as yellow dyes, the content of the dyes means the total number of parts by mass of the dyes.

Content of Other Components

The content of any other component in each of the dye compositions may be appropriately set and is not particularly limited.

(II-3) Protective Layer

The protective layer in the second thermal transfer recording sheet contains the first compound. The same compound as that of the first thermal transfer recording sheet may be used as the first compound.

In addition, a composition for forming the protective layer may contain a binder resin in addition to the first compound.

The binder resin to be used in the protective layer is not particularly limited, and examples thereof include synthetic resins, including polystyrene, acrylic resins, such as polymethyl methacrylate and polyethyl acrylate, styrene-based resins, such as poly-α-methylstyrene, vinyl-based resins, such as polyvinyl chloride, polyvinyl acetate, a vinyl chloride-vinyl acetate copolymer, polyvinyl butyral, and polyvinyl acetal, a polyamide resin, an epoxy resin, a polyurethane resin, a petroleum resin, an ionomer, an ethylene-acrylic acid copolymer, and an ethylene-acrylate copolymer, and those binder resins may each be suitably used.

In addition, the composition for forming the protective layer may contain an additive, such as a medium (e.g., water or an organic solvent), a surfactant, a wax, a UV absorber, an antiseptic, an antioxidant, an antistatic agent, or a viscosity modifier, in addition to the foregoing. The same additives as those of the first thermal transfer recording sheet may be used as those various additives.

The total content of the first compound in the composition for forming the protective layer is preferably 0.1 part by mass or more and 50 parts by mass or less with respect to 100 parts by mass of the binder resin from the viewpoint of the storage stability of the sheet. Further, the total content of the first compound is more preferably 0.5 part by mass or more and 20 parts by mass or less with respect to 100 parts by mass of the binder resin from the viewpoints of the color of a printed product and an improvement in light fastness thereof.

In addition, the content of any other component in the composition for forming the protective layer may be appropriately set and is not particularly limited.

The thickness of the protective layer is preferably 0.1 μm or more and 5 μm or less from the viewpoint of the transferability of the second thermal transfer recording sheet.

(II-4) Other Layers

The second thermal transfer recording sheet may include any other layer, such as the above-mentioned black dye layer, as in the first thermal transfer recording sheet.

In addition, a peeling layer (release layer) is preferably formed between the protective layer and the substrate for facilitating the peeling of the protective layer from the thermal transfer recording sheet.

The peeling layer may contain, for example, an acrylic resin, such as polymethyl methacrylate or polyethyl acrylate. In addition, the thickness of the peeling layer may be set to, for example, 0.1 μm or more and 1.5 μm or less.

(II-5) Method of Producing Second Thermal Transfer Recording Sheet

Although the second thermal transfer recording sheet is not particularly limited, the respective dye layers and the protective layer may be formed on the substrate field sequentially. For example, the yellow dye layer, the magenta dye layer, the cyan dye layer, and the black dye layer may be repeatedly produced on the substrate (substrate sheet) along the moving direction of the substrate, and the protective layer may be produced. When a thermal transfer sheet including the dye layers and the protective layer in the stated order is used, a series of image formation is performed in the following order: a yellow image is formed first, and then a magenta image is formed, followed by the formation of a cyan image and a black image. Thus, one full-color image is formed. Then, the series of image formation is repeated, and finally, the protective layer is transferred onto the formed image.

A dye layer except those dye layers may be appropriately added on the substrate.

Although a method of producing the second thermal transfer recording sheet is not particularly limited, the sheet may be obtained, for example, as described below.

A compound represented by any one of the general formulae (1) and (2) in the case of the protective layer, or a dye (coloring material) represented by any one of the general formulae (3) to (14), which has a color corresponding to a target dye layer, in the case of each dye layer, is gradually added to a medium together with a binder resin, a surfactant, a wax, and the like while the medium is stirred, and the components are sufficiently caused to conform to the medium. At this time, those components are stably dissolved, or dispersed in a fine particulate manner, in the medium by applying a mechanical shear force through the use of a disperser. Thus, each composition (a dye composition for forming the dye layer or a composition for forming the protective layer) is prepared. The target dye layer and the protective layer may each be produced by applying each of the compositions to a base film serving as the substrate, and drying the composition. When the peeling layer is formed between the protective layer and the substrate, the peeling layer is formed on the substrate in advance by using, for example, a resin for forming the peeling layer.

The disperser to be used in the production of each of the compositions (including the composition for forming the protective layer), a method of applying each of the compositions (including the composition for forming the protective layer) onto the substrate and the application amount of the composition, and conditions for the drying of the composition may be set as in the first thermal transfer recording sheet.

Further, any other layer, such as the heat-resistant slipping layer described above, is formed as required. Thus, the second thermal transfer recording sheet may be produced.

The second thermal transfer recording sheet is not limited to a thermal transfer recording sheet produced by the production method.

(II-6) Method of Using Second Thermal Transfer Recording Sheet

The second thermal transfer recording sheet is configured to perform image formation as follows: the thermal transfer recording sheet is superimposed on an image receiving sheet having a coloring material receiving layer on its surface, and is heated through the use of a heating method, such as a thermal head, to transfer the coloring materials in the sheet onto the image receiving sheet. In addition, the sheet is configured to transfer the protective layer onto the image formed on the image receiving sheet. Heating means for heating the second thermal transfer recording sheet is not particularly limited, and the same means as that for the first thermal transfer recording sheet may be used. The protective layer may be transferred only onto a region having formed therein the image, or may be transferred onto the entire surface of the image receiving sheet.

EXAMPLES

The present invention is described in more detail below by way of Examples and Comparative Examples, but the present invention is not limited to these examples. The term "part(s)" as used in the following description is on a mass basis unless otherwise stated.

[Production of Compounds represented by General Formulae (1) and (2)]

The compounds represented by the general formulae (1) and (2) may each be synthesized by the above-mentioned known method.

[Comparative Compound]

Comparative Compound (1) was used as a comparative compound. Comparative Compound (1) above may be synthesized by the same known method as the methods of producing the compounds represented by the general formulae (1) and (2).

Comparative Compound (1)

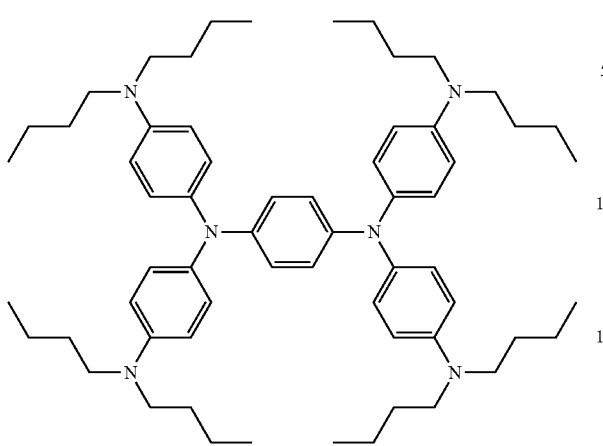

(I) First Thermal Transfer Recording Sheet
[Production of Dye Compositions]

Production Example 1 of Yellow Dye Composition

5 Parts of a polyvinyl butyral resin (product name: KS-3, manufactured by Sekisui Chemical Co., Ltd.) was gradually added to and dissolved in a mixed solution of 45 parts of methyl ethyl ketone and 45 parts of toluene. The following compounds were added to and completely dissolved in the solution. Thus, a yellow dye composition (Y1) for producing a thermal transfer recording sheet was obtained.

First Compound:

| Compound (1) | 0.05 part |

Yellow Dyes:

| Compound represented by the general formula (3): | 1.25 parts |
| Compound (43) | |
| Compound represented by the general formula (4): | 2.50 parts |
| Compound (51) | |
| Existing yellow dye: Compound (66) | 1.25 parts |

Production Examples 2 to 15 of Yellow Dye Compositions

Yellow dye compositions (Y2) to (Y15) for producing thermal transfer recording sheets were each produced by the same method as that of Production Example 1 of Yellow Dye Composition, except the first compound and the yellow dyes in Production Example 1 were changed to compounds whose kinds were shown in Table 1, and a blending ratio between the dyes was also changed as shown in Table 1.

A blending ratio between yellow dyes in Table 1 means a blending ratio "compound represented by the general formula (3):compound represented by the general formula (4):compound represented by the general formula (5):compound represented by the general formula (6):Compound (65) or (66)." In addition, the total content of the yellow dyes in each of the yellow dye compositions (Y1 to Y15) was set to 5 parts by mass.

TABLE 1

| | Yellow dye | | | | | | | |
| Yellow dye composition | Compound represented by general formula (3) | Compound represented by general formula (4) | Compound represented by general formula (5) | Compound represented by general formula (6) | Compound (65) or (66) | Blending ratio between yellow dyes (total: 5 parts by mass) | First compound or comparative compound | Content of first compound or comparative compound (part(s) by mass) |
|---|---|---|---|---|---|---|---|---|
| Y1 | Compound (43) | Compound (51) | — | — | Compound (66) | 1:2:0:0:1 | Compound (1) | 0.05 |
| Y2 | Compound (43) | Compound (51) | Compound (57) | — | Compound (66) | 1:1:2:0:1 | Compound (23) | 0.05 |
| Y3 | — | Compound (52) | Compound (58) | — | Compound (65) | 0:2:2:0:1 | Compound (26) | 0.05 |
| Y4 | Compound (45) | Compound (51) | — | — | Compound (66) | 1:2:0:0:1 | Compound (25) | 0.05 |
| Y5 | Compound (43) | Compound (53) | — | Compound (63) | Compound (66) | 1:1:0:1:1 | Compound (5) | 0.05 |
| Y6 | — | Compound (51) | Compound (56) | Compound (63) | Compound (65) | 0:2:1:1:1 | Compound (11) | 0.05 |
| Y7 | Compound (46) | — | Compound (57) | — | Compound (66) | 2:0:2:0:1 | Compound (5) | 0.05 |
| Y8 | Compound (43) | Compound (51) | — | — | Compound (66) | 1:2:0:0:1 | Compound (34) | 0.05 |
| Y9 | Compound (43) | Compound (51) | Compound (57) | — | Compound (66) | 1:1:2:0:1 | Compound (37) | 0.05 |
| Y10 | — | Compound (52) | Compound (58) | — | Compound (65) | 0:2:2:0:1 | Compound (39) | 0.05 |
| Y11 | Compound (43) | Compound (51) | — | — | Compound (66) | 1:2:0:0:1 | Comparative Compound (1) | 0.05 |
| Y12 | Compound (43) | Compound (53) | Compound (58) | — | Compound (65) | 1:1:2:0:1 | Comparative Compound (1) | 0.05 |
| Y13 | — | Compound (52) | Compound (58) | — | Compound (66) | 0:2:2:0:1 | — | 0 |
| Y14 | — | Compound (53) | Compound (57) | Compound (64) | Compound (66) | 0:2:1:1:1 | — | 0 |
| Y15 | Compound (46) | — | Compound (57) | — | Compound (66) | 2:0:2:0:1 | — | 0 |

Production Examples 1 to 13 of Cyan Dye Compositions

Cyan dye compositions (C1) to (C13) were each produced by the same method as that of Production Example 1 of Yellow Dye Composition, except the compound represented by any one of the general formulae (1) and (2) and the yellow dyes in Production Example 1 above were changed to compounds whose kinds were shown in Table 2, and a blending ratio between the dyes was also changed as shown in Table 2. A blending ratio between cyan dyes in Table 2 means a blending ratio "compound represented by the general formula (7):compound represented by the general formula (8):compound represented by the general formula (9)." In addition, the total content of the cyan dyes in each of the cyan dye compositions (C1 to C13) was set to 5 parts by mass.

TABLE 2

| Cyan dye composition | Cyan dye | | | Blending ratio between cyan dyes (total: 5 parts by mass) | First compound or comparative compound | Content of first compound or comparative compound (part(s) by mass) |
|---|---|---|---|---|---|---|
| | Compound represented by general formula (7) | Compound represented by general formula (8) | Compound represented by general formula (9) | | | |
| C1  | Compound (68) | Compound (76) | —             | 3:2:0 | Compound (1)  | 0.05 |
| C2  | Compound (67) | Compound (76) | Compound (80) | 2:2:1 | Compound (5)  | 0.05 |
| C3  | Compound (68) | Compound (76) | Compound (81) | 2:2:1 | Compound (11) | 0.05 |
| C4  | Compound (69) | Compound (77) | Compound (80) | 2:2:1 | Compound (22) | 0.05 |
| C5  | Compound (68) | Compound (76) | —             | 2:3:0 | Compound (25) | 0.05 |
| C6  | Compound (68) | Compound (75) | —             | 2:3:0 | Compound (23) | 0.05 |
| C7  | Compound (69) | Compound (77) | Compound (80) | 1:1:1 | Compound (26) | 0.03 |
| C8  | Compound (68) | Compound (76) | —             | 3:2:0 | Compound (30) | 0.05 |
| C9  | Compound (67) | Compound (76) | Compound (80) | 2:2:1 | Compound (31) | 0.05 |
| C10 | Compound (68) | Compound (75) | —             | 2:3:0 | Compound (32) | 0.05 |
| C11 | Compound (69) | Compound (77) | Compound (80) | 1:1:1 | Compound (36) | 0.03 |
| C12 | Compound (68) | Compound (76) | —             | 3:2:0 | Comparative Compound (1) | 0.05 |
| C13 | Compound (67) | Compound (76) | Compound (85) | 2:2:1 | — | 0 |

Production Examples 1 to 14 of Magenta Dye Compositions

Magenta dye compositions (M1) to (M14) were each produced by the same method as that of Production Example 1 of Yellow Dye Composition, except the compound represented by any one of the general formulae (1) and (2) and the yellow dyes in Production Example 1 above were changed to compounds whose kinds were shown in Table 3, and a blending ratio between the dyes was also changed as shown in Table 3. A blending ratio between magenta dyes in Table 3 means a blending ratio "compound represented by the general formula (10):compound represented by the general formula (11):compound represented by the general formula (12):compound represented by the general formula (13):compound represented by the general formula (14)." In addition, the total content of the magenta dyes in each of the magenta dye compositions (M1 to M14) was set to 5 parts by mass.

TABLE 3

| Magenta dye composition | Magenta dye | | | | | Blending ratio between magenta dyes (total: 5 parts by mass) | First compound or comparative compound | Content of first compound or comparative compound (part(s) by mass) |
|---|---|---|---|---|---|---|---|---|
| | Compound represented by general formula (10) | Compound represented by general formula (11) | Compound represented by general formula (12) | Compound represented by general formula (13) | Compound represented by general formula (14) | | | |
| M1 | Compound (86) | Compound (97)  | —              | —              | Compound (122) | 2:2:0:0:1 | Compound (1)  | 0.05 |
| M2 | Compound (88) | Compound (101) | Compound (107) | —              | —              | 2:2:1:0:0 | Compound (11) | 0.05 |
| M3 | Compound (86) | Compound (97)  | —              | —              | Compound (124) | 1:1:0:0:2 | Compound (25) | 0.04 |
| M4 | Compound (86) | Compound (101) | —              | —              | Compound (122) | 2:2:0:0:1 | Compound (26) | 0.05 |
| M5 | Compound (88) | Compound (97)  | —              | Compound (115) | —              | 2:2:0:1:0 | Compound (5)  | 0.05 |
| M6 | Compound (86) | Compound (97)  | —              | —              | Compound (122) | 1:1:0:0:3 | Compound (23) | 0.05 |

TABLE 3-continued

| Magenta dye composition | Magenta dye | | | | | Blending ratio between magenta dyes (total: 5 parts by mass) | First compound or comparative compound | Content of first compound or comparative compound (part(s) by mass) |
|---|---|---|---|---|---|---|---|---|
| | Compound represented by general formula (10) | Compound represented by general formula (11) | Compound represented by general formula (12) | Compound represented by general formula (13) | Compound represented by general formula (14) | | | |
| M7 | Compound (88) | Compound (97) | — | Compound (115) | — | 2:2:0:1:0 | Compound (22) | 0.05 |
| M8 | Compound (86) | Compound (97) | — | — | Compound (122) | 2:2:0:0:1 | Compound (33) | 0.05 |
| M9 | Compound (88) | Compound (101) | Compound (107) | — | — | 2:2:1:0:0 | Compound (35) | 0.05 |
| M10 | Compound (86) | Compound (97) | — | — | Compound (122) | 1:1:0:0:3 | Compound (38) | 0.05 |
| M11 | Compound (88) | Compound (97) | — | Compound (115) | — | 2:2:0:1:0 | Compound (40) | 0.05 |
| M12 | Compound (86) | Compound (102) | — | — | Compound (122) | 2:2:0:0:1 | Comparative Compound (1) | 0.05 |
| M13 | Compound (86) | Compound (101) | — | Compound (117) | Compound (122) | 1:1:0:1:1 | — | 0 |
| M14 | Compound (86) | Compound (102) | — | — | Compound (128) | 2:2:0:0:1 | — | 0 |

[Production of Image Sample]

Example 1

A polyethylene terephthalate film having a thickness of 4.5 μm (product name: LUMIRROR, manufactured by Toray Industries, Inc.) was used as a substrate, and the yellow dye composition (Y14) was applied onto the substrate so that its thickness after drying became 1 jam, followed by drying. Thus, a yellow dye layer was formed.

Next, a magenta dye layer was formed in a region adjacent to the yellow dye layer by the same method as that for the yellow dye layer except that the magenta dye composition (M13) was used instead of the yellow dye composition (Y14).

Similarly, a cyan dye layer was formed in a region adjacent to the magenta dye layer by using the cyan dye composition (C1). Thus, a first thermal transfer recording sheet including the yellow dye layer, the magenta dye layer, and the cyan dye layer was produced.

Images were transferred onto printing paper by using: the produced thermal transfer recording sheet including the yellow dye layer, the magenta dye layer, and the cyan dye layer; and a reconstructed machine of Selphy (product name) manufactured by Canon Inc. Thus, an image sample (1) was produced. At that time, the image sample was produced by: adjusting the output of the machine for each of yellow, magenta, and cyan inks so that the optical density (O.D.) of a printed product became 1.0; and superimposing the yellow, magenta, and cyan inks at the output in the stated order to print a black image. An evaluation to be described later was performed by using the resultant image sample. The colorimetry of the image sample was performed with a reflection densitometer SpectroLino (product name, manufactured by Gretag Macbeth).

Examples 2 to 33 and Comparative Examples 1 to 5

Thermal transfer recording sheets each including a yellow dye layer, a magenta dye layer, and a cyan dye layer were each produced in the same manner as in Example 1, except the dye compositions for the respective colors to be used in Example 1 were changed as shown in Table 4. Then, image samples 2 to 33 and image samples 34 to 38 (comparative image samples 1 to 5) were each output and subjected to an evaluation to be described later in the same manner as in Example 1.

TABLE 4

| | Image sample No. | Dye composition | | |
|---|---|---|---|---|
| | | | Yellow | Magenta | Cyan |
| Example | 1 | 1 | Y14 | M13 | C1 |
| | 2 | 2 | Y13 | M14 | C2 |
| | 3 | 3 | Y14 | M14 | C3 |
| | 4 | 4 | Y13 | M14 | C4 |
| | 5 | 5 | Y15 | M14 | C5 |
| | 6 | 6 | Y13 | M14 | C6 |
| | 7 | 7 | Y14 | M13 | C7 |
| | 8 | 8 | Y5 | M13 | C13 |
| | 9 | 9 | Y3 | M14 | C13 |
| | 10 | 10 | Y2 | M14 | C13 |
| | 11 | 11 | Y1 | M14 | C13 |
| | 12 | 12 | Y6 | M14 | C13 |
| | 13 | 13 | Y4 | M14 | C13 |
| | 14 | 14 | Y7 | M13 | C13 |
| | 15 | 15 | Y14 | M2 | C13 |
| | 16 | 16 | Y15 | M5 | C13 |
| | 17 | 17 | Y13 | M1 | C13 |
| | 18 | 18 | Y13 | M3 | C13 |
| | 19 | 19 | Y14 | M4 | C13 |
| | 20 | 20 | Y15 | M6 | C13 |
| | 21 | 21 | Y14 | M7 | C13 |
| | 22 | 22 | Y8 | M13 | C13 |
| | 23 | 23 | Y9 | M14 | C13 |
| | 24 | 24 | Y10 | M14 | C13 |
| | 25 | 25 | Y15 | M8 | C13 |
| | 26 | 26 | Y13 | M9 | C13 |
| | 27 | 27 | Y14 | M10 | C13 |
| | 28 | 28 | Y13 | M11 | C13 |
| | 29 | 29 | Y13 | M14 | C8 |
| | 30 | 30 | Y14 | M13 | C9 |
| | 31 | 31 | Y15 | M14 | C10 |
| | 32 | 32 | Y14 | M13 | C11 |
| | 33 | 33 | Y1 | M13 | C8 |
| Comparative Example | 1 | 34 | Y14 | M14 | C13 |
| | 2 | 35 | Y15 | M13 | C13 |
| | 3 | 36 | Y13 | M12 | C13 |
| | 4 | 37 | Y14 | M14 | C12 |
| | 5 | 38 | Y15 | M14 | C13 |

[Evaluation]
<Imbalance Evaluation>

Each of the image samples obtained in Examples 1 to 33 and Comparative Examples 1 to 5 was loaded into a xenon tester (product name: AtlasCi4000, manufactured by Suga Test Instruments Co., Ltd.), and was exposed for 30 hours under the conditions of an illuminance of 0.28 W/m² at 340 nm, a temperature of 40° C., and a relative humidity of 50%.

When an initial optical density (O.D.) was represented by $OD_0$ and an O.D. after the 30 hours of exposure was represented by $OD_{30}$, an O.D. residual ratio was defined as represented by the following numerical equation 1.

O.D. residual ratio=$OD_{30}/OD_0$  (Numerical equation 1)

The O.D. residual ratio of each of the cyan, magenta, and yellow components in the black image of the sample was calculated in accordance with the equation. As an imbalance evaluation, the absolute values of differences between the respective O.D. residual ratios were calculated as described below.

$Bk_{C-Y}$=100×absolute value of (O.D. residual ratio of yellow component-O.D. residual ratio of cyan component)

$Bk_{M-Y}$=100×absolute value of (O.D. residual ratio of yellow component-O.D. residual ratio of magenta component)

$Bk_{C-M}$=100×absolute value of (O.D. residual ratio of cyan component-O.D. residual ratio of magenta component)

The three values ($Bk_{C-Y}$, $Bk_{M-Y}$, and $Bk_{C-M}$) calculated from the foregoing equations were each evaluated based on the following evaluation criteria. Those respective values and their evaluation results are shown in Table 5. When imbalances ($Bk_{C-Y}$, $Bk_{M-Y}$, and $Bk_{C-M}$) are 15 or less, the imbalances may be judged to be satisfactory.

(Evaluation Criteria)
A: Imbalance<10 (extremely satisfactory imbalance)
B: 10≤imbalance≤15 (satisfactory imbalance)
C: 15<imbalance (unsatisfactory imbalance)

TABLE 5

| | | Image sample No. | Imbalance | | | | | |
|---|---|---|---|---|---|---|---|---|
| | | | Bk(C-Y) | | Bk(M-Y) | | Bk(C-M) | |
| | | | Value | Evaluation | Value | Evaluation | Value | Evaluation |
| Example | 1 | 1 | 0 | A | 3 | A | 3 | A |
| | 2 | 2 | 5 | A | 3 | A | 8 | A |
| | 3 | 3 | 5 | A | 3 | A | 2 | A |
| | 4 | 4 | 2 | A | 4 | A | 6 | A |
| | 5 | 5 | 1 | A | 4 | A | 5 | A |
| | 6 | 6 | 3 | A | 3 | A | 6 | A |
| | 7 | 7 | 3 | A | 3 | A | 6 | A |
| | 8 | 8 | 11 | B | 4 | A | 15 | B |
| | 9 | 9 | 10 | B | 5 | A | 15 | B |
| | 10 | 10 | 10 | B | 4 | A | 14 | B |
| | 11 | 11 | 14 | B | 1 | A | 15 | B |
| | 12 | 12 | 12 | B | 2 | A | 14 | B |
| | 13 | 13 | 14 | B | 1 | A | 13 | B |
| | 14 | 14 | 14 | B | 2 | A | 12 | B |
| | 15 | 15 | 10 | B | 2 | A | 12 | B |
| | 16 | 16 | 10 | B | 3 | A | 13 | B |
| | 17 | 17 | 14 | B | 1 | A | 15 | B |
| | 18 | 18 | 14 | B | 1 | A | 13 | B |
| | 19 | 19 | 13 | B | 1 | A | 14 | B |
| | 20 | 20 | 10 | B | 1 | A | 11 | B |
| | 21 | 21 | 12 | B | 1 | A | 11 | B |
| | 22 | 22 | 13 | B | 1 | A | 14 | B |
| | 23 | 23 | 13 | B | 1 | A | 12 | B |
| | 24 | 24 | 11 | B | 1 | A | 12 | B |
| | 25 | 25 | 14 | B | 1 | A | 15 | B |
| | 26 | 26 | 15 | B | 3 | A | 12 | B |
| | 27 | 27 | 15 | B | 3 | A | 12 | B |
| | 28 | 28 | 14 | B | 1 | A | 13 | B |
| | 29 | 29 | 3 | A | 6 | A | 3 | A |
| | 30 | 30 | 1 | A | 5 | A | 4 | A |
| | 31 | 31 | 0 | A | 5 | A | 5 | A |
| | 32 | 32 | 0 | A | 3 | A | 3 | A |
| | 33 | 33 | 1 | A | 1 | A | 2 | A |
| Comparative Example | 1 | 34 | 34 | C | 3 | A | 37 | C |
| | 2 | 35 | 25 | C | 3 | A | 28 | C |
| | 3 | 36 | 28 | C | 5 | A | 33 | C |
| | 4 | 37 | 22 | C | 5 | A | 27 | C |
| | 5 | 38 | 41 | C | 1 | A | 42 | C |

As is apparent from Table 5, the image samples formed by using the first thermal transfer recording sheets described in Examples were superior in imbalance to the image samples formed by using the thermal transfer recording sheets of Comparative Examples.

(II) Second Thermal Transfer Recording Sheet

Production Example 16 of Yellow Dye Composition

5 Parts of a polyvinyl butyral resin (product name: KS-3, manufactured by Sekisui Chemical Co., Ltd.) was gradually added to and dissolved in a mixed solution of 45 parts of methyl ethyl ketone and 45 parts of toluene. The following yellow dyes were added to and completely dissolved in the solution. Thus, a yellow dye composition (Y16) for producing a thermal transfer recording sheet was obtained.

Yellow Dyes:

| | |
|---|---|
| Compound represented by the general formula (3): Compound (43) | 1.25 parts |
| Compound represented by the general formula (4): Compound (51) | 2.50 parts |
| Existing yellow dye: Compound (66) | 1.25 parts |

Production Examples 17 and 18 of Yellow Dye Compositions

Yellow dye compositions (Y17) and (Y18) were each produced by the same method as that of Production Example 16 of Yellow Dye Composition, except the yellow dyes in Production Example 16 above were changed to yellow dyes shown in Table 6, and a blending ratio between the dyes was also changed as shown in Table 6. At that time, the total content of the yellow dyes in each of the yellow dye compositions (Y16 to Y18) was set to 5 parts by mass.

TABLE 6

| Yellow dye composition | Compound represented by general formula (3) | Compound represented by general formula (4) | Compound represented by general formula (5) | Compound represented by general formula (6) | General Formula (65) or (66) | Blending ratio between yellow dyes (total: 5 parts by mass) |
|---|---|---|---|---|---|---|
| Y16 | Compound (43) | Compound (51) | — | — | Compound (66) | 1:2:0:0:1 |
| Y17 | Compound (43) | Compound (53) | Compound (57) | — | Compound (66) | 1:1:2:0:1 |
| Y18 | — | Compound (52) | Compound (58) | Compound (63) | Compound (65) | 0:2:1:1:1 |

Production Examples 15 to 17 of Magenta Dye Compositions

Magenta dye compositions (M15) to (M17) for producing thermal transfer recording sheets were each produced by the same method as that of Production Example 16 of Yellow Dye Composition, except the yellow dyes in Production Example 16 above were changed to magenta dyes shown in Table 7, and a blending ratio between the dyes was also changed as shown in Table 7. At that time, the total content of the magenta dyes in each of the magenta dye compositions (M15 to M17) was set to 5 parts by mass.

TABLE 7

| Magenta dye composition | Compound represented by general formula (10) | Compound represented by general formula (11) | Compound represented by general formula (12) | Compound represented by general formula (13) | Compound represented by general formula (14) | Blending ratio between magenta dyes (total: 5 parts by mass) |
|---|---|---|---|---|---|---|
| M15 | Compound (86) | Compound (97) | — | — | Compound (122) | 2:2:0:0:1 |
| M16 | Compound (88) | Compound (101) | Compound (107) | — | — | 2:2:1:0:0 |
| M17 | Compound (86) | Compound (97) | — | Compound (115) | Compound (123) | 1:1:0:1:1 |

Production Examples 14 to 16 of Cyan Dye Compositions

Cyan dye compositions (C14) to (C16) were each produced by the same method as that of Production Example 16 of Yellow Dye Composition, except the yellow dyes in Production Example 16 above were changed to cyan dyes shown in Table 8, and a blending ratio between the dyes was also changed as shown in Table 8. At that time, the total content of the cyan dyes in each of the cyan dye compositions (C14 to C16) was set to 5 parts by mass.

TABLE 8

| Cyan dye composition | Compound represented by general formula (7) | Compound represented by general formula (8) | Compound represented by general formula (9) | Blending ratio between cyan dyes (total: 5 parts by mass) |
|---|---|---|---|---|
| C14 | Compound (68) | Compound (76) | — | 3:2:0 |
| C15 | Compound (67) | Compound (76) | Compound (80) | 2:2:1 |
| C16 | Compound (68) | Compound (76) | Compound (81) | 2:2:1 |

Production Example 1 of Composition for forming Protective Layer

10 Parts of an acrylic resin (manufactured by Mitsubishi Rayon Co., Ltd., product name: DIANAL BR-85) was gradually added to and dissolved in a mixed solution of 45 parts of methyl ethyl ketone and 45 parts of toluene. After that, 0.5 part of Compound (1) was added to and completely dissolved in the solution. Thus, an application liquid (composition) for forming a protective layer was prepared.

Production Examples 2 to 12 of Compositions for Forming Protective Layers

Compositions (H2) to (H12) for forming protective layers were each produced by the same method as that of Production Example 1 of Composition for forming Protective Layer, except the compound represented by any one of the general formulae (1) and (2) in Production Example 1 above was changed to a compound shown in Table 9, and a blending ratio between the compound and the acrylic resin was also changed as shown in Table 9.

TABLE 9

| Composition for forming protective layer | First compound or comparative compound | Blending ratio (acrylic resin: first compound or comparative compound) (part(s) by mass) |
|---|---|---|
| H1 | Compound (1) | 10:0.5 |
| H2 | Compound (5) | 10:1.0 |
| H3 | Compound (11) | 10:0.3 |
| H4 | Compound (22) | 10:0.7 |
| H5 | Compound (23) | 10:0.7 |
| H6 | Compound (25) | 10:0.3 |
| H7 | Compound (26) | 10:0.1 |
| H8 | Compound (30) | 10:0.3 |
| H9 | Compound (31) | 10:0.2 |

TABLE 9-continued

| Composition for forming protective layer | First compound or comparative compound | Blending ratio (acrylic resin: first compound or comparative compound) (part(s) by mass) |
|---|---|---|
| H10 | Compound (32) | 10:0.4 |
| H11 | Compound (40) | 10:0.2 |
| H12 | Comparative Compound (1) | 10:0.1 |

Production Example 1 of Coloring Material Layer Sheet

A polyethylene terephthalate film having a thickness of 4.5 μm (product name: LUMIRROR, manufactured by Toray Industries, Inc.) was used as a substrate, and the yellow dye composition (Y16) was applied onto the substrate so that its thickness after drying became 1 jam, followed by drying. Thus, a yellow dye layer was formed.

Next, a magenta dye layer was formed in a region adjacent to the yellow dye layer by the same method as that for the yellow dye layer except that the magenta dye composition (M15) was used instead of the yellow dye composition (Y16).

Similarly, a cyan dye layer was formed in a region adjacent to the magenta dye layer by using the cyan dye composition (C14).

Further, an application liquid obtained by adding 20 parts of an acrylic resin (product name: BR-85, manufactured by Mitsubishi Rayon Co., Ltd.) to a mixed solution of 40 parts of methyl ethyl ketone and 40 parts of toluene was applied to a region adjacent to the cyan dye layer so that its thickness after drying became 0.5 jam, followed by drying. Thus, a peeling layer was formed.

Subsequently, the composition (application liquid) (H1) for forming a protective layer was applied onto the peeling layer so that its thickness after drying became 2 μm, followed by drying. Thus, a protective layer was formed.

Thus, a coloring material layer sheet (S1) including the yellow dye layer, the magenta dye layer, the cyan dye layer, and the protective layer was produced.

Production Examples 2 to 15 of Coloring Material Layer Sheets

Coloring material layer sheets (S2) to (S15) were each produced in the same manner as in Production Example 1 of Coloring Material Layer Sheet, except the yellow dye composition, the magenta dye composition, the cyan dye composition, and the composition for forming a protective layer used in Production Example 1 above were changed to compounds shown in Table 10.

TABLE 10

| Coloring material layer sheet | Dye composition | | | Protective layer |
|---|---|---|---|---|
| | Yellow | Magenta | Cyan | |
| S1 | Y16 | M15 | C14 | H1 |
| S2 | Y17 | M15 | C14 | H2 |
| S3 | Y18 | M16 | C14 | H3 |
| S4 | Y16 | M16 | C15 | H4 |
| S5 | Y17 | M17 | C16 | H5 |
| S6 | Y18 | M17 | C16 | H6 |
| S7 | Y16 | M17 | C16 | H7 |
| S8 | Y16 | M16 | C15 | H8 |
| S9 | Y16 | M17 | C16 | H9 |
| S10 | Y16 | M15 | C14 | H10 |
| S11 | Y17 | M17 | C16 | H11 |
| S12 | Y13 | M14 | C8 | H3 |
| S13 | Y15 | M14 | C10 | H9 |
| S14 (for comparison) | Y16 | M15 | C14 | H12 |
| S15 (for comparison) | Y16 | M17 | C16 | H12 |

[Production of Image Sample]

Example 34

Images were transferred onto printing paper by using the produced coloring material layer sheet (S1) and a reconstructed machine of Selphy (product name) manufactured by Canon Inc. Thus, an image sample (39) was produced. At that time, the images were printed in the following order: a yellow image, a magenta image, a cyan image, and a protective layer. The image sample was produced by: adjusting the output of the machine for each of yellow, magenta, and cyan inks so that the optical density (O.D.) of a printed product became 1.0; and superimposing the inks to print a black image. An evaluation to be described later was performed by using the resultant image sample. The colorimetry of the image sample was performed with a reflection densitometer SpectroLino (product name, manufactured by Gretag Macbeth).

Examples 35 to 46, and Comparative Examples 6 and 7

Image samples 40 to 51, and image samples 52 and 53 (comparative image samples 6 and 7) were each output and subjected to an evaluation to be described later in the same manner as in Example 34, except the coloring material layer sheet to be used in Example 34 was changed as shown in Table 11.

TABLE 11

| | Image sample No. | Coloring material layer sheet No. |
|---|---|---|
| Example | 34 | 39 | S1 |
| | 35 | 40 | S2 |
| | 36 | 41 | S3 |
| | 37 | 42 | S4 |
| | 38 | 43 | S5 |
| | 39 | 44 | S6 |
| | 40 | 45 | S7 |
| | 41 | 46 | S8 |
| | 42 | 47 | S9 |
| | 43 | 48 | S10 |
| | 44 | 49 | S11 |
| | 45 | 50 | S12 |
| | 46 | 51 | S13 |
| Comparative Example | 6 | 52 | S14 |
| | 7 | 53 | S15 |

[Evaluation]
<Imbalance Evaluation>

Each of the image samples obtained in Examples 34 to 46, and Comparative Examples 6 and 7 was loaded into a xenon tester (product name: AtlasCi4000, manufactured by Suga Test Instruments Co., Ltd.), and was exposed for 60 hours under the conditions of an illuminance of 0.28 W/m² at 340 nm, a temperature of 40° C., and a relative humidity of 50%.

When an initial optical density (O.D.) was represented by $OD_0$ and an O.D. after the 60 hours of exposure was represented by $OD_{60}$, an O.D. residual ratio was defined as represented by the following numerical equation 2.

O.D. residual ratio=$OD_{60}/OD_0$ (Numerical equation 2)

The O.D. residual ratio of each of the cyan, magenta, and yellow components in the black image of the sample was calculated in accordance with the equation. As an imbalance, the absolute values of differences between the respective O.D. residual ratios were calculated as described below.

$Bk_{C-Y}$=100×absolute value of (O.D. residual ratio of yellow component-O.D. residual ratio of cyan component)

$Bk_{M-Y}$=100×absolute value of (O.D. residual ratio of yellow component-O.D. residual ratio of magenta component)

$Bk_{C-M}$=100×absolute value of (O.D. residual ratio of cyan component-O.D. residual ratio of magenta component)

The three values ($Bk_{C-Y}$, $Bk_{M-Y}$, and $Bk_{C-M}$) calculated from the foregoing equations were each evaluated based on the following evaluation criteria. Those respective values and their evaluation results are shown in Table 12. When imbalances ($Bk_{C-Y}$, $Bk_{M-Y}$, and $Bk_{C-M}$) are 15 or less, the imbalances may be judged to be satisfactory.

(Evaluation Criteria)
A: Imbalance<10 (extremely satisfactory imbalance)
B: 10≤imbalance≤15 (satisfactory imbalance)
C: 15<imbalance (unsatisfactory imbalance)

TABLE 12

| | | | Imbalance | | | | |
| --- | --- | --- | --- | --- | --- | --- | --- |
| | | | Bk(C-Y) | | Bk(M-Y) | | Bk(C-M) | |
| | Image sample No. | | Value | Evaluation | Value | Evaluation | Value | Evaluation |
| Example | 34 | 39 | 1 | A | 3 | A | 3 | A |
| | 35 | 40 | 5 | A | 4 | A | 10 | B |
| | 36 | 41 | 5 | A | 3 | A | 11 | B |
| | 37 | 42 | 11 | B | 3 | A | 6 | A |
| | 38 | 43 | 13 | B | 4 | A | 6 | A |
| | 39 | 44 | 1 | A | 4 | A | 5 | A |
| | 40 | 45 | 14 | B | 5 | A | 6 | A |
| | 41 | 46 | 12 | B | 2 | A | 10 | B |
| | 42 | 47 | 3 | A | 1 | A | 5 | A |
| | 43 | 48 | 6 | A | 3 | A | 7 | A |
| | 44 | 49 | 13 | B | 4 | A | 11 | B |
| | 45 | 50 | 3 | A | 2 | A | 4 | A |
| | 46 | 51 | 1 | A | 1 | A | 2 | A |
| Comparative Example | 6 | 52 | 28 | C | 6 | A | 42 | C |
| | 7 | 53 | 33 | C | 6 | A | 37 | C |

As is apparent from Table 12, the image samples formed by using the second thermal transfer recording sheets described in Examples were superior in imbalance to Comparative Examples.

As described above, according to the present invention, the thermal transfer recording sheet capable of providing an image that is excellent in light fastness and is improved in imbalance can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A thermal transfer recording sheet comprising:
a substrate;
a yellow dye layer containing a yellow dye;
a magenta dye layer containing a magenta dye; and
a cyan dye layer containing a cyan dye,
wherein one or more of the yellow dye layer, the magenta dye layer, and the cyan dye layer contain one or more compounds selected from the group consisting of compounds represented by general formulae (1) and (2),
wherein the yellow dye contains one or more compounds selected from the group consisting of compounds represented by general formulae (3) to (6), and
wherein the cyan dye contains one or more compounds selected from the group consisting of compounds represented by general formulae (7) to (9):

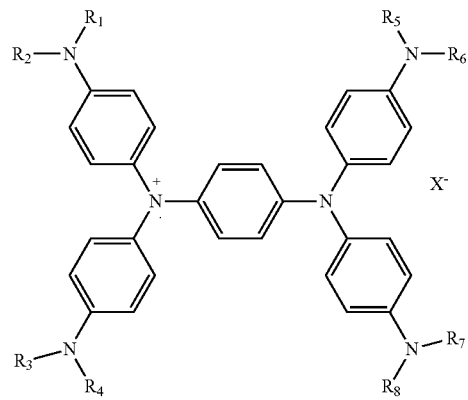

General formula (1)

wherein, in the general formula (1), $R_1$ to $R_8$ each independently represents a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R_1$ and $R_2$, $R_3$ and $R_4$, $R_5$ and $R_6$, and $R_7$ and $R_8$ may each be bonded to each other to form a ring, and $X^-$ represents an anion;

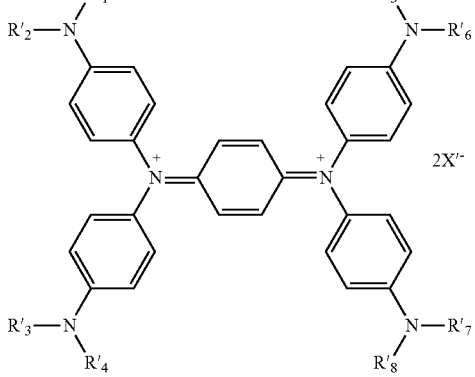

General formula (2)

wherein, in the general formula (2), $R'_1$ to $R'_8$ each independently represents a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R'_1$ and $R'_2$, $R'_3$ and $R'_4$, $R'_5$ and $R'_6$, and $R'_7$ and $R'_8$ may each be bonded to each other to form a ring, and $X'^-$ represents an anion;

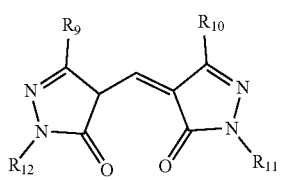

General formula (3)

wherein, in the general formula (3), $R_9$ to $R_{12}$ each independently represents an alkyl group, or a substituted or unsubstituted aryl group;

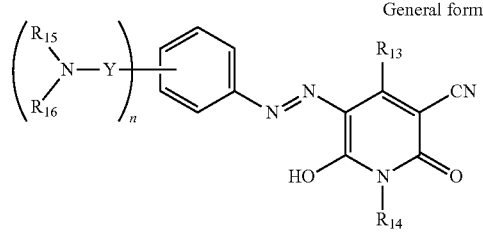

General formula (4)

wherein, in the general formula (4), $R_{13}$ represents an alkyl group, a substituted or unsubstituted aryl group, or a substituted or unsubstituted amino group, $R_{14}$ represents a hydrogen atom, an alkyl group, a substituted or unsubstituted aryl group, or —N(—$R_a$)$R_b$, provided that $R_a$ and $R_b$ each independently represents a hydrogen atom, an alkyl group, or an acyl group, and may form a cyclic structure together with a nitrogen atom to which $R_a$ and $R_b$ are bonded, $R_{15}$ represents an alkyl group, $R_{16}$ represents a hydrogen atom or an alkyl group, Y represents a carbonyl group or a sulfonyl group, and n represents an integer of from 1 to 3;

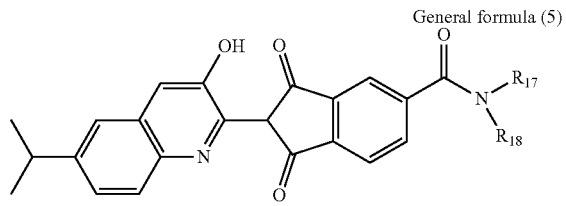

General formula (5)

wherein, in the general formula (5), $R_{17}$ and $R_{18}$ each independently represents an alkyl group or an aryl group;

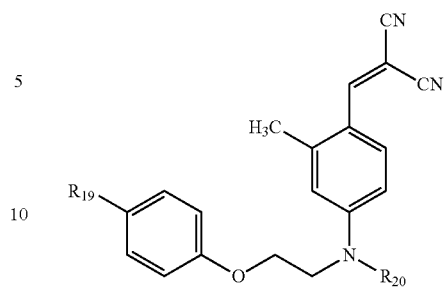

General formula (6)

wherein, in the general formula (6), $R_{19}$ and $R_{20}$ each independently represents an alkyl group or an aryl group;

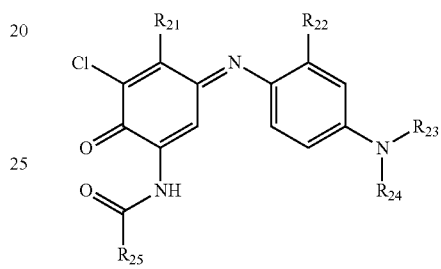

General formula (7)

wherein, in the general formula (7), $R_{21}$ to $R_{25}$ each independently represents an alkyl group or an aryl group;

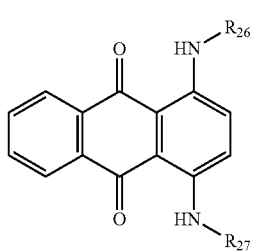

General formula (8)

wherein, in the general formula (8), $R_{26}$ and $R_{27}$ each independently represents an alkyl group, or a substituted or unsubstituted aryl group; and

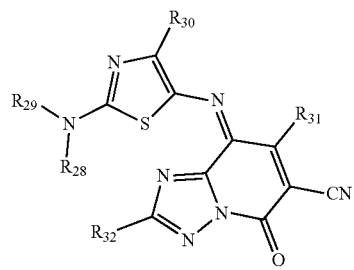

General formula (9)

wherein, in the general formula (9), $R_{28}$ to $R_{32}$ each independently represents an alkyl group or an aryl group.

2. The thermal transfer recording sheet according to claim 1, wherein $R_1$ to $R_8$ in the general formula (1) each independently represents a substituted or unsubstituted alkyl group having 1 to 8 carbon atoms.

3. The thermal transfer recording sheet according to claim 2, wherein $R_1$ to $R_8$ in the general formula (1) each independently represents an unsubstituted alkyl group or a cyanoalkyl group having 3 to 8 carbon atoms.

4. The thermal transfer recording sheet according to claim 1, wherein $R_1$ and $R_2$, $R_3$ and $R_4$, $R_5$ and $R_6$, and $R_7$ and $R_8$ in the general formula (1) each represents the same substituent.

5. The thermal transfer recording sheet according to claim 1, wherein $R'_1$ to $R'_8$ in the general formula (2) each independently represents a substituted or unsubstituted alkyl group having 1 to 8 carbon atoms.

6. The thermal transfer recording sheet according to claim 5, wherein $R'_1$ to $R'_8$ in the general formula (2) each independently represents an unsubstituted alkyl group or a cyanoalkyl group having 3 to 8 carbon atoms.

7. The thermal transfer recording sheet according to claim 1, wherein $R'_1$ and $R'_2$, $R'_3$ and $R'_4$, $R'_5$ and $R'_6$, and $R'_7$ and $R'_8$ in the general formula (2) each represents the same substituent.

8. The thermal transfer recording sheet according to claim 1, wherein the magenta dye contains one or more compounds selected from the group consisting of compounds represented by general formulae (10) to (14):

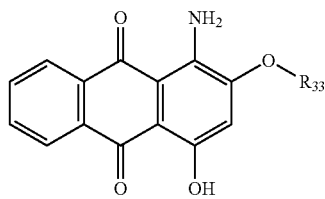

General formula (10)

wherein, in the general formula (10), $R_{33}$ represents an alkyl group that may contain an oxygen atom in an ether functional group, or a substituted or unsubstituted aryl group;

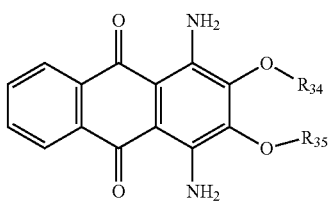

General formula (11)

wherein, in the general formula (11), $R_{34}$ and $R_{35}$ each independently represents an alkyl group, or a substituted or unsubstituted aryl group;

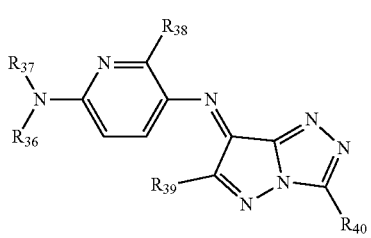

General formula (12)

wherein, in the general formula (12), $R_{36}$ to $R_{40}$ each independently represents an alkyl group, or a substituted or unsubstituted aryl group;

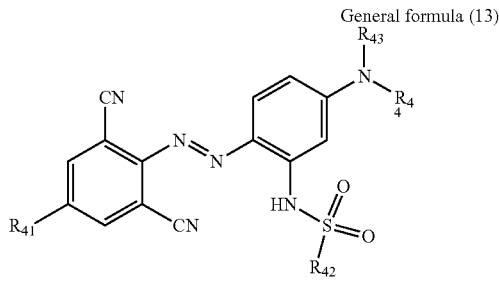

General formula (13)

wherein, in the general formula (13), $R_{41}$ to $R_{44}$ each independently represents an alkyl group, or a substituted or unsubstituted aryl group; and

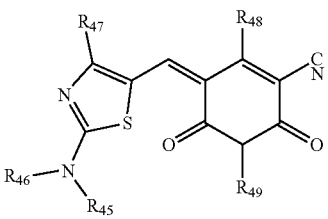

General formula (14)

wherein, in the general formula (14), $R_{45}$ and $R_{46}$ each independently represents an alkyl group, $R_{47}$ represents a hydrogen atom, an alkyl group, or a substituted or unsubstituted aryl group, $R_{48}$ represents an alkyl group, or a substituted or unsubstituted aryl group, and $R_{49}$ represents a hydrogen atom, an alkyl group, a substituted or unsubstituted aryl group, or $-N(-R_{50})R_{51}$, provided that $R_{50}$ and $R_{51}$ each independently represents a hydrogen atom, an alkyl group, an aryl group, or an acyl group, or represent a cyclic structure formed together with a nitrogen atom to which $R_{50}$ and $R_{51}$ are bonded.

9. The thermal transfer recording sheet according to claim 1, wherein the yellow dye layer, the magenta dye layer, and the cyan dye layer are formed on a substrate field sequentially.

10. A thermal transfer recording sheet comprising:
a substrate;
a yellow dye layer containing a yellow dye;
a magenta dye layer containing a magenta dye;
a cyan dye layer containing a cyan dye; and
a protective layer for protecting a surface of an image formed by transferring the yellow dye layer, the magenta dye layer, and the cyan dye layer onto a transfer target material,
wherein the protective layer contains one or more compounds selected from the group consisting of compounds represented by general formulae (1) and (2),
wherein the yellow dye contains one or more compounds selected from the group consisting of compounds represented by general formulae (3) to (6), and
wherein the cyan dye contains one or more compounds selected from the group of consisting compounds represented by general formulae (7) to (9):

General formula (1)

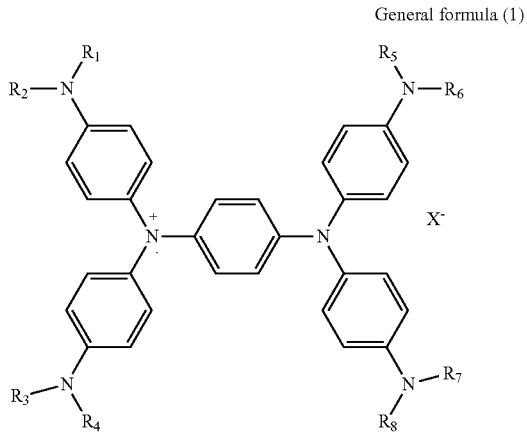

wherein, in the general formula (1), $R_1$ to $R_8$ each independently represents a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R_1$ and $R_2$, $R_3$ and $R_4$, $R_5$ and $R_6$, and $R_7$ and $R_8$ may each be bonded to each other to form a ring, and $X^-$ represents an anion;

General formula (2)

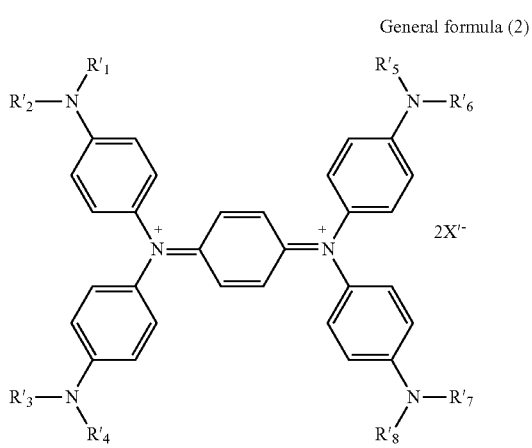

wherein, in the general formula (2), $R'_1$ to $R'_8$ each independently represents a substituted or unsubstituted alkyl group having 1 to 8 carbon atoms, a substituted or unsubstituted alkenyl group, a substituted or unsubstituted aralkyl group, a substituted or unsubstituted alkynyl group, or a substituted or unsubstituted aryl group, and $R'_1$ and $R'_2$, $R'_3$ and $R'_4$, $R'_5$ and $R'_6$, and $R'_7$ and $R'_8$ may each be bonded to each other to form a ring, and $X'^-$ represents an anion;

General formula (3)

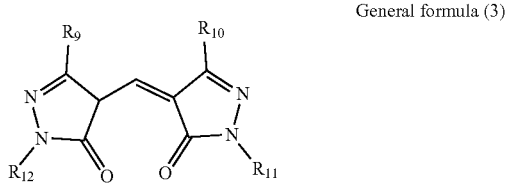

wherein, in the general formula (3), $R_9$ to $R_{12}$ each independently represents an alkyl group, or a substituted or unsubstituted aryl group;

General formula (4)

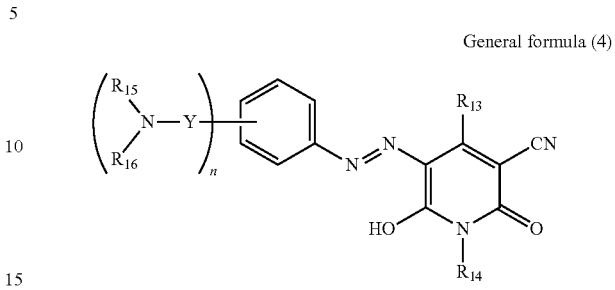

wherein, in the general formula (4), $R_{13}$ represents an alkyl group, a substituted or unsubstituted aryl group, or a substituted or unsubstituted amino group, $R_{14}$ represents a hydrogen atom, an alkyl group, a substituted or unsubstituted aryl group, or $-N(-R_a)R_b$, provided that $R_a$ and $R_b$ each independently represents a hydrogen atom, an alkyl group, or an acyl group, and may form a cyclic structure together with a nitrogen atom to which $R_a$ and $R_b$ are bonded, $R_{15}$ represents an alkyl group, $R_{16}$ represents a hydrogen atom or an alkyl group, Y represents a carbonyl group or a sulfonyl group, and n represents an integer of from 1 to 3;

General formula (5)

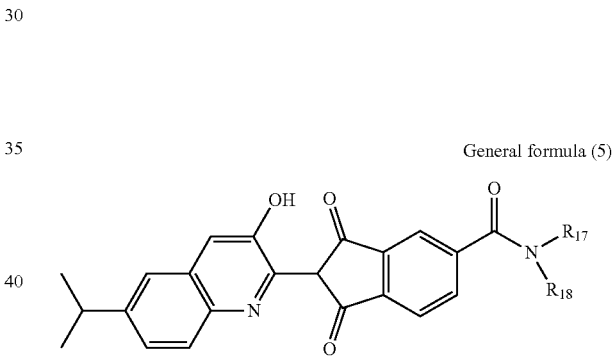

wherein, in the general formula (5), $R_{17}$ and $R_{18}$ each independently represents an alkyl group or an aryl group;

General formula (6)

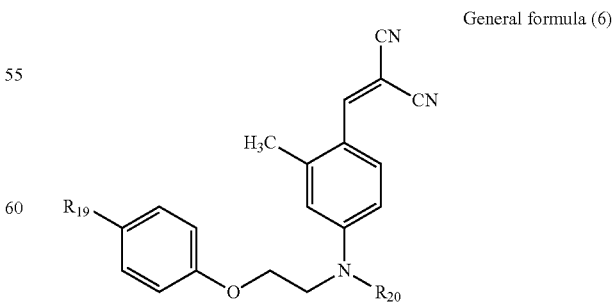

wherein, in the general formula (6), $R_{19}$ and $R_{20}$ each independently represents an alkyl group or an aryl group;

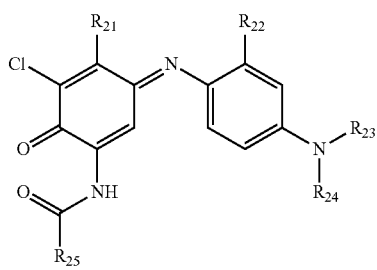

General formula (7)

wherein, in the general formula (7), $R_{21}$ to $R_{25}$ each independently represents an alkyl group or an aryl group;

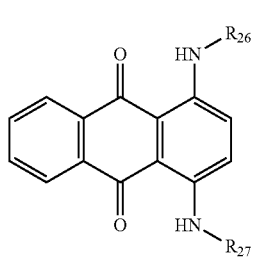

General formula (8)

wherein, in the general formula (8), $R_{26}$ and $R_{27}$ each independently represents an alkyl group, or a substituted or unsubstituted aryl group; and

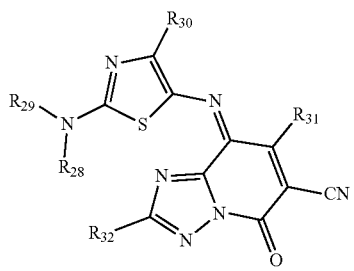

General formula (9)

wherein, in the general formula (9), $R_{28}$ to $R_{32}$ each independently represents an alkyl group or an aryl group.

11. The thermal transfer recording sheet according to claim 10, wherein $R_1$ to $R_8$ in the general formula (1) each independently represents a substituted or unsubstituted alkyl group having 1 to 8 carbon atoms.

12. The thermal transfer recording sheet according to claim 11, wherein $R_1$ to $R_8$ in the general formula (1) each independently represents an unsubstituted alkyl group or a cyanoalkyl group having 3 to 8 carbon atoms.

13. The thermal transfer recording sheet according to claim 10, wherein $R_1$ and $R_2$, $R_3$ and $R_4$, $R_5$ and $R_6$, and $R_7$ and $R_8$ in the general formula (1) each represents the same substituent.

14. The thermal transfer recording sheet according to claim 10, wherein $R'_1$ to $R'_8$ in the general formula (2) each independently represents a substituted or unsubstituted alkyl group having 1 to 8 carbon atoms.

15. The thermal transfer recording sheet according to claim 14, wherein $R'_1$ to $R'_8$ in the general formula (2) each independently represents an unsubstituted alkyl group or a cyanoalkyl group having 3 to 8 carbon atoms.

16. The thermal transfer recording sheet according to claim 10, wherein $R'_1$ and $R'_2$, $R'_3$ and $R'_4$, $R'_5$ and $R'_6$, and $R'_7$ and $R'_8$ in the general formula (2) each represents the same substituent.

17. The thermal transfer recording sheet according to claim 10, wherein the magenta dye contains one or more compounds selected from the group consisting of compounds represented by general formulae (10) to (14):

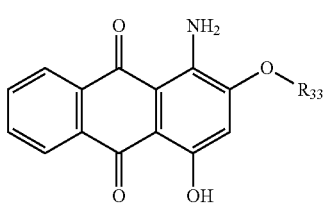

General formula (10)

wherein, in the general formula (10), $R_{33}$ represents an alkyl group that may contain an oxygen atom in an ether functional group, or a substituted or unsubstituted aryl group;

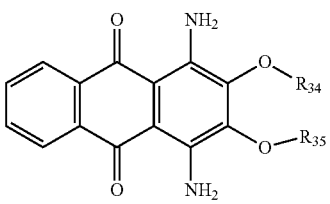

General formula (11)

wherein, in the general formula (11), $R_{34}$ and $R_{35}$ each independently represents an alkyl group, or a substituted or unsubstituted aryl group;

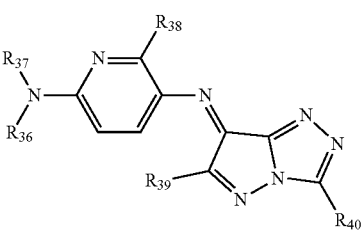

General formula (12)

wherein, in the general formula (12), $R_{36}$ to $R_{40}$ each independently represents an alkyl group, or a substituted or unsubstituted aryl group;

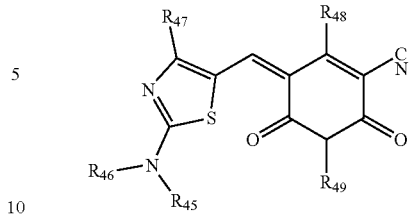

General formula (14)

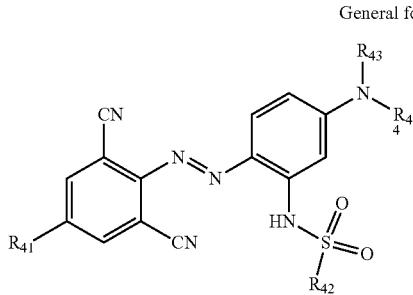

General formula (13)

wherein, in the general formula (13), $R_{41}$ to $R_{44}$ each independently represents an alkyl group, or a substituted or unsubstituted aryl group; and wherein, in the general formula (14), $R_{45}$ and $R_{46}$ each independently represents an alkyl group, $R_{47}$ represents a hydrogen atom, an alkyl group, or a substituted or unsubstituted aryl group, $R_{48}$ represents an alkyl group, or a substituted or unsubstituted aryl group, and $R_{49}$ represents a hydrogen atom, an alkyl group, a substituted or unsubstituted aryl group, or —N(—$R_{50}$)$R_{51}$, provided that $R_{50}$ and $R_{51}$ each independently represents a hydrogen atom, an alkyl group, an aryl group, or an acyl group, or represent a cyclic structure formed together with a nitrogen atom to which $R_{50}$ and $R_{51}$ are bonded.

18. The thermal transfer recording sheet according to claim 10, wherein the yellow dye layer, the magenta dye layer, the cyan dye layer, and the protective layer are formed on a substrate field sequentially.

* * * * *